US012759738B2

(12) United States Patent
Turvey et al.

(10) Patent No.: US 12,759,738 B2
(45) Date of Patent: Oct. 13, 2026

(54) DRAINAGE IN BASE STATIONS FOR UNMANNED AERIAL VEHICLES

(71) Applicant: Skydio, Inc., San Mateo, CA (US)

(72) Inventors: George Oliver Turvey, Brookdale, CA (US); Yee Shan Woo, Campbell, CA (US); Shun Yao, Fremont, CA (US); Christopher C. Berthelet, Sunnyvale, CA (US); Patrick Allen Lowe, Palo Alto, CA (US)

(73) Assignee: Skydio, Inc., San Mateo, CA (US)

( * ) Notice: Subject to any disclaimer, the term of this patent is extended or adjusted under 35 U.S.C. 154(b) by 0 days.

(21) Appl. No.: 19/222,064

(22) Filed: May 29, 2025

(65) Prior Publication Data

US 2026/0048863 A1 Feb. 19, 2026

Related U.S. Application Data

(60) Provisional application No. 63/683,520, filed on Aug. 15, 2024.

(51) Int. Cl.
*B64U 70/90* (2023.01)
*B64U 50/37* (2023.01)
(Continued)

(52) U.S. Cl.
CPC ............. *B64U 70/90* (2023.01); *B64U 50/37* (2023.01); *B64U 80/25* (2023.01); *B64U 80/70* (2023.01);
(Continued)

(58) Field of Classification Search
CPC ........ B64U 70/90; B64U 50/37; B64U 80/25; B64U 80/70; B64U 10/14; B64U 70/92;
(Continued)

(56) References Cited

U.S. PATENT DOCUMENTS 3,253,806 A * 5/1966 Eickmann ............... B64C 27/12 244/17.23
3,417,729 A * 12/1968 Gilday .................. B64C 27/006 416/61

(Continued)

FOREIGN PATENT DOCUMENTS

| | | | |
|---|---|---|---|
| CN | 115636119 | A | 1/2023 |
| EP | 4410686 | A1 | 8/2024 |
| WO | 2019061519 | A1 | 4/2019 |

OTHER PUBLICATIONS

International Search Report and Written Opinion mailed on Jan. 23, 2026 in corresponding PCT Application No. PCT/US2025/041863.

*Primary Examiner* — Medhat Badawi

(74) *Attorney, Agent, or Firm* — Young Basile Hanlon & MacFarlane, P.C.

(57) ABSTRACT

A base station for an unmanned aerial vehicle includes a base. The base defines a cavity therein and includes a lower surface that defines one or more drainage slots to provide drainage egress from the cavity of the body. The base further includes a landing platform supported by the body. The landing platform includes a front grate in fluid communication with a thermal management system of the base station via a front thermal management duct that is configured to direct the drainage that enters the front thermal management duct through the front grate towards the one or more drainage slots and a rear grate in fluid communication with the thermal management system of the base station via a rear thermal management duct that is configured to direct the drainage that enters the rear thermal management duct through the rear grate towards the one or more drainage slots.

20 Claims, 30 Drawing Sheets

(51) Int. Cl.

| | |
|---|---|
| ***B64U 80/25*** | (2023.01) |
| ***B64U 80/70*** | (2023.01) |
| *B64U 10/14* | (2023.01) |
| *B64U 70/92* | (2023.01) |
| *B64U 70/97* | (2023.01) |
| *B64U 70/99* | (2023.01) |

(52) U.S. Cl.
CPC .............. *B64U 10/14* (2023.01); *B64U 70/92* (2023.01); *B64U 70/97* (2023.01); *B64U 70/99* (2023.01)

(58) Field of Classification Search
CPC ......... B64U 70/97; B64U 70/99; Y02T 10/70; Y02T 10/7072
See application file for complete search history.

(56) References Cited

U.S. PATENT DOCUMENTS

| | | | | | |
|---|---|---|---|---|---|
| 3,483,696 | A * | 12/1969 | Gilbert | B64C 27/08 | 416/157 R |
| 3,575,527 | A * | 4/1971 | Watanabe | F04D 29/052 | 416/169 R |
| 3,805,723 | A * | 4/1974 | Bernaerts | B63H 3/002 | 416/61 |
| 4,262,712 | A * | 4/1981 | Young | B67D 7/54 | 141/DIG. 1 |
| 4,865,248 | A * | 9/1989 | Barth | E05B 35/086 | 312/215 |
| 4,954,962 | A * | 9/1990 | Evans, Jr. | G05D 1/0246 | 701/28 |
| 5,040,116 | A * | 8/1991 | Evans, Jr. | G05D 1/0246 | 701/28 |
| 5,116,273 | A * | 5/1992 | Chan | A45B 23/00 | 160/370.21 |
| 5,283,739 | A * | 2/1994 | Summerville | G05D 1/0289 | 700/255 |
| 5,371,581 | A * | 12/1994 | Wangler | G01S 17/933 | 340/963 |
| 5,386,462 | A * | 1/1995 | Schlamp | G07F 11/62 | 379/93.12 |
| 5,452,374 | A * | 9/1995 | Cullen | G06T 7/70 | 382/296 |
| 5,497,236 | A * | 3/1996 | Wolff | H04N 1/047 | 358/406 |
| 5,731,884 | A * | 3/1998 | Inoue | H04N 1/4076 | 358/3.06 |
| 5,842,667 | A * | 12/1998 | Jones | B64F 1/00 | 244/114 R |
| 5,847,522 | A * | 12/1998 | Barba | H02K 7/1025 | 318/269 |
| 5,901,253 | A * | 5/1999 | Tretter | G06T 3/606 | 382/292 |
| 5,995,898 | A * | 11/1999 | Tuttle | G07C 5/085 | 427/255.31 |
| 6,031,612 | A * | 2/2000 | Shirley | G01B 11/2531 | 356/511 |
| 6,073,283 | A * | 6/2000 | Zheng | A47G 9/062 | 5/502 |
| 6,079,668 | A * | 6/2000 | Brown | B64F 1/36 | 244/114 R |
| 6,266,577 | B1 * | 7/2001 | Popp | B25J 9/1682 | 700/248 |
| 6,344,796 | B1 * | 2/2002 | Ogilvie | G07C 9/27 | 340/568.1 |
| 6,374,155 | B1 * | 4/2002 | Wallach | G05D 1/0295 | 701/25 |
| 6,426,699 | B1 * | 7/2002 | Porter | A47F 10/00 | 340/568.1 |
| 6,507,670 | B1 * | 1/2003 | Moed | G06T 5/77 | 382/172 |
| 6,543,983 | B1 * | 4/2003 | Felder | B23Q 7/1442 | 414/389 |
| 6,636,781 | B1 * | 10/2003 | Shen | B25J 9/065 | 703/2 |
| 6,676,460 | B1 * | 1/2004 | Motsenbocker | B63H 5/165 | 440/71 |
| 6,690,997 | B2 * | 2/2004 | Rivalto | G06Q 10/0835 | 700/242 |
| 6,694,217 | B2 * | 2/2004 | Bloom | G07C 9/21 | 700/242 |
| 6,705,523 | B1 * | 3/2004 | Stamm | G06Q 10/08 | 235/383 |
| 6,804,607 | B1 * | 10/2004 | Wood | G05D 1/1062 | 340/425.5 |
| 6,919,803 | B2 * | 7/2005 | Breed | G08B 29/181 | 340/568.1 |
| 6,954,290 | B1 * | 10/2005 | Braudaway | H04N 1/00045 | 358/488 |
| 6,961,711 | B1 * | 11/2005 | Chee | G07F 7/00 | 705/26.1 |
| 6,965,440 | B1 * | 11/2005 | Nakagiri | G06F 3/1262 | 715/251 |
| 6,970,838 | B1 * | 11/2005 | Kamath | G06Q 30/0617 | 705/26.81 |
| 7,006,952 | B1 * | 2/2006 | Matsumoto | G06F 7/60 | 703/2 |
| 7,016,536 | B1 * | 3/2006 | Ling | G06V 30/15 | 382/290 |
| 7,031,519 | B2 * | 4/2006 | Elmenhurst | G06F 18/254 | 382/101 |
| 7,082,883 | B1 * | 8/2006 | Arias | A47C 31/11 | 108/90 |
| 7,129,817 | B2 * | 10/2006 | Yamagishi | G07C 9/37 | 340/5.71 |
| 7,133,743 | B2 * | 11/2006 | Tilles | G07F 17/13 | 700/242 |
| 7,145,699 | B2 * | 12/2006 | Dolan | G06V 30/1478 | 358/452 |
| 7,149,611 | B2 * | 12/2006 | Beck | B64U 30/26 | 701/32.4 |
| 7,171,879 | B2 * | 2/2007 | Gass | B27G 21/00 | 83/477.1 |
| 7,188,513 | B2 * | 3/2007 | Wilson | G01N 1/2226 | 73/864.81 |
| 7,334,755 | B2 * | 2/2008 | Svoboda, Jr. | B64C 27/08 | 244/17.23 |
| 7,335,071 | B1 * | 2/2008 | Motsenbocker | B63H 23/30 | 440/71 |
| 7,337,686 | B2 * | 3/2008 | Sagi-Dolev | G01V 11/00 | 73/866 |
| 7,337,944 | B2 * | 3/2008 | Devar | A47G 29/16 | 232/19 |
| 7,339,993 | B1 * | 3/2008 | Brooks | H04N 21/440281 | 375/240.1 |
| 7,459,880 | B1 * | 12/2008 | Rosen | H01M 10/465 | 320/101 |
| 7,639,386 | B1 * | 12/2009 | Siegel | G06Q 40/03 | 358/1.18 |
| 7,668,404 | B2 * | 2/2010 | Adams | G06V 10/24 | 382/101 |
| 7,673,831 | B2 * | 3/2010 | Steele | F42B 12/365 | 244/1 TD |
| 7,685,953 | B2 * | 3/2010 | Giles | B63J 99/00 | 114/72 |
| 7,693,745 | B1 * | 4/2010 | Pomerantz | G07F 17/13 | 705/26.5 |
| 7,894,939 | B2 * | 2/2011 | Zini | G05D 1/028 | 700/245 |
| 7,925,375 | B2 * | 4/2011 | Schininger | G07F 11/54 | 700/214 |
| 7,946,526 | B2 * | 5/2011 | Zimet | B64U 30/24 | 244/17.23 |
| 7,946,530 | B1 * | 5/2011 | Talmage, Jr. | B64C 27/006 | 244/140 |
| 7,966,093 | B2 * | 6/2011 | Zhuk | G06N 3/008 | 706/50 |
| 8,015,023 | B1 * | 9/2011 | Lee | G06Q 10/08 | 700/226 |

(56) References Cited

U.S. PATENT DOCUMENTS

| | | | | |
|---|---|---|---|---|
| 8,052,081 | B2 * | 11/2011 | Olm | B64U 10/13 244/17.23 |
| 8,078,317 | B2 * | 12/2011 | Allinson | G07F 11/62 700/242 |
| 8,126,642 | B2 * | 2/2012 | Trepagnier | G05D 1/024 701/28 |
| 8,131,607 | B2 * | 3/2012 | Park | G06Q 10/047 705/28 |
| 8,145,351 | B2 * | 3/2012 | Schininger | G07F 9/009 221/12 |
| 8,195,328 | B2 * | 6/2012 | Mallett | G16H 40/67 221/102 |
| 8,245,469 | B2 * | 8/2012 | Rubel | E04B 5/48 52/223.6 |
| 8,256,172 | B2 * | 9/2012 | Benson | E04F 15/02183 52/489.1 |
| 8,286,236 | B2 * | 10/2012 | Jung | G06Q 50/18 713/168 |
| 8,412,588 | B1 * | 4/2013 | Bodell | G06Q 30/0643 706/919 |
| 8,418,959 | B2 * | 4/2013 | Kang | B64U 70/30 244/116 |
| 8,429,754 | B2 * | 4/2013 | Jung | H04L 9/40 726/21 |
| 8,511,606 | B1 * | 8/2013 | Lutke | B64U 80/40 320/109 |
| 8,599,027 | B2 * | 12/2013 | Sanchez | G01S 13/931 340/435 |
| 8,602,349 | B2 * | 12/2013 | Petrov | G05D 1/0866 244/17.23 |
| 8,639,400 | B1 * | 1/2014 | Wong | A63H 27/12 701/16 |
| 8,736,820 | B2 * | 5/2014 | Choe | G05D 1/024 356/9 |
| 8,752,166 | B2 * | 6/2014 | Jung | B33Y 50/02 700/95 |
| 8,791,790 | B2 * | 7/2014 | Robertson | G07C 9/20 455/411 |
| 8,874,301 | B1 * | 10/2014 | Rao | B60K 28/04 340/576 |
| 8,899,903 | B1 * | 12/2014 | Saad | B65G 67/00 320/109 |
| 8,948,914 | B2 * | 2/2015 | Zini | G05B 19/41895 700/258 |
| 8,956,100 | B2 * | 2/2015 | Davi | B60P 1/02 414/334 |
| 8,989,053 | B1 * | 3/2015 | Skaaksrud | H04W 4/80 370/255 |
| 9,033,285 | B2 * | 5/2015 | Iden | B61C 17/12 701/19 |
| 9,050,997 | B1 * | 6/2015 | Schramm | B62D 6/002 |
| 9,051,043 | B1 * | 6/2015 | Peeters | B64C 19/00 |
| 9,056,676 | B1 * | 6/2015 | Wang | B64U 70/93 |
| 9,079,587 | B1 * | 7/2015 | Rupp | G05D 1/0289 |
| 9,126,693 | B1 * | 9/2015 | Shi | G05D 1/0669 |
| 9,139,310 | B1 * | 9/2015 | Wang | G05D 1/102 |
| 9,163,909 | B2 * | 10/2015 | Chengalva | F41H 7/005 |
| 9,193,452 | B2 * | 11/2015 | Carreker | B64C 27/52 |
| 9,195,959 | B1 * | 11/2015 | Lopez | G06Q 30/0635 |
| 9,216,587 | B2 * | 12/2015 | Ando | B41J 29/38 |
| 9,216,857 | B1 * | 12/2015 | Kalyan | G06Q 10/087 |
| 9,235,213 | B2 * | 1/2016 | Villamar | B65G 1/1375 |
| 9,244,147 | B1 * | 1/2016 | Soundararajan | G06Q 10/0833 |
| 9,256,852 | B1 * | 2/2016 | Myllymaki | G06Q 10/083 |
| 9,261,578 | B2 * | 2/2016 | Im | G01S 5/02526 |
| 9,290,277 | B2 * | 3/2016 | You | B64U 50/34 |
| 9,321,531 | B1 * | 4/2016 | Takayama | B64D 47/06 |
| 9,336,635 | B2 * | 5/2016 | Robertson | G07C 9/00571 |
| 9,358,975 | B1 * | 6/2016 | Watts | G05D 1/0223 |
| 9,381,916 | B1 * | 7/2016 | Zhu | B60W 60/0027 |
| 9,387,928 | B1 * | 7/2016 | Gentry | B64U 50/39 |
| 9,397,518 | B1 * | 7/2016 | Theobald | B25J 5/005 |
| 9,404,761 | B2 * | 8/2016 | Meuleau | G01C 21/3453 |
| 9,409,644 | B2 * | 8/2016 | Stanek | G05D 1/0094 |
| 9,411,337 | B1 * | 8/2016 | Theobald | B25J 9/00 |
| 9,412,280 | B1 * | 8/2016 | Zwillinger | G08G 5/55 |
| 9,421,869 | B1 * | 8/2016 | Ananthanarayanan | B60L 5/005 |
| 9,436,183 | B2 * | 9/2016 | Thakur | G01C 21/3407 |
| 9,436,926 | B2 * | 9/2016 | Cousins | G05D 1/0246 |
| 9,446,858 | B2 * | 9/2016 | Hess | B64F 3/02 |
| 9,448,559 | B2 * | 9/2016 | Kojo | B60N 2/002 |
| 9,457,899 | B2 * | 10/2016 | Duffy | B64U 10/16 |
| 9,489,490 | B1 * | 11/2016 | Theobald | G16H 20/13 |
| 9,527,605 | B1 * | 12/2016 | Gentry | G05D 1/0094 |
| 9,535,421 | B1 * | 1/2017 | Canoso | G05D 1/0248 |
| 9,545,852 | B2 * | 1/2017 | Streett | B60L 53/12 |
| 9,551,989 | B2 * | 1/2017 | Scarlatti | G05D 1/00 |
| 9,561,941 | B1 * | 2/2017 | Watts | G05D 1/0268 |
| 9,563,201 | B1 * | 2/2017 | Tofte | H04N 23/90 |
| 9,568,335 | B2 * | 2/2017 | Thakur | G01C 21/3685 |
| 9,582,950 | B2 * | 2/2017 | Shimizu | H02J 7/47 |
| 9,589,448 | B1 * | 3/2017 | Schneider | F41H 9/10 |
| 9,600,645 | B2 * | 3/2017 | Fadell | H04L 67/12 |
| 9,619,776 | B1 * | 4/2017 | Ford | G06Q 10/08355 |
| 9,623,562 | B1 * | 4/2017 | Watts | B25J 9/1689 |
| 9,643,722 | B1 * | 5/2017 | Myslinski | G06Q 10/40 |
| 9,650,136 | B1 * | 5/2017 | Haskin | B64U 10/13 |
| 9,652,912 | B2 * | 5/2017 | Fadell | G06Q 10/08 |
| 9,656,805 | B1 * | 5/2017 | Evans | B64U 80/25 |
| 9,671,791 | B1 * | 6/2017 | Paczan | G05D 1/104 |
| 9,676,481 | B1 * | 6/2017 | Buchmueller | G05D 1/0094 |
| 9,677,564 | B1 * | 6/2017 | Woodworth | B64U 20/30 |
| 9,697,730 | B2 * | 7/2017 | Thakur | G08G 1/0112 |
| 9,718,564 | B1 * | 8/2017 | Beckman | B61L 15/0027 |
| 9,720,414 | B1 * | 8/2017 | Theobald | B25J 5/007 |
| 9,731,821 | B2 * | 8/2017 | Hoareau | G06Q 10/08 |
| 9,733,646 | B1 * | 8/2017 | Nusser | B65G 57/03 |
| 9,746,852 | B1 * | 8/2017 | Watts | G01S 17/86 |
| 9,746,853 | B2 * | 8/2017 | Scheepjens | G05D 1/0212 |
| 9,778,653 | B1 * | 10/2017 | McClintock | G06Q 10/08 |
| 9,783,075 | B2 * | 10/2017 | Henry | B60L 53/36 |
| 9,783,301 | B2 * | 10/2017 | Schliwa | B64D 11/0007 |
| 9,786,187 | B1 * | 10/2017 | Bar-Zeev | G06Q 10/08355 |
| 9,796,529 | B1 * | 10/2017 | Hoareau | G06Q 10/08 |
| 9,815,633 | B1 * | 11/2017 | Kisser | B65G 37/02 |
| 9,828,092 | B1 * | 11/2017 | Navot | B64U 10/14 |
| 9,858,604 | B2 * | 1/2018 | Apsley | G06Q 30/0635 |
| 9,886,035 | B1 * | 2/2018 | Watts | G05D 1/0251 |
| 9,896,204 | B1 * | 2/2018 | Willison | G05D 1/102 |
| 9,957,045 | B1 * | 5/2018 | Daly | B64U 50/19 |
| 9,959,771 | B1 * | 5/2018 | Carlson | G08G 5/57 |
| 9,974,612 | B2 * | 5/2018 | Pinter | A61B 5/741 |
| 10,011,352 | B1 * | 7/2018 | Dahlstrom | B05B 13/005 |
| 10,022,753 | B2 * | 7/2018 | Chelian | B07C 5/362 |
| 10,048,697 | B1 * | 8/2018 | Theobald | G05D 1/0282 |
| 10,099,561 | B1 * | 10/2018 | Ananthanarayanan | B60L 53/126 |
| 10,099,785 | B1 * | 10/2018 | Gonzalez | B64U 50/31 |
| 10,108,185 | B1 * | 10/2018 | Theobald | B25J 9/1687 |
| 10,112,712 | B1 * | 10/2018 | Gentry | B60L 53/51 |
| 10,137,984 | B1 * | 11/2018 | Flick | G05D 1/102 |
| 10,176,722 | B1 * | 1/2019 | Boyd | G08G 5/57 |
| 10,239,638 | B1 * | 3/2019 | Cohen | B64U 70/50 |
| 10,268,208 | B1 * | 4/2019 | Hopwood Thomas | G05D 1/0676 |
| 10,287,033 | B2 * | 5/2019 | Hu | B64F 1/02 |
| 10,310,501 | B2 * | 6/2019 | Greenberger | G05D 1/0027 |
| 10,418,830 | B1 * | 9/2019 | Parodi | H04B 3/60 |
| 10,434,885 | B2 * | 10/2019 | Antonini | B64C 25/52 |
| 10,467,685 | B1 * | 11/2019 | Brisson | G06Q 10/083 |
| 10,526,094 | B2 * | 1/2020 | Cheng | B64U 80/25 |
| 10,558,226 | B1 * | 2/2020 | Bigdeli | G06V 10/22 |
| 10,577,126 | B2 * | 3/2020 | Mozer | B64F 1/02 |
| 10,618,675 | B2 * | 4/2020 | Conyers | H02S 99/00 |
| 10,640,234 | B1 * | 5/2020 | Douglas | B64U 50/37 |
| 10,719,080 | B2 * | 7/2020 | Zhang | B64C 39/024 |
| 10,745,102 | B2 * | 8/2020 | Nysæter | B64U 30/20 |
| 10,745,132 | B1 * | 8/2020 | Kimchi | B64D 3/00 |
| 10,780,988 | B2 * | 9/2020 | Buchmueller | B64U 50/19 |
| D903,576 | S * | 12/2020 | Feldman | D12/345 |
| 10,860,115 | B1 * | 12/2020 | Tran | G06F 3/0346 |

(56) References Cited

U.S. PATENT DOCUMENTS 10,875,648 B2 * 12/2020 Schmalzried ............ B64D 1/22
10,899,436 B2 * 1/2021 Gentry .................. B64C 25/001
10,967,970 B2 * 4/2021 Van Niekerk .......... B64U 20/87
11,007,290 B2 * 5/2021 Kreitenberg .............. A61L 2/24
11,079,752 B1 * 8/2021 Lombardini ........ F41H 13/0018
11,111,033 B1 * 9/2021 Burks .................... B64U 50/19
D932,369 S * 10/2021 Passley ........................ D12/16.1
11,148,805 B2 * 10/2021 Cooper .................. B64U 70/97
11,148,808 B2 * 10/2021 Wiggerich ............. B64U 30/26
11,164,149 B1 * 11/2021 Williams ......... G06K 19/06028
11,180,253 B1 * 11/2021 Seeley ................... B64U 60/50
11,235,890 B1 * 2/2022 Dahlstrom ............ B05B 13/005
11,292,620 B1 * 4/2022 Molony ................... B64G 1/52
11,370,561 B2 * 6/2022 Ratajczak ................ G08G 5/55
11,459,117 B1 * 10/2022 Shapiro .................... G08G 5/54
11,511,886 B1 * 11/2022 Tian .......................... B60P 3/11
11,534,801 B2 * 12/2022 Volta ....................... B66F 9/063
11,572,197 B1 * 2/2023 Nevdahs ................ B64U 50/19
11,597,515 B2 * 3/2023 Passley ................... B64F 1/007
11,597,516 B1 * 3/2023 Klinkmueller ......... B64U 70/20
11,603,218 B2 * 3/2023 Fisher ..................... B64F 1/222
11,603,219 B2 * 3/2023 Ratajczak ................ G05D 1/46
11,619,952 B2 * 4/2023 Kwon .................. G05D 1/0808 701/3
11,628,932 B2 * 4/2023 Seung .................... B64U 60/50 244/17.23
11,636,771 B2 * 4/2023 Barker .................... B64F 1/222 701/16
11,641,966 B2 * 5/2023 Nakanishi ............ A47G 29/124 232/44
11,649,050 B1 * 5/2023 Miller .................. G05D 1/0808 701/11
11,667,402 B2 * 6/2023 Liske ..................... B64U 50/19 244/116
11,673,690 B2 * 6/2023 Dayan .................... B64U 70/97 244/114 R
11,710,092 B2 * 7/2023 Dearing ............. G07C 9/00896 705/330
11,713,136 B2 * 8/2023 Foggia ................... B64U 70/95 244/114 R
11,714,189 B2 * 8/2023 Padmanabhan ......... G01S 19/51 342/22
11,738,867 B2 * 8/2023 Ehasoo ................... B60L 53/00 244/17.11
11,741,422 B2 * 8/2023 Gil ................... G06Q 10/08355 705/338
11,748,688 B2 * 9/2023 Ur ......................... B64C 39/024 705/332
11,760,485 B2 * 9/2023 Wabnegger .............. H02G 1/02 244/121
11,767,129 B2 * 9/2023 Warwick ................. B64F 1/007 244/137.1
11,772,814 B2 * 10/2023 Dubois .................. B64U 70/83 244/110 E
11,776,136 B1 * 10/2023 Pachikov ............... B64U 10/13 244/17.23
11,780,606 B2 * 10/2023 Carthew ................ B64U 70/99 244/114 R
11,794,894 B2 * 10/2023 Brock .................... B64U 30/20
11,794,922 B1 * 10/2023 Twyford ................ B64U 80/25
11,808,580 B1 * 11/2023 Ebrahimi Afrouzi ........................ G01C 21/206
11,814,191 B2 * 11/2023 Cheng ..................... B64F 1/005
11,814,241 B2 * 11/2023 Tian .......................... B60P 3/11
D1,008,873 S * 12/2023 Lin ............................ D12/16.1
11,840,152 B2 * 12/2023 Fisher ..................... B60L 53/30
11,851,162 B1 * 12/2023 Daube ..................... B64C 19/00
11,851,209 B2 * 12/2023 Fisher ..................... B64F 1/005
11,858,662 B2 * 1/2024 Gil ......................... B64U 80/86
11,866,168 B2 * 1/2024 Cooper .................. B64U 70/97
11,868,146 B2 * 1/2024 Yasunaga ............. G05D 1/0094
11,873,116 B2 * 1/2024 Kozlenko ............... B64F 1/222
11,884,422 B2 * 1/2024 Lowe ..................... B64U 70/97
11,898,368 B2 * 2/2024 Blake ...................... B60L 53/30
11,900,823 B2 * 2/2024 Surace ..................... G08G 5/21
11,932,315 B2 * 3/2024 Hwang ..................... B64F 1/32
11,933,613 B2 * 3/2024 Michini ................. G05D 1/689
11,939,046 B1 * 3/2024 Berry ...................... B64C 39/02
11,939,057 B2 * 3/2024 Hamm ..................... B60Q 7/00
11,939,080 B2 * 3/2024 Cowden ................. B64U 80/30
11,939,083 B2 * 3/2024 Baklycki ................... B64F 1/36
11,986,115 B2 * 5/2024 Walsh ..................... B64F 1/362
12,017,553 B2 * 6/2024 Lowe ..................... B64U 70/97
12,020,582 B2 * 6/2024 Barker .................... B64F 1/222
12,059,089 B1 * 8/2024 Dunn ................... A47G 29/141
12,084,211 B2 * 9/2024 Li .......................... B64U 70/99
12,091,194 B2 * 9/2024 Wang ...................... B60L 53/30
12,099,370 B2 * 9/2024 Jourdan ............... G05D 1/0676
12,134,329 B2 * 11/2024 Todeschini ............ B64C 39/022
12,168,533 B1 * 12/2024 Hinman ................. B64U 70/97
12,172,777 B2 * 12/2024 Carthew ................ B64U 70/93
12,183,940 B2 * 12/2024 Bell ..................... G05D 1/0202
12,195,213 B2 * 1/2025 Qi .......................... B64U 70/97
12,227,318 B1 * 2/2025 Bata ....................... B64U 20/83
12,246,610 B2 * 3/2025 Altenhofen ............ B64U 70/97
12,275,318 B2 * 4/2025 Lowe ..................... B64U 70/97
12,280,901 B2 * 4/2025 Smith ..................... B64F 1/005
12,330,811 B2 * 6/2025 Fisher .................... B64U 70/80
12,378,002 B2 * 8/2025 Kozlenko ............... B64F 1/222
12,378,017 B2 * 8/2025 Woo ....................... B64U 70/97
12,415,635 B2 * 9/2025 Berthelet ............... B64U 70/97
2001/0045449 A1 * 11/2001 Shannon .................. G07C 9/21 232/19
2002/0016726 A1 * 2/2002 Ross ...................... G06Q 10/08 705/339
2002/0035450 A1 * 3/2002 Thackston ......... G05B 19/4099 703/1
2002/0072979 A1 * 6/2002 Sinha ................... G06Q 10/087 705/26.7
2002/0087375 A1 * 7/2002 Griffin ............... G06Q 10/0835 705/336
2002/0107751 A1 * 8/2002 Rajagopalan ...... G06Q 30/0627 705/26.7
2002/0111914 A1 * 8/2002 Terada ................... G06Q 30/02 705/60
2002/0116289 A1 * 8/2002 Yang ...................... G06Q 10/08 705/26.81
2002/0123930 A1 * 9/2002 Boyd ................. G06Q 30/0254 705/14.1
2002/0156645 A1 * 10/2002 Hansen ................... G07F 17/13 705/26.1
2003/0040980 A1 * 2/2003 Nakajima ............... G07F 17/13 705/26.8
2003/0072031 A1 * 4/2003 Kuwata .............. H04N 1/00188 358/1.15
2003/0121968 A1 * 7/2003 Miller ..................... G07F 17/13 235/375
2003/0141411 A1 * 7/2003 Pandya ................... B64F 1/366 244/114 R
2004/0002898 A1 * 1/2004 Kuhlmann ......... G06Q 30/0635 705/26.81
2004/0068416 A1 * 4/2004 Solomon .............. G05D 1/0088 446/454
2004/0112660 A1 * 6/2004 Johansson ............... B63B 27/19 180/167
2004/0160335 A1 * 8/2004 Reitmeier ........... A47J 31/4407 340/4.12
2004/0162638 A1 * 8/2004 Solomon .............. G05D 1/0088 700/247
2004/0256519 A1 * 12/2004 Ellis ........................ B64F 1/125 244/110 E
2004/0257199 A1 * 12/2004 Fitzgibbon ......... G07C 9/00182 340/5.71
2005/0061910 A1 * 3/2005 Wobben .................. B64C 29/00 244/17.23
2005/0068178 A1 * 3/2005 Lee ........................ G06Q 30/06 700/214
2005/0093865 A1 * 5/2005 Jia ............................ H04N 1/38 345/426

(56) References Cited

U.S. PATENT DOCUMENTS

2005/0102240 A1* 5/2005 Misra .................... G06Q 30/06 705/59
2005/0178894 A1* 8/2005 McGeer ................ B64U 70/70 244/63
2005/0244060 A1* 11/2005 Nagarajan ................ H04N 1/41 382/302
2005/0285934 A1* 12/2005 Carter .................... H04N 7/147 348/14.06
2006/0038067 A1* 2/2006 Dennis ...................... B64F 1/06 244/63
2006/0053534 A1* 3/2006 Mullen ................... F41H 7/005 2/456
2006/0118162 A1* 6/2006 Saelzer ..................... H02J 7/35 136/246
2006/0136237 A1* 6/2006 Spiegel .............. G06Q 10/0835 705/13
2006/0249622 A1* 11/2006 Steele .................... B64U 80/20 244/115
2006/0287829 A1* 12/2006 Pashko-Paschenko ..................... G08G 5/723 340/436
2007/0016496 A1* 1/2007 Bar ...................... G06Q 10/087 705/28
2007/0073552 A1* 3/2007 Hileman ................ G06Q 10/08 705/333
2007/0102565 A1* 5/2007 Speer ..................... B64U 10/20 244/2
2007/0150375 A1* 6/2007 Yang ...................... G06Q 10/08 705/26.81
2007/0170237 A1* 7/2007 Neff ..................... A47G 29/122 232/36
2007/0176432 A1* 8/2007 Rolt ........................ F03D 9/255 290/55
2007/0210953 A1* 9/2007 Abraham ................. G08G 5/57 342/36
2007/0233337 A1* 10/2007 Plishner ............... G05D 1/0295 701/23
2007/0244763 A1* 10/2007 Williams ............... G06Q 10/10 705/26.1
2007/0246601 A1* 10/2007 Layton .................... B64C 39/10 244/12.2
2007/0262195 A1* 11/2007 Bulaga ................... B64U 10/20 244/12.4
2007/0293978 A1* 12/2007 Wurman ............ G05B 19/4189 700/213
2008/0012697 A1* 1/2008 Smith .................... B60K 35/50 340/439
2008/0027591 A1* 1/2008 Lenser ................. G05D 1/0038 701/28
2008/0100258 A1* 5/2008 Ward .................. H01M 10/465 320/101
2008/0109246 A1* 5/2008 Russell .................. G06Q 10/04 414/800
2008/0111816 A1* 5/2008 Abraham ............... G06Q 30/06 345/420
2008/0141921 A1* 6/2008 Hinderks .................. F01L 3/22 114/274
2008/0150679 A1* 6/2008 Bloomfield ............. B60R 25/24 340/5.72
2008/0154659 A1* 6/2008 Bettes .................... G06Q 10/08 705/7.36
2008/0167817 A1* 7/2008 Hessler ................ G01C 21/005 701/514
2008/0184906 A1* 8/2008 Kejha .................... B64D 27/33 102/374
2008/0189012 A1* 8/2008 Kaufmann ........... B62D 15/025 701/41
2008/0217486 A1* 9/2008 Colten ................... B64U 10/25 244/45 R
2008/0301009 A1* 12/2008 Plaster ................. G06Q 10/087 705/28
2009/0027253 A1* 1/2009 van Tooren .............. G08G 5/59 342/29
2009/0057486 A1* 3/2009 Becht, IV ............... B64F 1/007 244/114 R
2009/0062974 A1* 3/2009 Tamamoto ........... G05D 1/0295 701/25
2009/0063166 A1* 3/2009 Palmer ................... B65D 19/42 211/133.4
2009/0079388 A1* 3/2009 Reddy ................ G06Q 30/0283 320/109
2009/0086275 A1* 4/2009 Liang ..................... G06V 10/25 358/3.21
2009/0091435 A1* 4/2009 Bolourchi ............ B60K 28/066 340/575
2009/0106124 A1* 4/2009 Yang .................. G06Q 30/0601 705/26.1
2009/0149985 A1* 6/2009 Chirnomas ............. G07F 11/26 705/26.1
2009/0164379 A1* 6/2009 Jung ...................... G06Q 10/06 705/310
2009/0165127 A1* 6/2009 Jung ...................... G06Q 10/06 726/21
2009/0216394 A1* 8/2009 Heppe .................... B64U 20/87 701/16
2009/0236470 A1* 9/2009 Goossen ................ B64U 70/80 244/115
2009/0254457 A1* 10/2009 Folsom ............. G06Q 30/0601 705/26.1
2009/0254482 A1* 10/2009 Vadlamani .............. G06F 21/10 705/59
2009/0299903 A1* 12/2009 Hung ..................... G06Q 20/40 235/462.11
2009/0303507 A1* 12/2009 Abeloe .................. B33Y 30/00 358/1.9
2009/0314883 A1* 12/2009 Arlton .................... B64U 80/40 244/63
2010/0007479 A1* 1/2010 Smith ................... B60W 50/14 340/576
2010/0030608 A1* 2/2010 Kaminsky .............. G06Q 10/10 707/E17.014
2010/0031351 A1* 2/2010 Jung ....................... G06F 21/10 700/98
2010/0038480 A1* 2/2010 Wu ........................... B64F 1/26 244/114 B
2010/0088163 A1* 4/2010 Davidson ............... G06Q 10/08 340/425.5
2010/0088175 A1* 4/2010 Lundquist .......... G06Q 30/0234 705/26.1
2010/0100269 A1* 4/2010 Ekhaguere ............... G08G 5/74 701/26
2010/0169185 A1* 7/2010 Cottingham .............. G06F 3/01 715/708
2010/0170993 A1* 7/2010 Misegades ................ B64C 7/00 244/130
2010/0206145 A1* 8/2010 Tetelbaum ........... B23D 59/001 83/13
2010/0287065 A1* 11/2010 Alivandi ................ G06Q 30/02 705/26.1
2010/0299067 A1* 11/2010 McCollough ............ G08G 5/51 701/301
2010/0299222 A1* 11/2010 Hamilton, IV ........ G06Q 20/12 705/26.1
2010/0320313 A1* 12/2010 Hanafin .................. B64F 1/125 244/114 R
2011/0035149 A1* 2/2011 McAndrew ............. B64C 19/00 701/466
2011/0068224 A1* 3/2011 Kang ..................... B64U 70/30 244/116
2011/0074570 A1* 3/2011 Feldstein ............. G08B 13/196 348/E7.087
2011/0087350 A1* 4/2011 Fogel ...................... G06F 30/10 700/98
2011/0112761 A1* 5/2011 Hurley ................... G06Q 10/08 701/465
2011/0153052 A1* 6/2011 Pettibone ................ G06F 30/13 700/98

(56) References Cited

U.S. PATENT DOCUMENTS

2011/0166707 A1* 7/2011 Romanov ................. G01S 5/16 700/255
2011/0174925 A1* 7/2011 Ying ....................... B64F 1/005 701/16
2011/0178711 A1* 7/2011 Christoph ................. G01S 7/51 701/301
2011/0210866 A1* 9/2011 David .................... G08G 1/166 340/901
2011/0227435 A1* 9/2011 Maeda .................... B60L 50/16 310/77
2011/0246331 A1* 10/2011 Luther ............... G06Q 30/0627 705/26.63
2011/0253831 A1* 10/2011 Cheng .................... A63H 27/12 244/17.11
2011/0264311 A1* 10/2011 Lee ........................ H04N 7/183 348/E7.085
2011/0282476 A1* 11/2011 Hegemier .......... G06Q 30/0621 705/26.5
2011/0301787 A1* 12/2011 Chaperon ............. A63H 27/12 701/2
2011/0313878 A1* 12/2011 Norman .................. G06F 30/12 705/26.5
2012/0039694 A1* 2/2012 Suzanne ................... E04H 5/02 414/339
2012/0078592 A1* 3/2012 Sims, Jr. ................. G06F 30/00 703/1
2012/0080556 A1* 4/2012 Root, Jr. ................... B64F 1/06 73/170.28
2012/0091260 A1* 4/2012 Callou ................ G05D 1/0858 244/17.13
2012/0109419 A1* 5/2012 Mercado ............ G07C 9/00896 701/2
2012/0219397 A1* 8/2012 Baker .................. B65G 1/1373 414/796
2012/0221438 A1* 8/2012 Cook, Jr. ........... G06Q 30/0641 705/26.61
2012/0227389 A1* 9/2012 Hinderks .............. F02B 75/002 60/317
2012/0229325 A1* 9/2012 Dutruc ...................... G01S 7/03 342/29
2012/0234969 A1* 9/2012 Savoye .................. B64U 10/13 244/17.11
2012/0235606 A1* 9/2012 Takeuchi ............... H02K 7/116 318/371
2012/0323365 A1* 12/2012 Taylor .................. G05D 1/0225 901/1
2013/0006739 A1* 1/2013 Horvitz .............. G06Q 30/0222 705/14.23
2013/0073477 A1* 3/2013 Grinberg ................ G06Q 30/00 705/332
2013/0081245 A1* 4/2013 Vavrina ................... B60L 53/51 29/281.1
2013/0093582 A1* 4/2013 Walsh .................... G08G 1/166 340/436
2013/0126611 A1* 5/2013 Kangas .............. G06K 7/10178 235/385
2013/0148123 A1* 6/2013 Hayashi ................ G03F 9/7046 356/401
2013/0193269 A1* 8/2013 Zwaan ................... B64U 20/87 244/118.1
2013/0206915 A1* 8/2013 Desaulniers ........... B64U 10/20 244/165
2013/0218446 A1* 8/2013 Bradley ................. G06Q 10/00 701/123
2013/0218799 A1* 8/2013 Lehmann ............. G06Q 10/063 705/337
2013/0233964 A1* 9/2013 Woodworth ........... B64U 10/60 244/175
2013/0261792 A1* 10/2013 Gupta .................... G05B 15/02 700/232
2013/0262252 A1* 10/2013 Lakshman ............. G06Q 30/06 705/26.1
2013/0262276 A1* 10/2013 Wan ....................... G06Q 10/00 705/28
2013/0262336 A1* 10/2013 Wan ..................... G06Q 10/087 705/339
2013/0264381 A1* 10/2013 Kim ........................ G07F 17/13 232/24
2013/0320133 A1* 12/2013 Ratti ..................... B64C 33/025 244/22
2013/0324164 A1* 12/2013 Vulcano .................. H04W 4/02 455/457
2013/0332062 A1* 12/2013 Kreitmair-Steck ...... G08G 5/80 701/301
2013/0344778 A1* 12/2013 Schafer ................... B24B 41/02 451/294
2014/0010656 A1* 1/2014 Nies ...................... F03D 7/0244 29/889
2014/0025230 A1* 1/2014 Levien ................... A63H 27/12 701/2
2014/0030444 A1* 1/2014 Swaminathan ......... C23C 16/48 427/569
2014/0031964 A1* 1/2014 Sidhu ............... G05B 19/41865 700/99
2014/0032034 A1* 1/2014 Raptopoulos ............ G08G 5/55 701/25
2014/0040065 A1* 2/2014 DuBois .............. G06Q 30/0621 705/26.5
2014/0052661 A1* 2/2014 Shakes ............... G06Q 10/0836 705/339
2014/0058959 A1* 2/2014 Isbjornssund ........ G06Q 50/184 705/310
2014/0081445 A1* 3/2014 Villamar ................ G06Q 10/08 701/19
2014/0089073 A1* 3/2014 Jacobs ................ G06Q 20/326 705/16
2014/0124619 A1* 5/2014 McGeer .................... B64F 1/02 244/110 F
2014/0124621 A1* 5/2014 Godzdanker ........... B64F 1/125 244/110 E
2014/0136282 A1* 5/2014 Fedele ................... G06Q 10/06 705/7.31
2014/0136414 A1* 5/2014 Abhyanker ............ G06Q 10/08 701/25
2014/0149244 A1* 5/2014 Abhyanker ........ G06Q 30/0605 705/26.2
2014/0156053 A1* 6/2014 Mahdavi ............... B29C 64/112 700/119
2014/0180914 A1* 6/2014 Abhyanker ........ G06Q 10/0832 705/332
2014/0200697 A1* 7/2014 Cheng .................... G06Q 30/06 700/98
2014/0214684 A1* 7/2014 Pell ........................ G06Q 30/02 705/57
2014/0244433 A1* 8/2014 Cruz ....................... G06T 7/001 705/26.8
2014/0254896 A1* 9/2014 Zhou .................. G06Q 20/3829 705/16
2014/0257595 A1* 9/2014 Tillmann ............... B64U 10/14 701/2
2014/0271200 A1* 9/2014 Sutton ..................... B64C 27/33 29/889
2014/0283104 A1* 9/2014 Nilsson .............. H04N 1/32117 726/26
2014/0309813 A1* 10/2014 Ricci ...................... G06V 20/59 701/1
2014/0319272 A1* 10/2014 Casado Magana ..... B60L 58/10 244/110 E
2014/0325218 A1* 10/2014 Shimizu .................. H04L 12/10 713/168
2014/0330456 A1* 11/2014 Lopez Morales ........................... G06Q 10/08355 701/3
2015/0006005 A1* 1/2015 Yu .......................... G05D 1/667 701/22
2015/0066178 A1* 3/2015 Stava ...................... B22F 10/47 700/98

(56) References Cited

U.S. PATENT DOCUMENTS

2015/0069968 A1* 3/2015 Pounds .................. B60L 53/16 320/109
2015/0097530 A1* 4/2015 Scarlatti .................. B60L 53/35 320/109
2015/0098819 A1* 4/2015 Tourin ................ G01M 5/0091 416/61
2015/0102154 A1* 4/2015 Duncan ................ G05D 1/0094 701/300
2015/0112837 A1* 4/2015 O'Dea ............... G06Q 30/0613 705/26.41
2015/0112885 A1* 4/2015 Fadell .................. G08B 29/185 705/330
2015/0120094 A1* 4/2015 Kimchi .................. B64U 50/19 701/3
2015/0120602 A1* 4/2015 Huffman .............. G06Q 10/083 700/214
2015/0123462 A1* 5/2015 Kamradt .................. B67D 7/02 141/192
2015/0127712 A1* 5/2015 Fadell .................. G06Q 10/083 709/202
2015/0129716 A1* 5/2015 Yoffe .................... B64F 1/0297 244/110 C
2015/0158587 A1* 6/2015 Patrick ..................... B64D 1/12 701/3
2015/0158599 A1* 6/2015 Sisko ........................ B64F 1/20 244/114 R
2015/0175276 A1* 6/2015 Koster ................... A47G 29/14 244/114 R
2015/0183528 A1* 7/2015 Walsh ....................... B64F 1/32 244/114 R
2015/0185034 A1* 7/2015 Abhyanker ........ G06Q 30/0645 701/23
2015/0191255 A1* 7/2015 Zolich ....................... B64F 1/16 340/946
2015/0202770 A1* 7/2015 Patron .................... B25J 9/0003 901/50
2015/0217860 A1* 8/2015 Yang ....................... B64C 25/32 244/102 R
2015/0227882 A1* 8/2015 Bhatt ................... G06Q 10/083 705/330
2015/0246727 A1* 9/2015 Masticola ............ G08B 29/145 701/2
2015/0253777 A1* 9/2015 Binney .................. G05D 1/243 701/28
2015/0254611 A1* 9/2015 Perez ............... G06Q 10/08355 705/5
2015/0259078 A1* 9/2015 Filipovic ................. H04W 4/38 244/114 R
2015/0286216 A1* 10/2015 Miwa .................. B64C 29/0025 701/4
2015/0314881 A1* 11/2015 Tsaliah ................. B64D 17/725 244/146
2015/0317597 A1* 11/2015 Shucker ............... G06Q 10/083 235/375
2015/0332206 A1* 11/2015 Trew .................... G06Q 10/083 705/330
2015/0336669 A1* 11/2015 Kantor ................. G01C 21/343 701/3
2015/0336670 A1* 11/2015 Zhang ..................... B29C 43/18 244/119
2015/0336677 A1* 11/2015 Smaoui ................... B60L 53/16 320/109
2015/0363843 A1* 12/2015 Loppatto ............ G06Q 30/0283 705/330
2015/0367850 A1* 12/2015 Clarke ............ B60W 30/18163 701/28
2015/0370251 A1* 12/2015 Siegel ...................... B64D 1/22 701/2
2016/0001877 A1* 1/2016 Paulos ................... B64U 30/29 701/3
2016/0001883 A1* 1/2016 Sanz ...................... B64U 30/20 244/17.23
2016/0003637 A1* 1/2016 Andersen ............. G01C 21/362 701/519
2016/0009413 A1* 1/2016 Lee .......................... G08G 5/57 701/16
2016/0011592 A1* 1/2016 Zhang .................... B64U 70/97 244/114 R
2016/0019495 A1* 1/2016 Kolchin ............. G06Q 10/0833 705/333
2016/0023761 A1* 1/2016 McNally .............. G05D 1/0094 701/3
2016/0033966 A1* 2/2016 Farris ..................... G01C 21/20 701/16
2016/0039541 A1* 2/2016 Beardsley ............... B60L 53/14 701/2
2016/0051110 A1* 2/2016 Cao ......................... A47L 9/009 15/324
2016/0058181 A1* 3/2016 Han ..................... H04N 23/661 312/236
2016/0068264 A1* 3/2016 Ganesh .................... G08G 5/55 701/4
2016/0068265 A1* 3/2016 Hoareau ................ G06Q 10/08 701/3
2016/0068267 A1* 3/2016 Liu ........................ G05D 1/042 701/4
2016/0070265 A1* 3/2016 Liu ........................ G05D 1/102 701/25
2016/0085238 A1* 3/2016 Hayes ...................... G08G 5/22 701/4
2016/0101856 A1* 4/2016 Kohstall .............. G05D 1/0669 244/17.23
2016/0104099 A1* 4/2016 Villamar ................ G06Q 10/08 705/26.81
2016/0104113 A1* 4/2016 Gorlin .............. G06Q 10/08355 705/338
2016/0107750 A1* 4/2016 Yates ..................... B64U 10/25 244/2
2016/0114488 A1* 4/2016 Mascorro Medina ....................... B25J 9/1697 901/1
2016/0117931 A1* 4/2016 Chan ........................ G08G 5/56 701/120
2016/0125746 A1* 5/2016 Kunzi ...................... G08G 5/80 701/11
2016/0129592 A1* 5/2016 Saboo .................... B25J 19/021 700/248
2016/0130000 A1* 5/2016 Rimanelli .............. B64U 20/50 244/2
2016/0130015 A1* 5/2016 Caubel .................. B64C 27/001 244/120
2016/0131025 A1* 5/2016 Pekrul ..................... F02B 53/10 123/205
2016/0132059 A1* 5/2016 Mason ................. G05D 1/0234 701/28
2016/0144734 A1* 5/2016 Wang .................. B64C 29/0016 701/17
2016/0144982 A1* 5/2016 Sugumaran ............. B64C 25/32 244/108
2016/0180618 A1* 6/2016 Ho ..................... G07C 9/00563 340/5.52
2016/0185466 A1* 6/2016 Dreano, Jr. .......... G06Q 10/083 705/26.81
2016/0194959 A1* 7/2016 Pekrul ..................... F01C 19/06 418/146
2016/0196755 A1* 7/2016 Navot .................. G05D 1/0676 701/4
2016/0196756 A1* 7/2016 Prakash ................. B64U 80/25 701/3
2016/0200438 A1* 7/2016 Bokeno .................. G05D 1/102 244/2
2016/0207627 A1* 7/2016 Hoareau .................. B64D 1/02
2016/0214717 A1* 7/2016 De Silva .................. B64D 5/00
2016/0214728 A1* 7/2016 Rossi ................... B64U 30/291
2016/0221671 A1* 8/2016 Fisher ..................... B64U 30/26
2016/0229299 A1* 8/2016 Streett ..................... B60L 53/12
2016/0229530 A1* 8/2016 Welsh ..................... B64U 30/24
2016/0235236 A1* 8/2016 Byers ..................... A47G 29/14

(56) References Cited

U.S. PATENT DOCUMENTS

| | | | | |
|---|---|---|---|---|
| 2016/0239789 | A1* | 8/2016 | Hanks | G06Q 30/04 |
| 2016/0239803 | A1* | 8/2016 | Borley | G06Q 10/0833 |
| 2016/0244162 | A1* | 8/2016 | Weller | B64U 10/13 |
| 2016/0244187 | A1* | 8/2016 | Byers | A47G 29/14 |
| 2016/0257401 | A1* | 9/2016 | Buchmueller | G01C 21/343 |
| 2016/0257423 | A1* | 9/2016 | Martin | A47G 29/14 |
| 2016/0257424 | A1* | 9/2016 | Stabler | A63H 27/12 |
| 2016/0257426 | A1* | 9/2016 | Mozer | B64U 70/30 |
| 2016/0258775 | A1* | 9/2016 | Santilli | G06Q 10/0833 |
| 2016/0266578 | A1* | 9/2016 | Douglas | G05D 1/0027 |
| 2016/0272317 | A1* | 9/2016 | Cho | B64F 1/222 |
| 2016/0280371 | A1* | 9/2016 | Canavor | H04W 4/029 |
| 2016/0282126 | A1* | 9/2016 | Watts | G06Q 10/08 |
| 2016/0286128 | A1* | 9/2016 | Zhou | H04N 23/698 |
| 2016/0291445 | A1* | 10/2016 | Fisher, Sr. | F16M 11/10 |
| 2016/0299233 | A1* | 10/2016 | Levien | G08G 5/53 |
| 2016/0304198 | A1* | 10/2016 | Jourdan | G08G 5/55 |
| 2016/0304217 | A1* | 10/2016 | Fisher | B60L 53/00 |
| 2016/0307448 | A1* | 10/2016 | Salnikov | A01C 21/00 |
| 2016/0311329 | A1* | 10/2016 | Rodriguez | B60L 53/30 |
| 2016/0321503 | A1* | 11/2016 | Zhou | G05D 1/0011 |
| 2016/0334229 | A1* | 11/2016 | Ross | G05D 1/0027 |
| 2016/0340006 | A1* | 11/2016 | Tang | B63C 9/01 |
| 2016/0340021 | A1* | 11/2016 | Zhang | B64C 27/006 |
| 2016/0355261 | A1* | 12/2016 | Chin | B64U 70/20 |
| 2016/0364660 | A1* | 12/2016 | Brown | G01C 21/20 |
| 2016/0364679 | A1* | 12/2016 | Cao | G06Q 10/083 |
| 2016/0364823 | A1* | 12/2016 | Cao | G06Q 50/40 |
| 2016/0364989 | A1* | 12/2016 | Speasl | G08G 5/32 |
| 2016/0371984 | A1* | 12/2016 | Macfarlane | G05D 1/106 |
| 2016/0378108 | A1* | 12/2016 | Paczan | G06Q 10/083 705/330 |
| 2017/0011333 | A1* | 1/2017 | Greiner | G06K 7/10722 |
| 2017/0011340 | A1* | 1/2017 | Gabbai | G05D 1/667 |
| 2017/0015415 | A1* | 1/2017 | Chan | G06Q 30/04 |
| 2017/0021923 | A1* | 1/2017 | Fisher | B64U 70/97 |
| 2017/0021941 | A1* | 1/2017 | Fisher | G05D 1/0011 |
| 2017/0021942 | A1* | 1/2017 | Fisher | B64U 70/80 |
| 2017/0023949 | A1* | 1/2017 | Fisher | G08G 5/55 |
| 2017/0032315 | A1* | 2/2017 | Gupta | G06Q 10/08 |
| 2017/0050749 | A1* | 2/2017 | Pilskalns | B60L 53/37 |
| 2017/0073085 | A1* | 3/2017 | Tremblay | B64F 1/007 |
| 2017/0081043 | A1* | 3/2017 | Jones | B64C 37/02 |
| 2017/0087999 | A1* | 3/2017 | Miller | B60L 53/60 |
| 2017/0096222 | A1* | 4/2017 | Spinelli | B64U 80/25 |
| 2017/0100837 | A1* | 4/2017 | Zevenbergen | G05D 1/0225 |
| 2017/0113352 | A1* | 4/2017 | Lutz | B25J 9/1682 |
| 2017/0117676 | A1* | 4/2017 | James | B64U 80/70 |
| 2017/0121023 | A1* | 5/2017 | High | B64D 9/00 |
| 2017/0129464 | A1* | 5/2017 | Wang | B60L 53/80 |
| 2017/0129603 | A1* | 5/2017 | Raptopoulos | B64F 1/22 |
| 2017/0132558 | A1* | 5/2017 | Perez | G06Q 10/083 |
| 2017/0137118 | A1* | 5/2017 | Gentry | B64D 1/02 |
| 2017/0137150 | A1* | 5/2017 | Conyers | B60K 1/02 |
| 2017/0144776 | A1* | 5/2017 | Fisher | B64C 39/024 |
| 2017/0147975 | A1* | 5/2017 | Natarajan | G06Q 10/0832 |
| 2017/0152060 | A1* | 6/2017 | Morisawa | B64U 50/23 |
| 2017/0154347 | A1* | 6/2017 | Bateman | G06Q 10/067 |
| 2017/0158352 | A1* | 6/2017 | von Flotow | B64F 1/0295 |
| 2017/0158353 | A1* | 6/2017 | Schmick | B60L 53/12 |
| 2017/0166327 | A1* | 6/2017 | Schmidt | B64F 1/007 |
| 2017/0167881 | A1* | 6/2017 | Rander | B60W 60/0016 |
| 2017/0174335 | A1* | 6/2017 | Malloy | B64D 35/021 |
| 2017/0190443 | A1* | 7/2017 | Fisher | B64F 1/005 |
| 2017/0193442 | A1* | 7/2017 | Ekkel | G06Q 10/083 |
| 2017/0197725 | A1* | 7/2017 | Foo | B64U 70/97 |
| 2017/0199522 | A1* | 7/2017 | Li | G07C 5/0866 |
| 2017/0203632 | A1* | 7/2017 | Westendarp | B60H 1/00378 |
| 2017/0203857 | A1* | 7/2017 | O'Toole | B64F 1/32 |
| 2017/0225782 | A1* | 8/2017 | Kohstall | B64U 30/26 |
| 2017/0225783 | A1* | 8/2017 | Fisher | B64U 20/87 |
| 2017/0225799 | A1* | 8/2017 | Selwyn | B64F 1/005 |
| 2017/0225801 | A1* | 8/2017 | Bennett | B64U 70/90 |
| 2017/0225802 | A1* | 8/2017 | Lussier | B64F 1/007 |
| 2017/0240291 | A1* | 8/2017 | Kim | B64D 37/005 |
| 2017/0247120 | A1* | 8/2017 | Miller | B64U 80/25 |
| 2017/0253349 | A1* | 9/2017 | Wang | B64U 70/97 |
| 2017/0255896 | A1* | 9/2017 | Van Dyke | G06Q 10/0835 |
| 2017/0270314 | A1* | 9/2017 | Tsybrovskyy | H04W 12/06 |
| 2017/0275025 | A1* | 9/2017 | Johnson | B64F 1/12 |
| 2017/0283090 | A1* | 10/2017 | Miller | B64U 70/97 |
| 2017/0286905 | A1* | 10/2017 | Richardson | G06Q 10/0836 |
| 2017/0300855 | A1* | 10/2017 | Lund | B64F 5/10 |
| 2017/0305526 | A1* | 10/2017 | Thomassey | B64C 27/26 |
| 2017/0305575 | A1* | 10/2017 | Bash | B64F 1/32 |
| 2017/0308850 | A1* | 10/2017 | Roush | G01C 21/343 |
| 2017/0313421 | A1* | 11/2017 | Gil | G06Q 10/0832 |
| 2017/0316379 | A1* | 11/2017 | Lepek | G06Q 10/047 |
| 2017/0316701 | A1* | 11/2017 | Gil | G06Q 10/0832 |
| 2017/0323129 | A1* | 11/2017 | Davidson | G05D 1/0234 |
| 2017/0327091 | A1* | 11/2017 | Capizzo | B60L 53/68 |
| 2017/0330145 | A1* | 11/2017 | Studnicka | G07C 9/00896 |
| 2017/0341769 | A1* | 11/2017 | Haberbusch | F17C 5/007 |
| 2017/0345245 | A1* | 11/2017 | Torresani | H04W 4/80 |
| 2017/0372256 | A1* | 12/2017 | Kantor | G06Q 10/083 |
| 2018/0024554 | A1* | 1/2018 | Brady | B60W 60/00256 701/23 |
| 2018/0029723 | A1* | 2/2018 | Krauss | B64U 80/25 |
| 2018/0039286 | A1* | 2/2018 | Tirpak | G05D 1/042 |
| 2018/0053139 | A1* | 2/2018 | Stoman | B64U 10/13 |
| 2018/0056794 | A1* | 3/2018 | Kim | B60L 53/126 |
| 2018/0088586 | A1* | 3/2018 | Hance | G05D 1/0236 |
| 2018/0092345 | A1* | 4/2018 | Okumura | F41G 7/2253 |
| 2018/0092484 | A1* | 4/2018 | Lewis | G08G 5/54 |
| 2018/0105020 | A1* | 4/2018 | Smith | B60H 1/262 |
| 2018/0105271 | A1* | 4/2018 | Wypyszynski | B64U 10/13 |
| 2018/0105289 | A1* | 4/2018 | Walsh | A47G 29/141 |
| 2018/0118340 | A1* | 5/2018 | Russo | B64U 50/37 |
| 2018/0118374 | A1* | 5/2018 | Lombardini | B64F 3/02 |
| 2018/0127211 | A1* | 5/2018 | Jarvis | B65G 1/1373 |
| 2018/0137454 | A1* | 5/2018 | Kulkarni | G06Q 10/083 |
| 2018/0141682 | A1* | 5/2018 | Blake | B64U 70/97 |
| 2018/0148170 | A1* | 5/2018 | Stamatovski | B64U 80/25 |
| 2018/0194484 | A1* | 7/2018 | Livieratos | B64U 10/13 |
| 2018/0196418 | A1* | 7/2018 | Meier | G05D 1/0206 |
| 2018/0208070 | A1* | 7/2018 | Sanchez | B64U 10/13 |
| 2018/0233055 | A1* | 8/2018 | Damnjanovic | G08G 5/57 |
| 2018/0237161 | A1* | 8/2018 | Minnick | B64U 50/37 |
| 2018/0245365 | A1* | 8/2018 | Wankewycz | E04H 6/44 |
| 2018/0257775 | A1* | 9/2018 | Baek | B64U 30/26 |
| 2018/0265196 | A1* | 9/2018 | Phillips | B64F 1/20 |
| 2018/0265295 | A1* | 9/2018 | Beckman | G08G 5/57 |
| 2018/0265296 | A1* | 9/2018 | Beckman | B61D 3/16 |
| 2018/0295327 | A1* | 10/2018 | Yearwood | G06V 20/62 |
| 2018/0312276 | A1* | 11/2018 | Miller | B64U 10/14 |
| 2018/0319496 | A1* | 11/2018 | Zhang | B64U 20/50 |
| 2018/0327091 | A1* | 11/2018 | Burks | B64U 50/13 |
| 2018/0354649 | A1* | 12/2018 | Ortiz | G08B 13/1436 |
| 2018/0357910 | A1* | 12/2018 | Hobbs | G08G 5/54 |
| 2018/0360326 | A1* | 12/2018 | Lee | A61B 5/0245 |
| 2018/0364740 | A1* | 12/2018 | Collins | G05D 1/0684 |
| 2018/0370618 | A1* | 12/2018 | Harris | B64C 25/24 |
| 2018/0370652 | A1* | 12/2018 | Vendrame | B64F 1/007 |
| 2019/0002128 | A1* | 1/2019 | Raz | B60L 53/16 |
| 2019/0009926 | A1* | 1/2019 | Hu | B64F 1/02 |
| 2019/0016476 | A1* | 1/2019 | Scherz | H02J 7/70 |
| 2019/0023133 | A1* | 1/2019 | Renold | B60L 53/12 |
| 2019/0023416 | A1* | 1/2019 | Borko | G06F 3/041 |
| 2019/0028904 | A1* | 1/2019 | Carpenter | G08G 5/76 |
| 2019/0047462 | A1* | 2/2019 | Vijayaraghavan | B60P 3/11 |
| 2019/0051192 | A1* | 2/2019 | Schick | G08G 5/80 |
| 2019/0055018 | A1* | 2/2019 | Bei | B64U 70/92 |
| 2019/0100108 | A1* | 4/2019 | Davis | B64F 1/007 |
| 2019/0100313 | A1* | 4/2019 | Campbell | B64U 10/14 |
| 2019/0100330 | A1* | 4/2019 | Cheng | B64U 80/25 |
| 2019/0106224 | A1* | 4/2019 | Nishikawa | B64U 50/37 |
| 2019/0108472 | A1* | 4/2019 | Sweeney | G06Q 10/083 |
| 2019/0135403 | A1* | 5/2019 | Perry | B64U 10/25 |
| 2019/0152326 | A1* | 5/2019 | Nishikawa | B64U 50/19 |
| 2019/0161190 | A1* | 5/2019 | Gil | H04L 67/55 |
| 2019/0172358 | A1* | 6/2019 | Zhou | G06V 20/17 |
| 2019/0193952 | A1* | 6/2019 | Zevenbergen | B60L 53/12 |
| 2019/0217952 | A1* | 7/2019 | Zawadzki | B64D 1/02 |
| 2019/0217968 | A1* | 7/2019 | Schmidt | B64F 1/007 |

(56) References Cited

U.S. PATENT DOCUMENTS

2019/0233103 A1* 8/2019 High .................... A47G 29/141
2019/0233107 A1* 8/2019 Tian ........................ B64C 39/12
2019/0245365 A1* 8/2019 Farrahi Moghaddam .................. H02J 7/70
2019/0256201 A1* 8/2019 Plekhanov ............. B64U 20/40
2019/0256202 A1* 8/2019 Resnick ................. B64U 10/13
2019/0256207 A1* 8/2019 Nohmi ................. G05D 1/0866
2019/0258910 A1* 8/2019 Stoman ............ G06K 19/06028
2019/0263519 A1* 8/2019 Argus .................... B64D 31/06
2019/0270526 A1* 9/2019 Hehn ...................... H02J 7/731
2019/0283871 A1* 9/2019 Wieczorek ............. B64U 10/60
2019/0291961 A1* 9/2019 Urban ................... G06Q 50/40
2019/0308724 A1* 10/2019 Cooper .................. B64U 80/25
2019/0315235 A1* 10/2019 Kung ...................... B60L 53/36
2019/0315463 A1* 10/2019 Chen ....................... F24H 15/25
2019/0337407 A1* 11/2019 Wang ...................... B60L 53/31
2019/0348862 A1* 11/2019 Obayashi ................ H01F 27/02
2019/0375504 A1* 12/2019 Schmalzried ............ B64D 1/22
2019/0382134 A1* 12/2019 Baklycki ................... B64F 1/36
2019/0383052 A1* 12/2019 Blake ...................... B60L 53/30
2020/0003529 A1* 1/2020 Benezra ................. B64U 80/70
2020/0010214 A1* 1/2020 Newcomb ............... B60L 53/51
2020/0017218 A1* 1/2020 Ahmad .................... B64D 9/00
2020/0017237 A1* 1/2020 Walker ..................... G08G 5/54
2020/0031466 A1* 1/2020 Anderson .............. B64U 30/26
2020/0036243 A1* 1/2020 Zhao ...................... H02K 1/145
2020/0044463 A1* 2/2020 Kim ........................ H02J 7/731
2020/0055613 A1* 2/2020 Miller .................. G05D 1/0676
2020/0062373 A1* 2/2020 Liao ....................... B64U 10/16
2020/0094957 A1* 3/2020 Sohmshetty .............. B60P 3/11
2020/0108930 A1* 4/2020 Foley ..................... B64U 80/00
2020/0113167 A1* 4/2020 Bouten ................ A01C 23/008
2020/0148322 A1* 5/2020 Pekrul ...................... B63H 5/02
2020/0165008 A1* 5/2020 Krauss ................ G05D 1/0676
2020/0180940 A1* 6/2020 Rainville .................. B64F 1/28
2020/0189731 A1* 6/2020 Mistry .................. B64C 39/022
2020/0198803 A1* 6/2020 Zhou ...................... B64U 70/30
2020/0207484 A1* 7/2020 Foggia ................... B64U 80/10
2020/0207485 A1* 7/2020 Foggia ................... B64U 70/90
2020/0218287 A1* 7/2020 Wang ..................... B64U 50/34
2020/0218288 A1* 7/2020 Johnson ................. B64U 30/26
2020/0225684 A1* 7/2020 Anderson .............. B64U 70/95
2020/0231054 A1* 7/2020 Resnick ................... G08G 5/74
2020/0239160 A1* 7/2020 Cheng .................... B64U 70/99
2020/0247540 A1* 8/2020 Jones ....................... B64D 7/08
2020/0262583 A1* 8/2020 Ducharme ............. B64U 70/30
2020/0272144 A1* 8/2020 Yang ...................... B64U 10/14
2020/0284883 A1* 9/2020 Ferreira ................ G01S 7/4815
2020/0290752 A1* 9/2020 Kolosiuk ............... B64U 70/95
2020/0301445 A1* 9/2020 Jourdan ........... G06K 19/06037
2020/0307829 A1* 10/2020 Smith ..................... H02J 7/731
2020/0309489 A1* 10/2020 Kadavanich ............... F41J 9/08
2020/0310465 A1* 10/2020 Carthew ................ B64U 70/92
2020/0324898 A1* 10/2020 Youmans ............. G06V 20/176
2020/0346736 A1* 11/2020 Krasnoff ............. B64C 29/0033
2020/0346743 A1* 11/2020 Bernard .................. B64C 25/18
2020/0349852 A1* 11/2020 DiCosola ................. G08G 5/55
2020/0369384 A1* 11/2020 Kelly ..................... B64U 10/13
2020/0369408 A1* 11/2020 Dolata .................... B60L 53/16
2020/0398999 A1* 12/2020 Ortiz .................. G07C 9/00563
2020/0406773 A1* 12/2020 Lacaze .................... B60L 53/35
2021/0016696 A1* 1/2021 Kelly ........................ F16B 2/22
2021/0031947 A1* 2/2021 Wankewycz ............ B60L 53/51
2021/0045564 A1* 2/2021 Duckers .................. E06B 3/483
2021/0047055 A1* 2/2021 Lee .......................... B64F 1/22
2021/0053677 A1* 2/2021 Passley .................. B64U 70/95
2021/0070468 A1* 3/2021 Svirsky .................. B64U 80/25
2021/0074170 A1* 3/2021 Barker ...................... B64F 1/28
2021/0086913 A1* 3/2021 Friedman ................ B60L 53/30
2021/0089055 A1* 3/2021 Tran .................... G06N 3/0495
2021/0094686 A1* 4/2021 Metzner ............. G08B 13/1965
2021/0107682 A1* 4/2021 Kozlenko ............... B64F 1/222
2021/0107684 A1* 4/2021 Le Lann ................... B64F 1/26
2021/0114729 A1* 4/2021 Ragan ...................... B64D 9/00
2021/0122495 A1* 4/2021 Rezvani .................. B64F 1/007
2021/0125503 A1* 4/2021 Henry .................. G06V 20/647
2021/0127658 A1* 5/2021 Luebke ................... F16C 11/04
2021/0197983 A1* 7/2021 Wang ..................... B64U 80/10
2021/0214068 A1* 7/2021 Bry ........................ B64U 20/83
2021/0214102 A1* 7/2021 Geng ..................... B64U 70/97
2021/0224739 A1* 7/2021 Sweeny ............... G06Q 10/083
2021/0229805 A1* 7/2021 Getman .................. B64C 27/52
2021/0237694 A1* 8/2021 Hirschvogel .............. B60J 7/16
2021/0237899 A1* 8/2021 Warwick ................ B64F 1/007
2021/0253242 A1* 8/2021 Falk-Petersen ....... B64C 39/024
2021/0276735 A1* 9/2021 Raptopoulos ........ A47G 29/141
2021/0284335 A1* 9/2021 Mclaughlin ............. B64F 1/362
2021/0284356 A1* 9/2021 Jourdan .................... B64F 1/18
2021/0300591 A1* 9/2021 Tian ........................ B64F 1/007
2021/0309388 A1* 10/2021 Ratajczak .............. B64U 50/30
2021/0339842 A1* 11/2021 Sauer ................. B64C 29/0033
2021/0347500 A1* 11/2021 Hagan .................... B64U 10/13
2021/0349456 A1* 11/2021 Pham ................... G05D 1/0676
2021/0354820 A1* 11/2021 Hiller ...................... B60L 53/12
2021/0371128 A1* 12/2021 Rodriguez ........... A47G 29/141
2021/0394930 A1* 12/2021 O'Toole ............... A47G 29/141
2021/0405655 A1* 12/2021 Yi ........................... H04W 4/40
2022/0009647 A1* 1/2022 Johannesson .......... B64U 20/96
2022/0019247 A1* 1/2022 Dayan .................... G05D 1/104
2022/0024577 A1* 1/2022 Stamatovski ............. B64F 3/00
2022/0041279 A1* 2/2022 Rowse ................... G05D 1/104
2022/0041299 A1* 2/2022 Wankewycz ........... B64D 37/30
2022/0055745 A1* 2/2022 Walker ................... H02G 11/02
2022/0055770 A1* 2/2022 O'Toole ............... A47G 29/141
2022/0063798 A1* 3/2022 Johnson ................. B64C 37/02
2022/0073214 A1* 3/2022 Liske ..................... B64U 50/19
2022/0106125 A1* 4/2022 Ragan ....................... F16G 3/10
2022/0119105 A1* 4/2022 Schmalzried .......... B64U 10/20
2022/0162001 A1* 5/2022 Gherardi .............. B65G 1/1373
2022/0163980 A1* 5/2022 Beer ...................... G05D 1/228
2022/0169400 A1* 6/2022 Seeley ...................... B64C 1/20
2022/0169401 A1* 6/2022 Di Cosola ............. H02J 50/005
2022/0171388 A1* 6/2022 Yanagihashi .......... B65G 43/00
2022/0177124 A1* 6/2022 Marshall ................ B64U 10/20
2022/0177125 A1* 6/2022 Abdellatif .............. B64U 10/13
2022/0185501 A1* 6/2022 Kempley ............... B64U 70/70
2022/0234757 A1* 7/2022 Dayan .................... B64U 70/97
2022/0242589 A1* 8/2022 Pham .................... G09F 27/005
2022/0289376 A1* 9/2022 Hayakawa ............. G05D 1/101
2022/0306320 A1* 9/2022 Howe .................... B64U 70/70
2022/0315248 A1* 10/2022 Castellano Aldave ... B60L 3/00
2022/0380063 A1* 12/2022 Shah ...................... B64U 70/92
2022/0396373 A1* 12/2022 Wang ...................... B60L 53/30
2022/0396421 A1* 12/2022 Tian .......................... B60P 3/11
2023/0017530 A1* 1/2023 Lowe ..................... B64U 70/50
2023/0023246 A1* 1/2023 McLaughlin ........... B60L 53/12
2023/0031028 A1* 2/2023 Ehasoo ................... B64F 1/222
2023/0044050 A1* 2/2023 Cevacins ................. A42C 5/02
2023/0045483 A1* 2/2023 Ahn ....................... G05D 1/689
2023/0045691 A1* 2/2023 Cevacins ............... B64U 60/00
2023/0046127 A1* 2/2023 Guerra Johansson . H04N 7/183
2023/0063715 A1* 3/2023 Bell .................... G05D 1/0246
2023/0065140 A1* 3/2023 Blevins .................. B64C 1/064
2023/0074715 A1* 3/2023 Kwon ..................... F04D 25/08
2023/0088830 A1* 3/2023 Kim ....................... B64U 50/32 244/221
2023/0096139 A1* 3/2023 Ubaldi ................... B65G 23/44 198/844.1
2023/0100169 A1* 3/2023 Laczak ................... B64F 1/125 232/1 R
2023/0131957 A1* 4/2023 Lowenberg ............ B64U 80/86 244/137.1
2023/0133068 A1* 5/2023 Wiegman ................ B60L 53/16 320/109
2023/0140387 A1* 5/2023 Infanti .................. B64C 39/024 244/114 R
2023/0159192 A1* 5/2023 Gil ......................... B64U 80/40 244/137.1
2023/0202680 A1* 6/2023 Yehya .................... B64U 70/30 244/110 E
2023/0202682 A1* 6/2023 Kiyokami .............. B64U 70/90 244/114 R

(56) References Cited

U.S. PATENT DOCUMENTS

| | | | | |
|---|---|---|---|---|
| 2023/0202691 | A1* | 6/2023 | Kiyokami | B64U 70/93<br>244/114 R |
| 2023/0244249 | A1* | 8/2023 | Smith | G01S 13/933<br>701/11 |
| 2023/0249851 | A1* | 8/2023 | Tian | B64U 80/10<br>414/787 |
| 2023/0257139 | A1* | 8/2023 | Straus | B64U 10/13<br>244/114 R |
| 2023/0298268 | A1* | 9/2023 | Oleynikova | B60W 60/001 |
| 2023/0303272 | A1* | 9/2023 | Passley | B64U 20/50 |
| 2023/0347765 | A1* | 11/2023 | Lowe | B64U 70/97 |
| 2023/0348099 | A1* | 11/2023 | Woo | B64U 70/97 |
| 2023/0348100 | A1* | 11/2023 | Altenhofen | B64U 70/97 |
| 2023/0348103 | A1* | 11/2023 | Lowe | B64U 70/97 |
| 2023/0348104 | A1* | 11/2023 | Lowe | B64U 70/97 |
| 2023/0348105 | A1* | 11/2023 | Grasberger | B64U 70/97 |
| 2023/0348106 | A1* | 11/2023 | Berthelet | B64U 70/97 |
| 2023/0348122 | A1* | 11/2023 | Fehler | B64F 1/32 |
| 2023/0349146 | A1* | 11/2023 | Vasconi | B64U 70/90 |
| 2023/0373626 | A1* | 11/2023 | Kiyokami | B64D 1/22 |
| 2023/0373668 | A1* | 11/2023 | Kozlenko | G05D 1/0055 |
| 2023/0399132 | A1* | 12/2023 | Kiyokami | B64U 70/95 |
| 2024/0002080 | A1* | 1/2024 | Shi | B64U 70/90 |
| 2024/0010368 | A1* | 1/2024 | Liao | B64U 80/10 |
| 2024/0067371 | A1* | 2/2024 | Turner | B64U 50/37 |
| 2024/0076067 | A1* | 3/2024 | Takahashi | B64U 10/60 |
| 2024/0076072 | A1* | 3/2024 | Arii | B64U 30/20 |
| 2024/0101286 | A1* | 3/2024 | Regev | G05D 1/0866 |
| 2024/0101287 | A1* | 3/2024 | Takahashi | B64U 80/10 |
| 2024/0101288 | A1* | 3/2024 | Takahashi | B64U 70/92 |
| 2024/0109656 | A1* | 4/2024 | Stege | G06Q 10/083 |
| 2024/0111310 | A1* | 4/2024 | Ehasoo | B64U 70/20 |
| 2024/0132238 | A1* | 4/2024 | Qiu | B64U 70/92 |
| 2024/0140228 | A1* | 5/2024 | Lowe | B64U 70/97 |
| 2024/0140630 | A1* | 5/2024 | Lee | B64U 80/10 |
| 2024/0158112 | A1* | 5/2024 | Le Lann | H01M 50/262 |
| 2024/0176367 | A1* | 5/2024 | Zhou | G08G 5/22 |
| 2024/0190593 | A1* | 6/2024 | Shah | B60L 53/14 |
| 2024/0239531 | A1* | 7/2024 | Bitar | B64U 50/19 |
| 2024/0239533 | A1* | 7/2024 | Li | B64U 70/99 |
| 2024/0262545 | A1* | 8/2024 | Fu | B64U 70/90 |
| 2024/0278946 | A1* | 8/2024 | Roberts | B64U 70/92 |
| 2024/0300677 | A1* | 9/2024 | Sercel | B64G 1/623 |
| 2024/0329664 | A1* | 10/2024 | Randolph | B64U 10/13 |
| 2024/0336378 | A1* | 10/2024 | Neate | B64U 10/60 |
| 2024/0343426 | A1* | 10/2024 | Cornew | B64U 70/90 |
| 2024/0384587 | A1* | 11/2024 | Anderson | B64U 70/90 |
| 2024/0391616 | A1* | 11/2024 | Dayan | B64U 70/90 |
| 2024/0425199 | A1* | 12/2024 | Li | G05D 1/042 |
| 2025/0002185 | A1* | 1/2025 | Liu | B64U 80/70 |
| 2025/0026509 | A1* | 1/2025 | Infanti | B64U 70/50 |
| 2025/0074632 | A1* | 3/2025 | DiCosola | B64U 50/37 |
| 2025/0108935 | A1* | 4/2025 | Johnson | B60L 53/22 |
| 2025/0108943 | A1* | 4/2025 | Sekiguchi | B64U 70/95 |
| 2025/0121966 | A1* | 4/2025 | Gronstedt | B64U 80/70 |
| 2025/0128638 | A1* | 4/2025 | Scheler | B60L 53/30 |
| 2025/0145314 | A1* | 5/2025 | Gronstedt | B64U 70/99 |
| 2025/0206463 | A1* | 6/2025 | Aralis | B64F 1/125 |
| 2025/0223061 | A1* | 7/2025 | Merdin | B64U 80/25 |
| 2025/0250006 | A1* | 8/2025 | Burgess | G05D 1/0094 |
| 2026/0048863 | A1* | 2/2026 | Turvey | B64U 70/90 |
| 2026/0048878 | A1* | 2/2026 | Turvey | B64U 70/90 |
| 2026/0131903 | A1* | 5/2026 | Pawelczyk | B64F 1/222 |

* cited by examiner

DRAINAGE IN BASE STATIONS FOR UNMANNED AERIAL VEHICLES

CROSS-REFERENCE TO RELATED APPLICATION(S)

This application claims priority to and the benefit of U.S. Provisional Patent Application Ser. No. 63/683,520, filed Aug. 15, 2024, the entire contents of which are incorporated by reference herein for all purposes.

TECHNICAL FIELD

The present disclosure relates to a base station for an unmanned aerial vehicle (UAV) and, more specifically, to drainage of the base station.

BACKGROUND

A base station for a UAV is designed to house and protect the UAV when not in use. The base station may often include a landing platform on which the UAV may take flight and land. For example, the base station may include one or more fiducial markings that may be detected by an image sensor (e.g., a camera) of the UAV. Based upon detection of the one or more fiducial markings, the UAV may execute a landing procedure to safely land on the landing platform of the base station. Additionally, the base station may include an integrated charging system so that, when the UAV is not in use and stored on the landing platform, the integrated charging system may replenish a power supply of the UAV (e.g., a battery of the UAV).

SUMMARY

In one aspect of the present disclosure, a docking system for a UAV is disclosed that includes a base station and a stand that is configured to support the base station.

The base station includes a roof assembly and a base that supports the roof assembly.

The base includes: a body; a landing platform that is supported by the body; a temperature control system that is positioned within the base and which is configured to thermally condition the base station and the UAV; and a charging hub that is configured for electrical connection to the UAV to facilitate charging thereof.

The landing platform includes: slots; landing areas, which are configured to receive the UAV during docking; and alignment members, which are movable within the slots. The alignment members are configured for engagement with the UAV and are repositionable between extended and retracted positions.

The stand includes: a spreader plate that is configured for engagement with the base station; uprights that extend from the spreader plate; a brace that extends from the uprights; and at least one port that is configured to receive a transmission member to support power and/or data transmission to the base station via the stand.

In some configurations, the base station may further include at least one drain channel to allow for water egress.

In some configurations, the at least one drain channel may direct water away from the slots in the landing platform.

In some configurations, the at least one drain channel may direct water away from the temperature control system.

In some configurations, the at least one drain channel may direct water away from the charging hub.

In some configurations, the at least one drain channel may direct water away from a user panel.

In some configurations, the at least one drain channel may direct water away from an intake vent.

In some configurations, the base station may further include at least one drain heater that is configured to de-ice the at least one drain channel.

In some configurations, the charging hub may be repositionable between a retracted position, in which the charging hub is concealed by the landing platform, and an extended position, in which the charging hub is exposed from the landing platform.

In some configurations, the charging hub may extend through the landing platform in the extended position.

In some configurations, the stand may further include at least one alignment pin that extends outwardly from the spreader plate and which is configured for insertion into the base station.

In some configurations, the uprights may extend along a first axis, and the brace may extend along a second axis.

In some configurations, the stand may be configured such that the first axis and the second axis subtend an angle therebetween that lies substantially within the range of approximately 30 degrees to approximately 75 degrees.

In some configurations, the uprights may include at least one storage compartment.

In some configurations, the brace may include a notch that creates a locking point.

In some configurations, the stand may include at least one mounting point to support permanent installation at a docking site.

In another aspect of the present disclosure, a base station for a UAV is disclosed. The base station includes a base that includes a body defining a cavity therein and a landing platform supported by the body and configured to support the UAV. The body includes a lower surface that defines one or more drainage slots to provide drainage egress from the cavity of the body.

The landing platform includes a front grate in fluid communication with a thermal management system of the base station via a front thermal management duct that is configured to direct the drainage that enters the front thermal management duct through the front grate towards the one or more drainage slots and a rear grate in fluid communication with the thermal management system of the base station via a rear thermal management duct that is configured to direct the drainage that enters the rear thermal management duct through the rear grate towards the one or more drainage slots. The landing platform also includes a charging hub configured to removably couple with the UAV. The charging hub is located at least partially within the cavity of the body and extends through a hub opening defined by the landing platform. The charging hub is configured to direct the drainage that enters the hub opening towards the one or more drainage slots.

In some configurations, the base station may further include a roof assembly movably coupled to the base and movable between a closed position, in which the roof assembly is configured to enclose the landing platform, and an open position, in which the roof assembly is located at least partially below the landing platform with respect to an elevational direction such that the landing platform is unobstructed by the roof assembly to facilitate takeoff and landing of the UAV. The landing platform may further define a latch opening configured to receive a latch of the roof assembly. The latch opening may be configured to direct the drainage that enters the latch opening towards the one or more drainage slots. The latch opening may be in fluid communication with a catch basin located within the cavity of the base. Additionally, the latch opening may be configured to direct the drainage into the catch basin.

In some configurations, the front thermal management duct may be configured to direct air through the front grate to regulate a temperature of an area surrounding the landing platform. The rear thermal management duct may be configured to direct air through the rear grate to regulate the temperature of the area surrounding the landing platform. The area surrounding the platform may be configured to contain the UAV, and the area surrounding the landing platform may be configured for enclosure by a movable roof assembly coupled to the base.

In some configurations, the front thermal management duct may include a duct wall that defines one or more drainage openings therein. The drainage may be configured to flow along the duct wall and through the one or more drainage openings to reach the one or more drainage slots.

In some configurations, the rear thermal management duct may include a duct wall that defines one or more drainage openings therein. The drainage may configured to flow along the duct wall and through the one or more drainage openings to reach the one or more drainage slots.

In some configurations, the landing platform may further include one or more alignment members configured to align the UAV with the charging hub. The one or more alignment members may be movable along one or more alignment slots defined by the landing platform. The one or more alignment slots may be configured to direct the drainage that enters the one or more alignment slots towards the one or more drainage slots.

In another aspect of the present disclosure, a base station for a UAV is disclosed. The base station includes a base that includes a body defining a cavity therein. The body includes a lower surface that defines one or more drainage slots to provide water egress from the cavity of the body. The base also includes a landing platform supported by the body and configured to support the UAV. The landing platform includes a charging hub configured to removably couple with the UAV. The charging hub is located at least partially within the cavity of the body and extends through a hub opening defined by the landing platform. The charging hub includes an upper portion located above the landing platform with respect to an elevational direction and configured to contact the UAV, and a lower portion located at least partially within the cavity of the body and extending through the hub opening. The lower portion is spaced apart from the upper portion to define an air gap. The upper portion is configured to direct the water along the lower portion towards the one or more drainage slots to prevent the water from entering the air gap.

In some configurations, the upper portion may include a tapered surface configured to direct the water along a tapered surface of the lower portion towards the one or more drainage slots.

In some configurations, the charging hub may further include wiring disposed within the cavity of the body and positioned adjacent to the air gap. The charging hub may be configured to direct the water towards the one or more drainage slots to prevent the water from contacting the wiring.

In some configurations, the upper portion and the lower portion may be positioned relative to one another in a nested manner such that the lower portion may be at least partially nested within confines of the upper portion.

In some configurations, the charging hub may further include a deflector positioned at least partially within the hub opening. The charging hub may be configured to direct the water along the lower portion between the lower portion and a wall of the deflector.

In another aspect of the present disclosure, a base station for a UAV is disclosed. The base station includes a base and a roof assembly movably coupled to the base and movable between a closed position, in which the roof assembly encloses a landing platform and directs water away from the landing platform, and an open position, in which the landing platform is unobstructed by the roof assembly. The base includes a body defining a cavity therein and a landing platform supported by the body and configured to support the UAV. The body includes a lower surface that defines one or more drainage slots to provide water egress from the cavity of the body. The landing platform defines one or more openings therein that permit air flow thermally regulated by a thermal management system of the base station to reach an area surrounding the landing platform. Water that enters the cavity of the body through the one or more openings is directed towards the one or more drainage slots to prevent the water from contacting the thermal management system.

In some configurations, the roof assembly may include a cover defining a cavity therein, and further defining a first groove and a second groove along an exterior of the cover.

The roof assembly may also include a first ear coupled to the cover and at least partially disposed in the first groove, and a second ear coupled to the cover and at least partially disposed in the second groove. The first ear and the second ear may be movably couple to the body. The first ear may include a peripheral wall that at least partially defines a cavity of the first ear and further defines one or more drainage slots to provide the water egress from the cavity of the first ear. The second ear may include a peripheral wall that at least partially defines a cavity of the second ear and further defines one or more drainage slots to provide the water egress from the cavity of the second ear. The peripheral wall of the first ear may be configured to direct the water towards the one or more drainage slots of the first ear between the peripheral wall of the first ear and an interior wall positioned within the cavity of the first ear. The peripheral wall of the second ear may be configured to direct the water towards the one or more drainage slots of the second ear between the peripheral wall of the second ear and an interior wall positioned within the cavity of the second ear.

In another aspect of the present disclosure, a base station for a UAV is disclosed. The base station includes a base that includes a body defining a cavity therein and a landing platform supported by the body and configured to support the UAV. The body includes a lower surface that defines one or more drainage slots to provide drainage egress from the cavity of the body. The body further includes one or more drainage channels therein that are configured to direct the drainage that enters the body towards the one or more drainage slots.

BRIEF DESCRIPTION OF THE DRAWINGS

The present disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
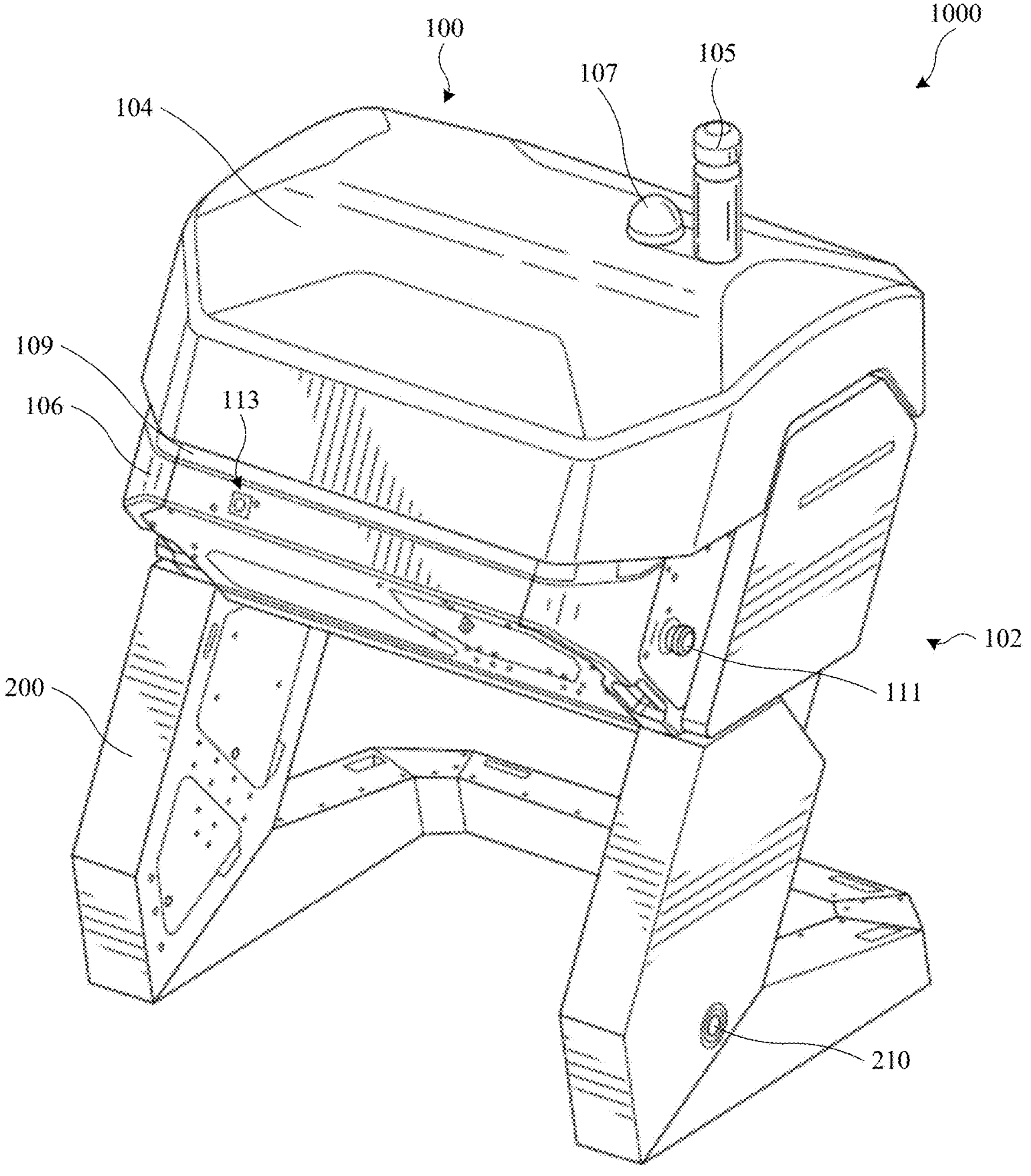
FIG. 1 is a perspective view of a docking system for a UAV.
Figure 2:
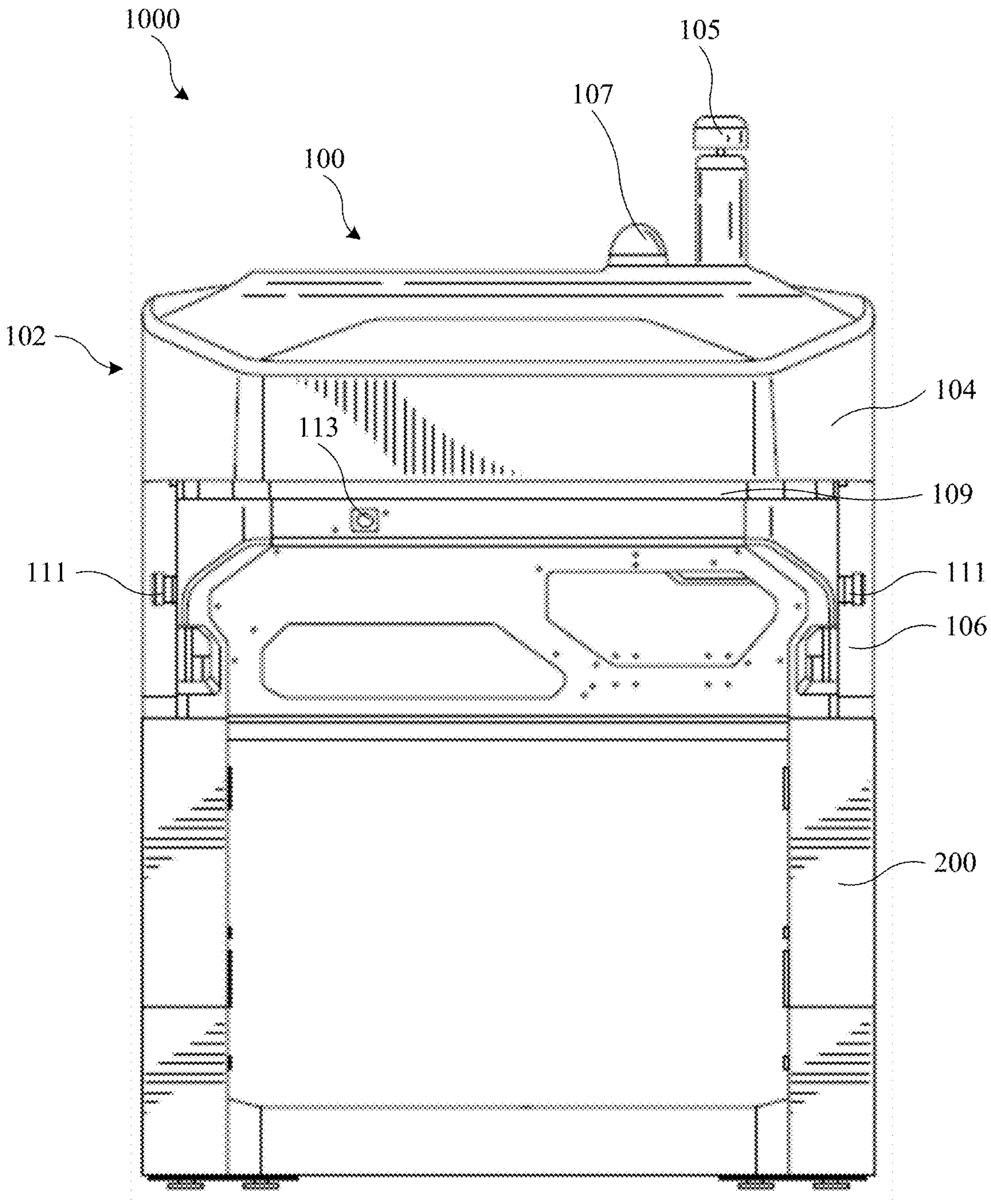
FIG. 2 is a front view of the docking system.

The present disclosure relates to a base station for use with an unmanned aerial vehicle (UAV). The base station may be configured to support the UAV when the UAV is not operating. The base station may be configured to charge a power source (e.g., a battery) of the UAV when the UAV is supported by or contained within the base station. For example, the base station may include a support assembly, such as a landing platform, which may support the UAV during periods of inactivity (e.g., when not in use) and may further support the UAV during takeoff and landing. The landing platform may be positioned within the base station such that, when the UAV is docked (e.g., supported by the landing platform), the base station may contain the UAV.

In an example, the base station may include a base, which may include or be the landing platform, and a roof assembly. The roof assembly may be movable so that, when the UAV is docked, the roof assembly may at least partially enclose the UAV such that the UAV is no longer exposed to environmental conditions, such as precipitation (e.g., rain, snow, hail, etc.), wind, extreme temperatures (e.g., extreme heat and/or cold), sunlight, debris, other external factors, or a combination thereof. Additionally, when the UAV is prepared for takeoff, the roof assembly may be movable so that the landing platform remains unobstructed by the roof assembly and the UAV may safely take off from the landing platform.

Conventional base stations may often be mechanically complex to ensure proper docking of the UAV. Similarly, conventional base stations may frequently require significant operator interaction to ensure proper takeoff and landing of the UAV. For example, the operator may be required to manually move a portion of the base station (e.g., a cover) to ensure that takeoff and landing of the UAV remains unobstructed. Additionally, conventional base stations may often provide a landing surface for the UAV yet provide no protection to the landing surface and/or the UAV once docked. For example, conventional base stations may not include a roof assembly to prevent exposure of one or more of the landing surface, electronics of the base station, or the UAV to various environmental conditions, such as those described above.

The present teachings provide a base station that addresses the aforementioned challenges. The base station herein may advantageously be substantially or entirely automated to substantially alleviate user interaction. The base station herein may also provide protection to the base station and the UAV. For example, the base station may partially or entirely enclose the landing platform to protect the landing platform and the UAV from environmental conditions. Additionally, the base station may include one or more defined drainage paths to ensure that drainage (e.g., water, such as rain, or other fluids, herein referred to as "fluid" or "fluids," which may be inclusive of any fluid, including water, or a combination of fluids) is directed away from components of the base station. For example, the base station may define one or more drainage paths to direct the drainage away from one or more of electronics or a thermal management system of the base station.

Referring now to the drawings, FIGS. 1-4 illustrate a docking system 1000 that includes a base station 100 (e.g., a dock) for aa UAV 10 (shown in FIGS. 6-8, 10), which is configured for automated servicing (e.g., storage, charging, operation, etc.) and accommodation of the UAV 10, and a stand 200, which is configured to support the base station 100 in an elevated position. While the docking system 1000 and the UAV 10 are shown and described herein, in certain embodiments of the disclosure, it is envisioned that a plurality of docking systems and UAVs may be utilized depending, for example, upon the particular intended use of the UAVs.

The base station 100 includes a base 102 and a roof assembly 104, which is supported by the base 102 such that the roof assembly 104 is repositionable between a closed position, in which the UAV 10 is concealed within the base station 100, and an open position, which facilitates takeoff and landing of the UAV 10. The roof assembly may include, for example, a wind sensor 105, a rain sensor 107, other sensors, or a combination thereof.

With reference now to FIGS. 5-10 as well, the base 102 includes: a body 106 (e.g., an enclosure), which is the main structural member of the base 102 and supports various internal and external components of the base station 100; a landing platform 108, which is supported by (e.g., connected (secured) to the body 106 and receives the UAV 10 during docking; a temperature control system 110 (e.g., a heating and cooling system) 110 (FIGS. 5 and 9), which is configured to thermally condition (e.g., cool and heat) the base station 100 and the UAV 10 when docked (subject to environmental conditions); a charging hub 112; indicator lighting 109, which may provide a visual indication (e.g., light indication) of operation of the base station 100 and/or the UAV 10; one or more user interfaces (e.g., buttons, switches, capacitive touch sensors, toggles, etc.), such as the user interface 111, which may provide a user control of the base station 100 (e.g., emergency stop button, manual open/close button, etc.); and one or more cameras, such as the camera 113, which may capture images and/or video (e.g., live feed) of an area surrounding the docking system 1000.

The landing platform 108 includes a stage 114 defining landing areas 116 (FIG. 11) and a pair of alignment members 118 (e.g., a first and a second alignment member).

The landing areas 116 receive and constrain the UAV 10 during docking with the base station 100. More specifically, the landing areas 116 receive legs 12 (FIGS. 6, 7) of the UAV 10 and correspond in number thereto.

The alignment members 118 configured for engagement (contact) with the UAV 10 (i.e., the legs 12) and are movable (repositionable) in relation to the stage 114 between extended positions (FIG. 6), in which the alignment members 118 are spaced laterally outward of the landing areas 116 in order to facilitate docking of the UAV 10 with the base station 100, and retracted positions (FIG. 7), in which the alignment members 118 are generally aligned with and are positioned (vertically) above the landing areas 116. More specifically, during repositioning between the extended and retracted positions, the alignment members 118 are movable within slots 120 in the landing platform 108.

The temperature control system 110 (FIGS. 5 and 9) is supported by and positioned (retained, accommodated) within the base 102 and is configured to thermally condition (e.g., cool and heat) the base station 100 and the UAV 10 when docked (subject to environmental conditions). The temperature control system 110 includes: a fan; a filter; a ducting system; (one or more) at least one heat sink in thermal communication with the ducting system; and a thermoelectric conditioner (TEC) in thermal communication with the heat sink(s).

The charging hub 112 (FIGS. 5-7, 10) is configured for engagement (contact) with and electrical connection to a power source 14 (FIG. 10) (i.e., a battery 16) on the UAV 10, which is located (e.g., attached to or otherwise supported on) a lower (bottom) surface thereof, and may draw power from any suitable source, whether internal to the base station 100 or external. The charging hub 112 is repositionable between a retracted position, in which the charging hub 112 is concealed by the landing platform 108, and an extended position, in which the charging hub 112 is exposed from and extends (vertically) through the landing platform 108 to facilitate connection to and charging of the UAV 10.

Figure 5:
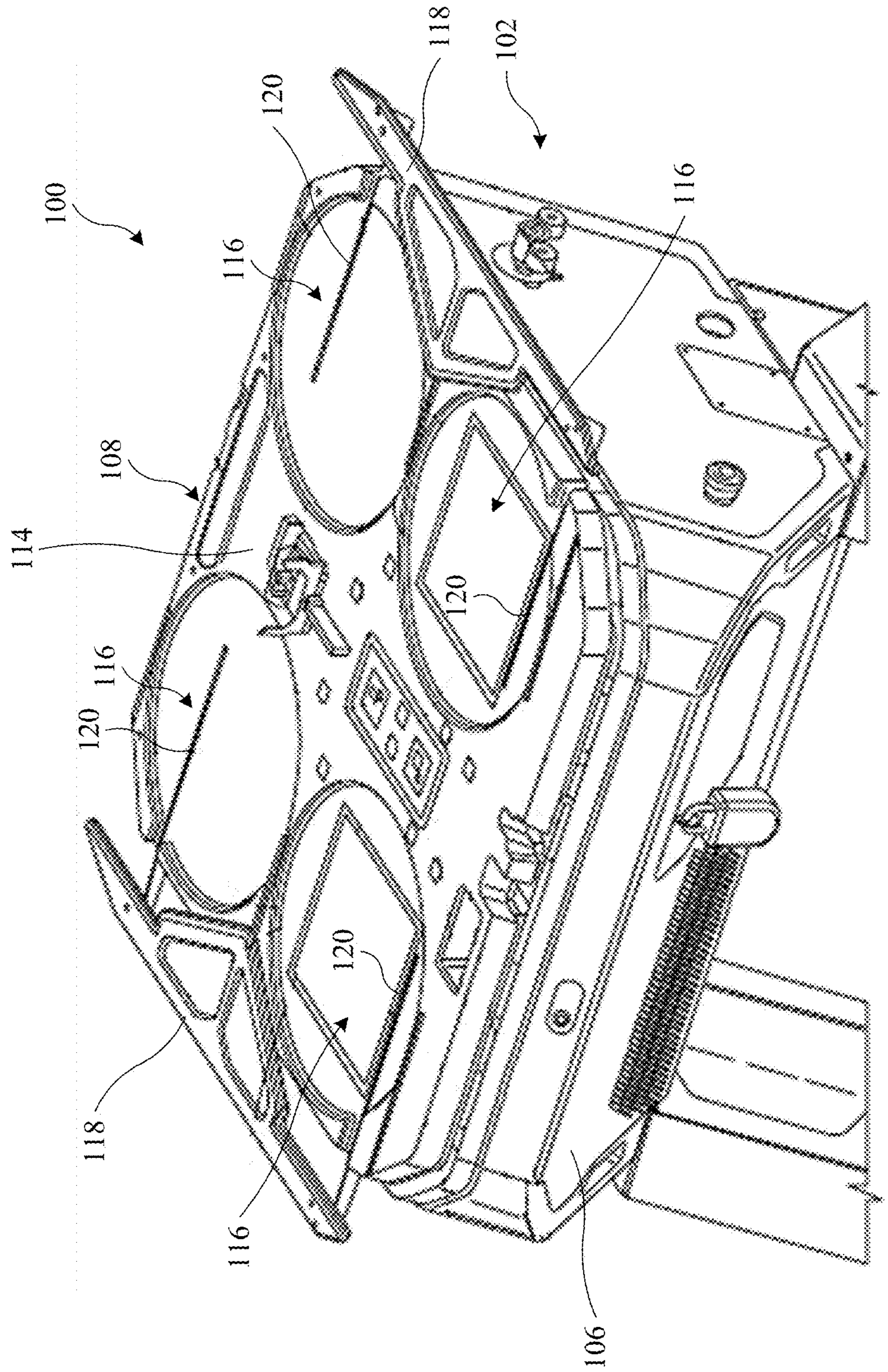
FIG. 5 is a perspective view of the base station illustrating a landing platform of the UAV.
Figure 6:
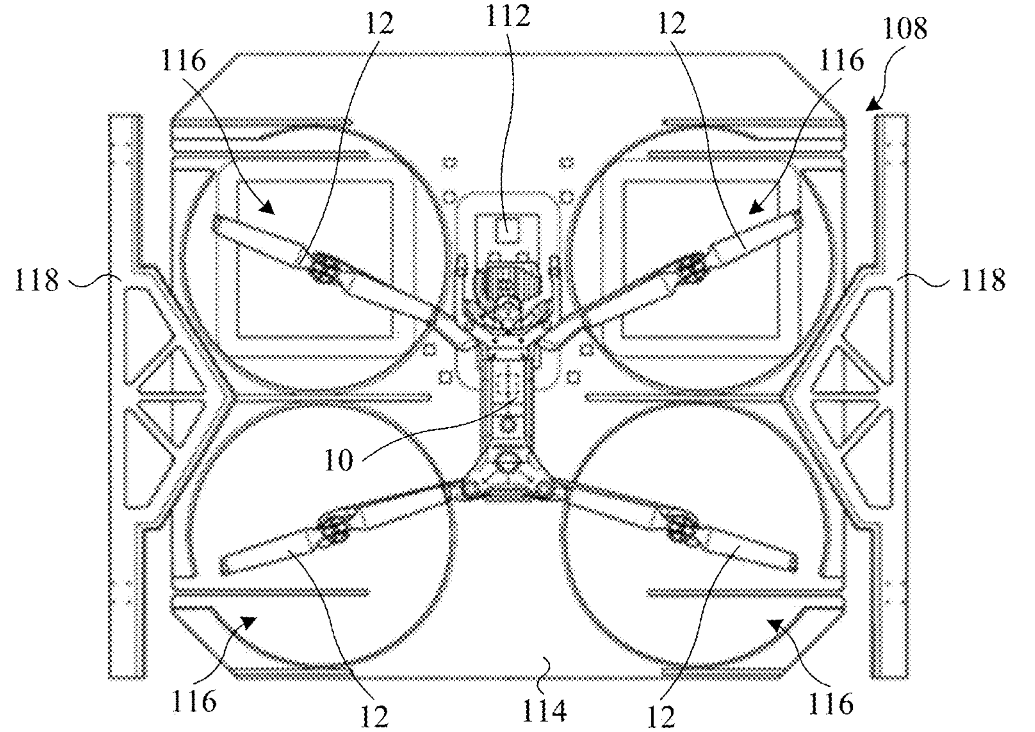
FIG. 6 is a top view of the landing platform with the alignment members shown in extended positions.
Figure 7:
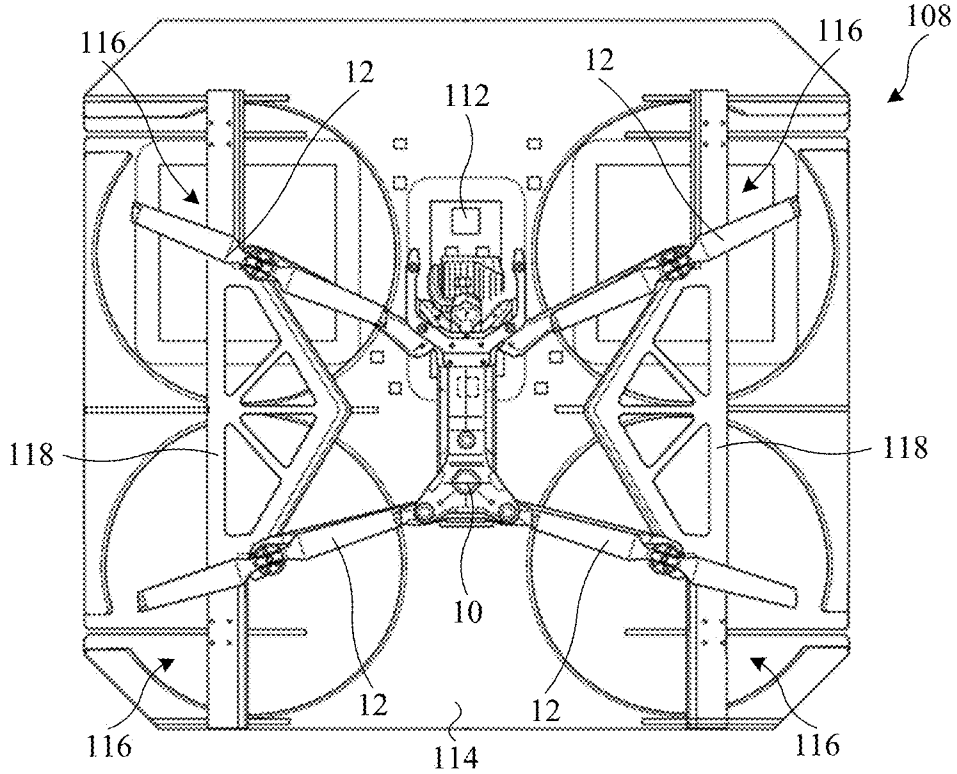
FIG. 7 is a top view of the landing platform with the alignment members shown in retracted positions.
Figure 8:
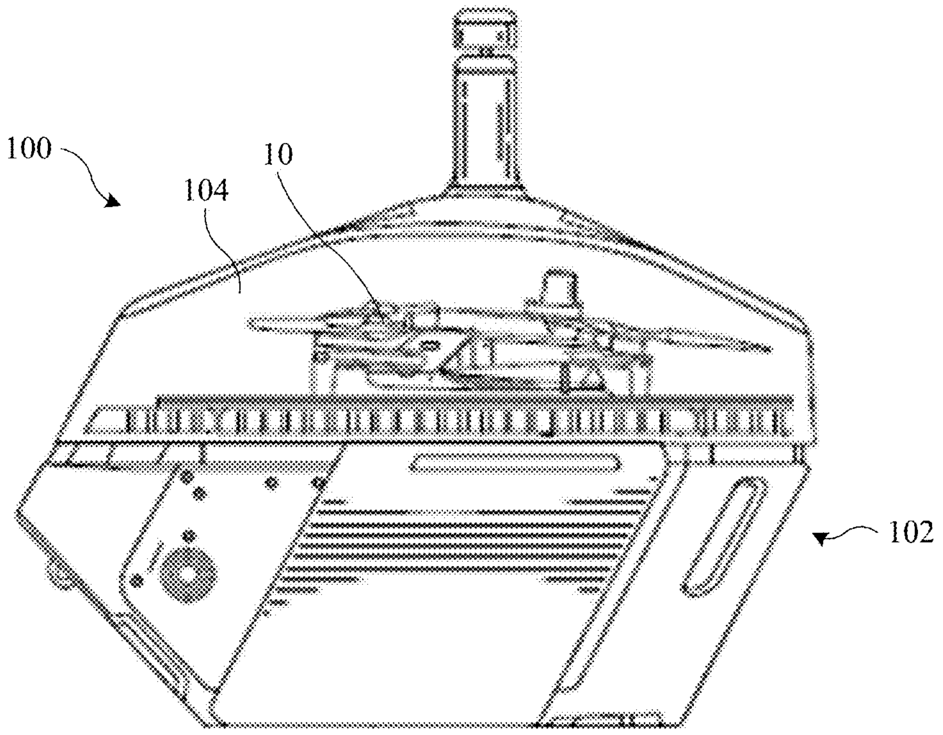
FIG. 8 is a side view of the base station.
Figure 9:
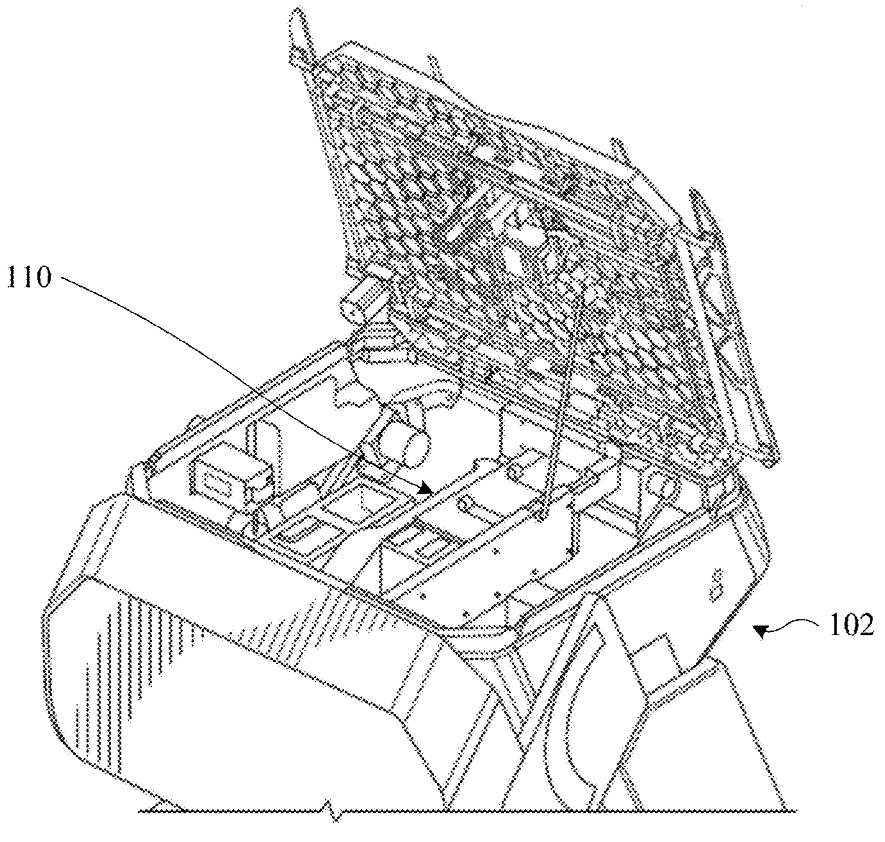
FIG. 9 is a top view of the base station illustrating the temperature control system of the base station.
Figure 10:
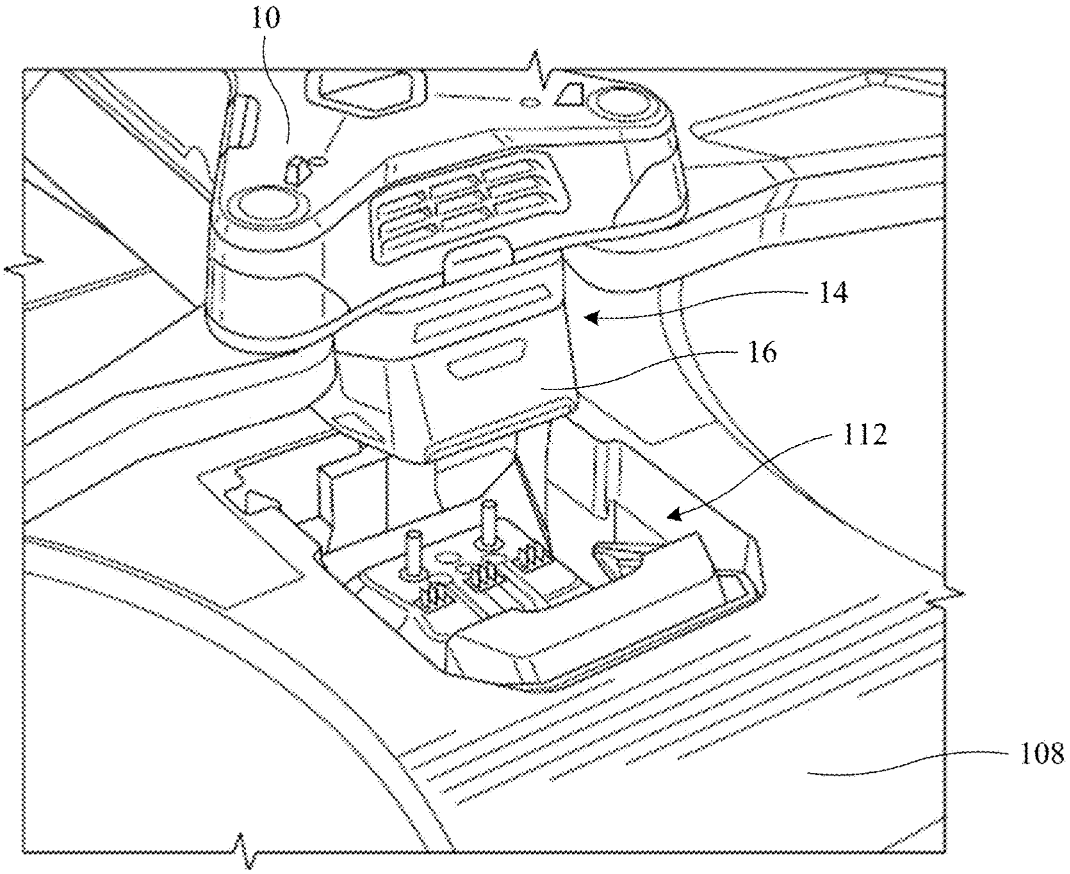
FIG. 10 is a perspective view illustrating connection of the UAV to a charging hub of the base station.
Figure 11:
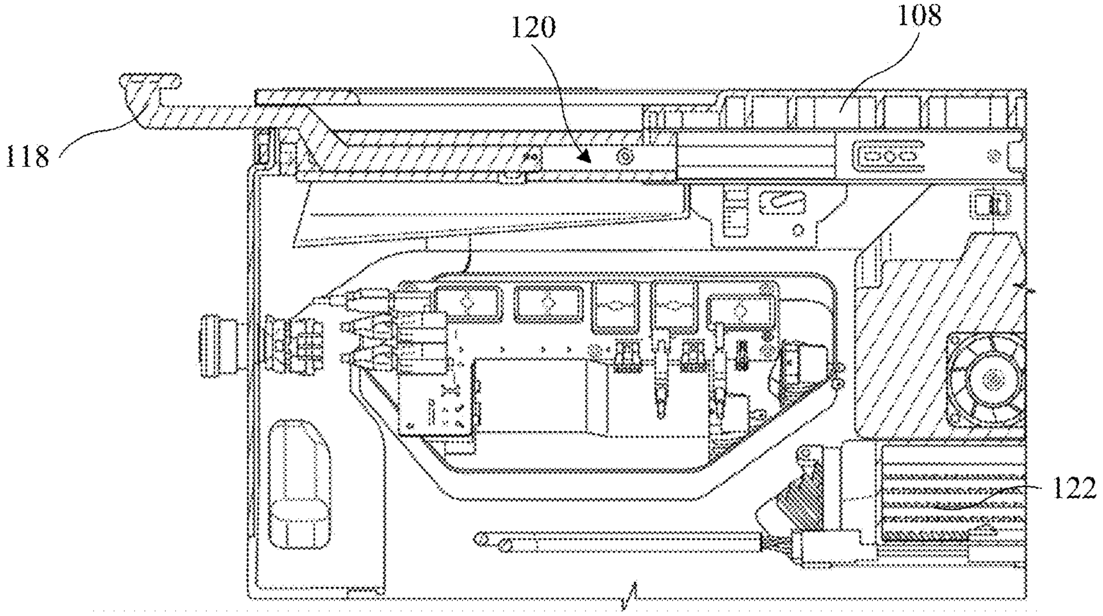
FIG. 11 is a cross-sectional view of the alignment members of the landing platform.

With reference now to FIG. 11 as well, the base station 100 includes (one or more) at least one drain channel (e.g., drain hole(s), path(s), gutter(s), etc.) to allow for fluid (e.g., water) egress during inclement weather and facilitate the evacuation of fluid resulting from condensation, ice melt, etc. For example, the base station 100 may drain fluid away from the landing platform 108 (i.e., the alignment members 118 and the slots 120), which supports repositioning of the alignment members 118 in the presence of fluid and inhibits the formation of ice around the alignment members 118 that may otherwise impede the functionality thereof, may drain fluid (e.g., condensation) away from the temperature control system 110 (e.g., the TEC), and may drain fluid away from the charging hub 112. It is also envisioned that the base station 100 may include one or more additional drain channels in order to facilitate the drainage of fluid from the user panel (FIGS. 1, 2) and/or the intake vent (FIG. 5).

With reference to FIG. 11, in certain embodiments, it is envisioned that the base station 100 may further include (one or more) at least one drain heater 122 (e.g., resistive heater pads) that are configured to de-ice the drain channel(s) and thereby melt ice that might otherwise obstruct the flow of fluid away from the landing platform 108 (i.e., the alignment members 118 and the slots 120), the temperature control system 110 (FIGS. 5 and 9), the charging hub 112 (FIGS. 5-7 and 10), etc.

Figure 12:
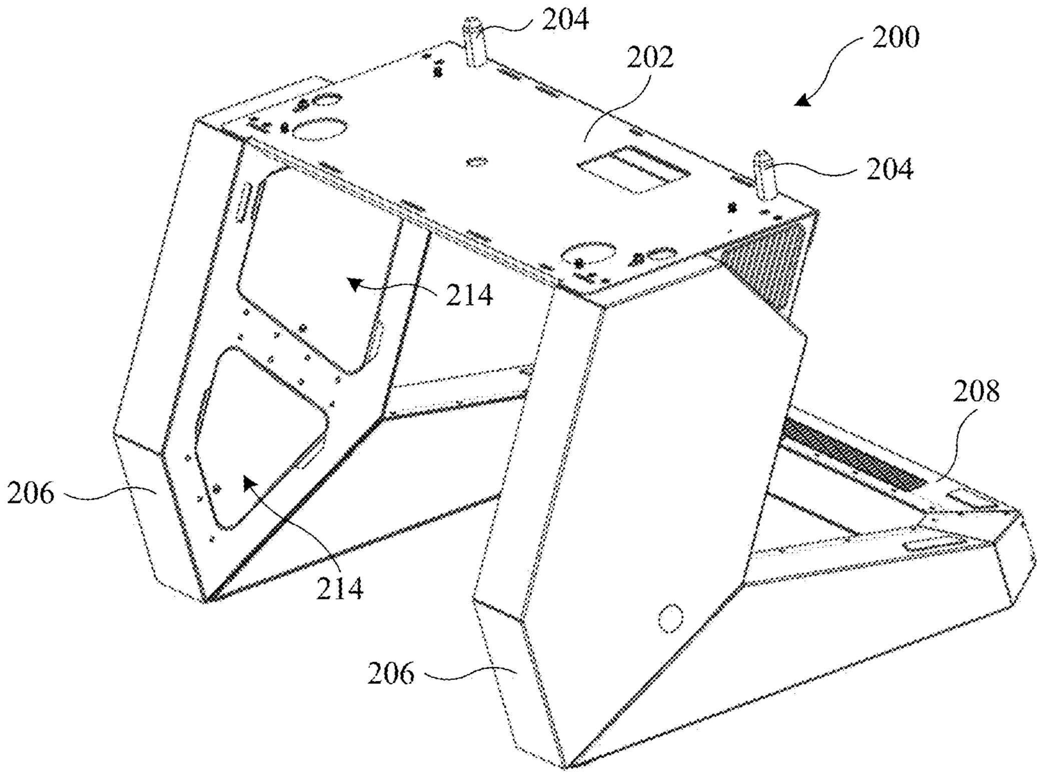
FIG. 12 is a perspective view of the stand.
Figure 13:
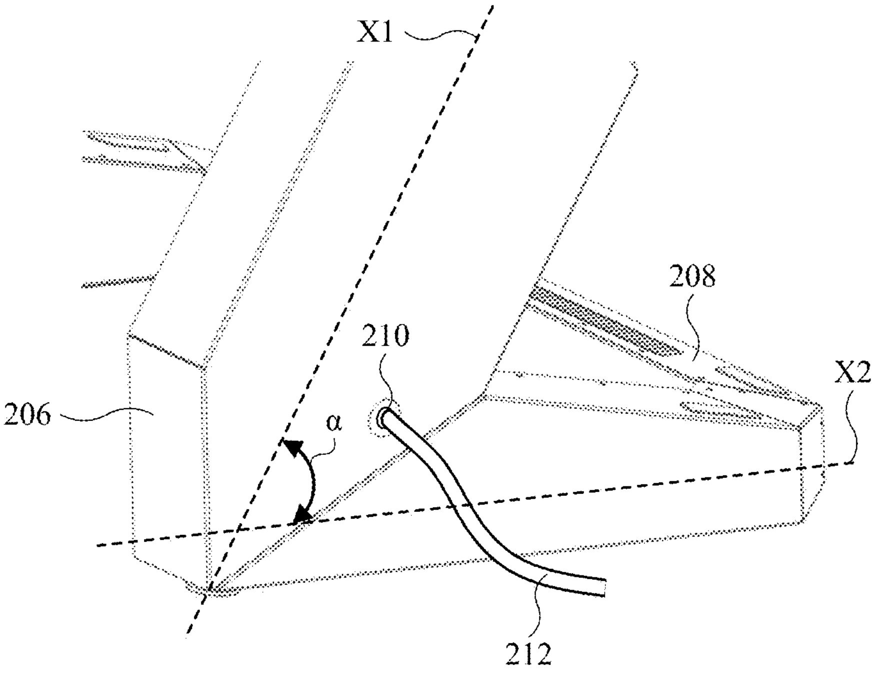
FIG. 13 is a perspective view of the stand illustrating a port that receives a transmission member.
Figure 14:
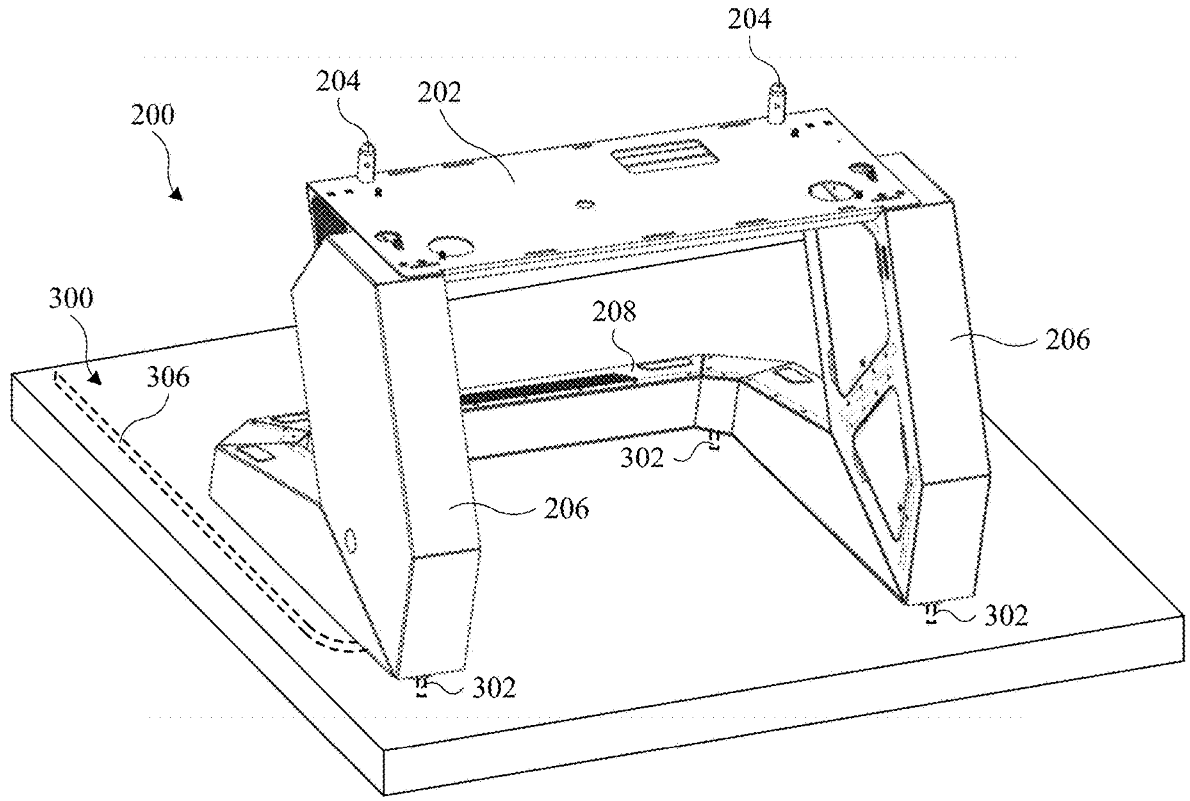
FIG. 14 is a perspective view of the stand connected to a docking site.

With reference now to FIGS. 12-14, the stand 200 will be discussed. The stand 200 is a free-standing structure that is configured to support the base station 100 (and the UAV 10) in an elevated position, as indicated above, which creates free air space that not only reduces turbulence (e.g., propeller wash) during takeoff and landing of the UAV 10, but mitigates the entry of debris (e.g., dust, particulate, etc.) into the base station 100.

The stand 200 includes: a spreader plate 202, which supports and is configured for engagement (contact) with the base station 100; (one or more) at least one alignment pin 204, which extends outwardly (i.e., vertically) from the spreader plate 202 and is configured for insertion into the base station 100 in order to facilitate proper orientation of the base station 100 in relation to the stand 200 and inhibit dislocation of the base station 100 (i.e., separation of the base station 100 and the stand 200) prior to connection; (a pair of) uprights 206, which extend from the spreader plate 202 along a (first) axis X1; and a brace 208, which extends from the uprights 206 along a (second) axis X2.

As seen in FIG. 13, in the illustrated embodiment, the stand 200 is configured such that the axes X1, X2 subtend an angle $\alpha$ therebetween that lies substantially within the range of approximately 30 degrees to approximately 75 degrees. Embodiments in which the stand 200 may be configured such that the angle $\alpha$ lies outside of the disclosed range are also envisioned herein (e.g., depending upon the size, weights, etc., of the base station 100), however, and would not be beyond the scope of the present disclosure.

Figure 3:
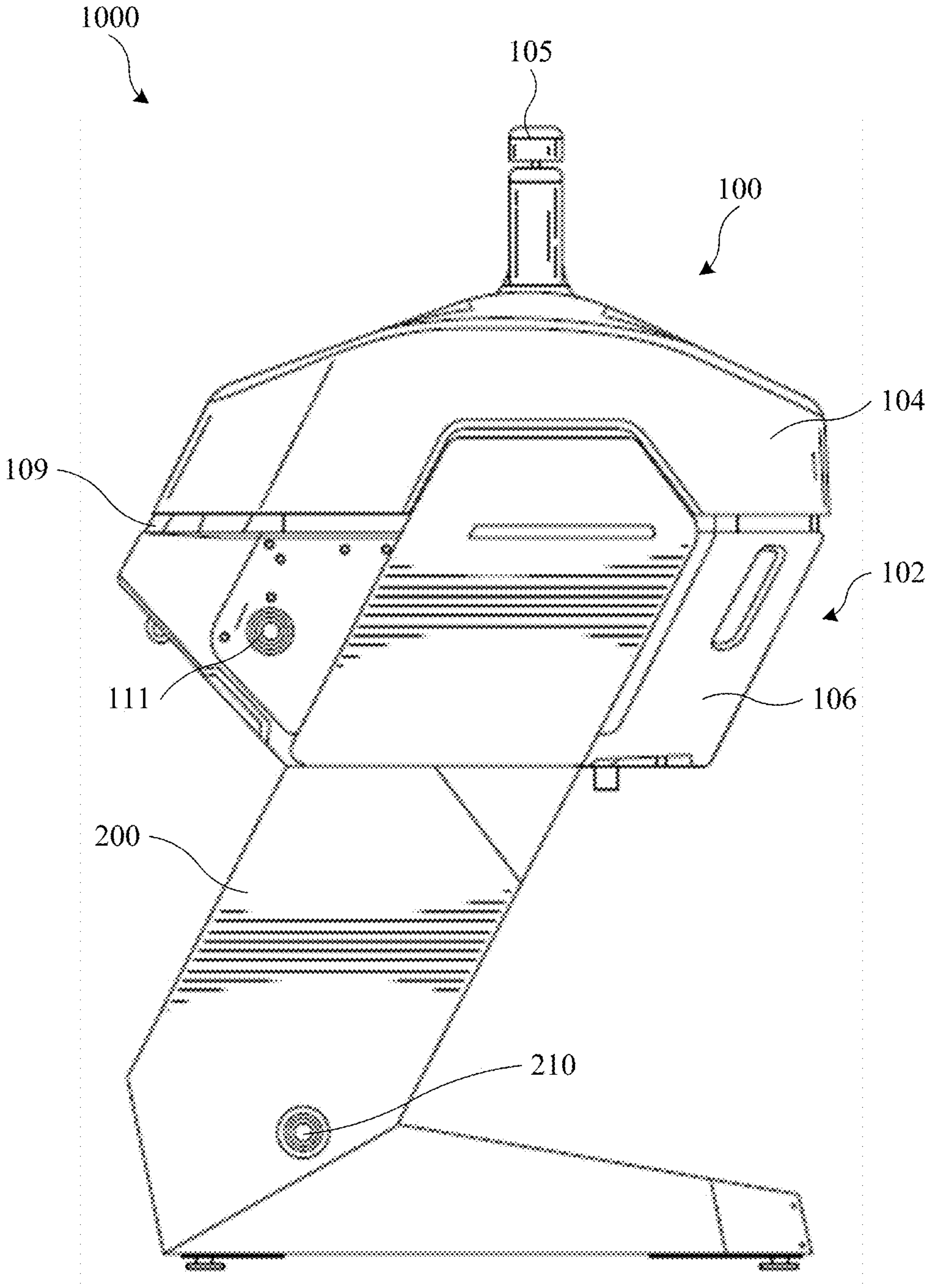
FIG. 3 is a side view of the docking system.
Figure 4:
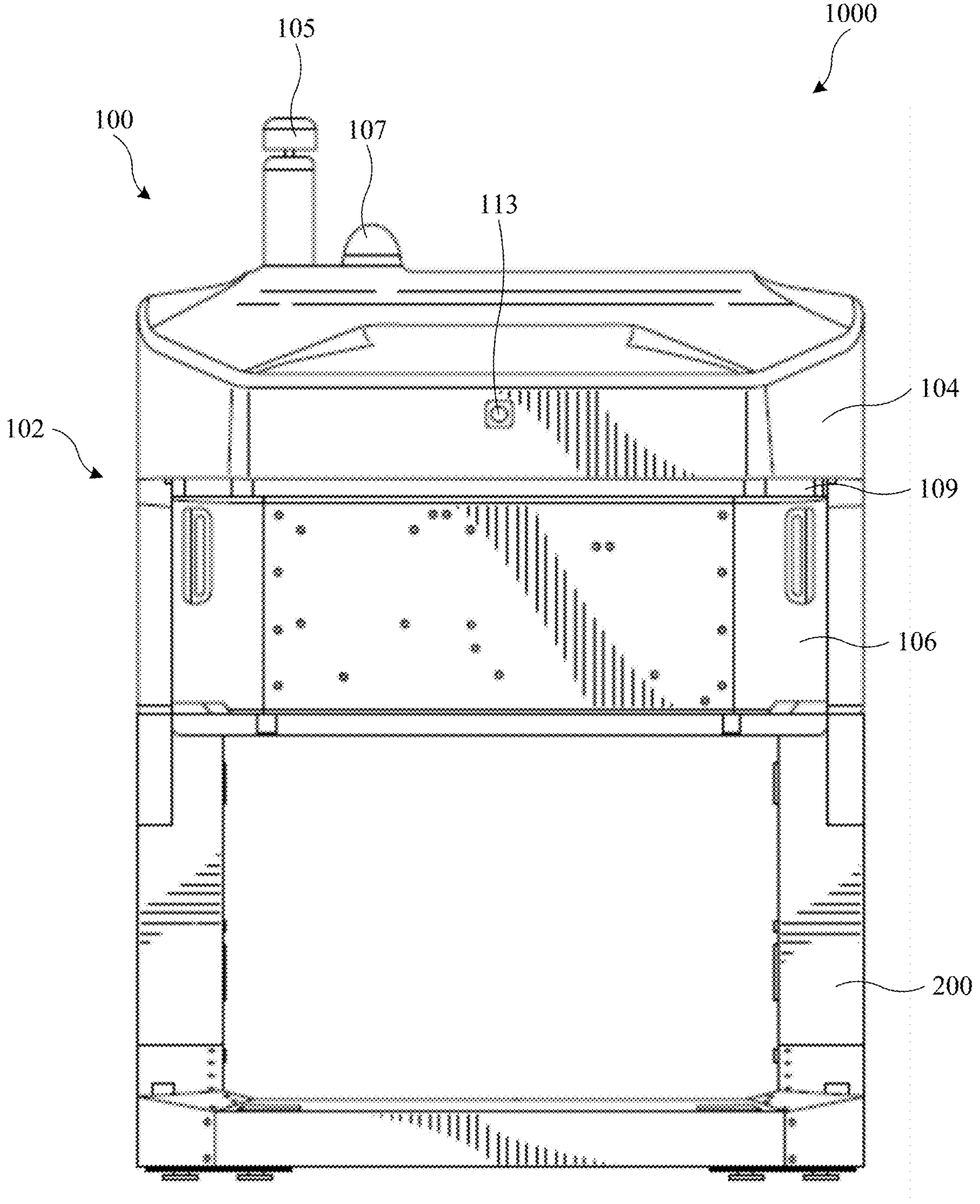
FIG. 4 is a rear view of the docking system.

As seen in FIGS. 1, 3, and 13, the stand 200 includes (one or more) at least one port 210 (e.g., entry point), which is configured to receive (one or more) at least one (power and/or data) transmission member 212 (e.g., wire(s), cable (s), FPC(s), etc.) to support power and/or data transmission to the base station 100 via the stand 200. Although shown as being included on one of the uprights 206 in the illustrated embodiment, it is envisioned that the port 210 may be included in any suitable location (e.g., the brace 208).

In certain embodiments, it is envisioned that the uprights 206 may include (one or more) at least one storage compartment 214 (FIG. 12) (e.g., for tools, fasteners, etc.). Additionally, or alternatively, it is envisioned that the brace 208 may include a notch to create a locking point.

In certain embodiments, the stand 200 is configured to support long term (e.g., permanent) installation at a docking site and includes (one or more) at least one mounting point that facilitates connection of the stand 200 to a mounting pad 300 (or the like), as seen in FIG. 14, which may include one or more anchors 302, one or more conduits, such as a first conduit 306 for power wiring (e.g., AC wires) and/or a second conduit for data communication (e.g., USB and/or ethernet wiring), or a combination thereof.

Figure 15:
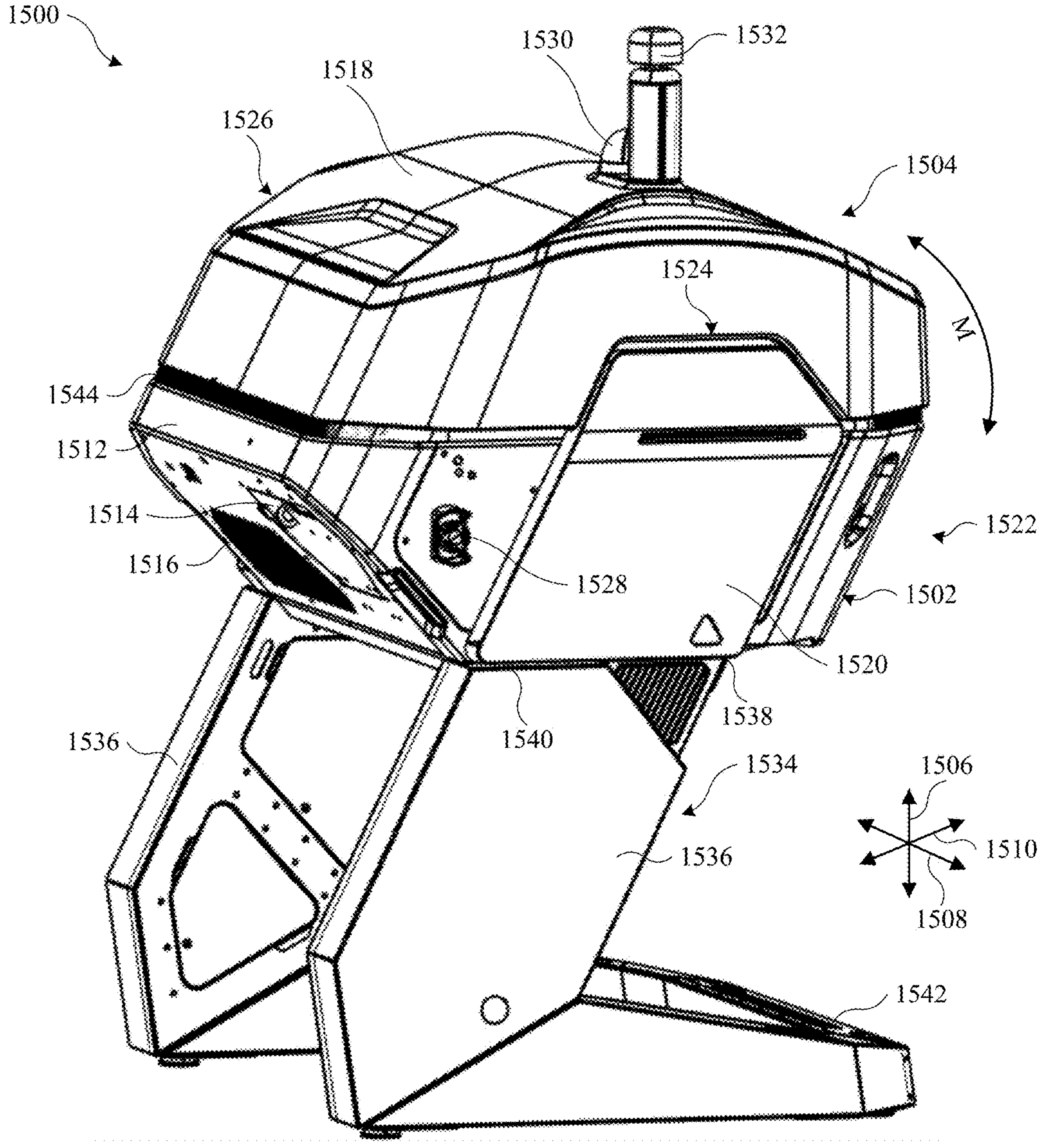
FIG. 15 is a perspective view of a base station for a UAV.

FIG. 15 illustrates a perspective view of another example of a base station 1500. The base station 1500 may be similar to the base station 100 of FIGS. 1-14 described above unless otherwise stated. By way of example, the base station 1500 may also include a base 1502 and a roof assembly 1504 movably coupled to the base 1502. As discussed further below, the roof assembly 1504 may be movable between an open position, in which the roof assembly 1504 exposes an interior region of the base 1502, and a closed position, in which the roof assembly 1504 at least partially encloses the interior region of the base 1502. FIG. 15 illustrates the closed position of the roof assembly 1504.

The base station 1500 may be configured to house and/or support a UAV, such as the UAV 10. For example, the base 1502 may be or may include a landing platform (e.g., similar to the landing platform 108 of the base station 100). During operation (e.g., flight) of the UAV 10, the UAV 10 may commence a landing sequence, such as based upon recognition of the landing platform and/or one or more fiducial markings thereon, and land on the landing platform. That is, the UAV 10 may be docked on the landing platform and supported by the landing platform.

When the UAV 10 is docked, the roof assembly 1504 may be configured to move to the closed position shown in FIG. 15 to enclose the landing platform and the UAV 10 supported thereon to protect both the landing platform and the UAV 10 from environmental conditions (e.g., precipitation, debris, sunlight, etc.) When an operator wishes to initiate takeoff of the UAV 10 from the landing platform, the roof assembly 1504 may be actuated to move to the open position, whereby the roof assembly 1504 may be located at least partially below the landing platform with respect to an elevational direction 1506 of movement (e.g., an up-and-down direction). For illustrative purposes, the elevation direction 1506 may be considered movement along or parallel to a Z-axis of the base station 1500, which may be transverse to a lateral direction 1508 of movement (e.g., side-to-side movement along or parallel to an X-axis of the base station 1500) and transverse to a longitudinal direction 1510 of movement (e.g., front-to-back movement, or vice versa, along or parallel to a Y-axis of the base station 1500). As such, when the roof assembly 1504 is in the open position, the landing platform—and thus the UAV 10—are unobstructed by the roof assembly 1504 to facilitate takeoff and landing of the UAV 10.

The base 1502 may include a body 1512 that supports the landing platform. The body 1512 may substantially form an overall shape and housing of the base 1502. As discussed further below, the body 1512 may define a cavity therein, which may contain one or more components of the base station 1500, such as the landing platform, at least a portion of the drive system that actuates the roof assembly 1504, a thermal management system of the base station 1500, electronics (e.g., circuitry, wiring, etc.), or a combination thereof. Additionally, the body 1512 may be movably coupled to the roof assembly 1504 and may help facilitate movement of the roof assembly 1504 between the open position and the closed position.

As mentioned above, the body 1512 may include and/or house one or more components of the base station 1500. By way of example, the body 1512 may store one or more electrical components of the base station 1500, such as a control module, wiring (e.g., power and/or data wiring), one or more sensors (e.g., contact sensors, humidity sensors, temperature sensors, etc.), a charging hub configured to charge a power supply of the UAV 10 when docked, or a combination thereof. Such electrical components may be accessible from outside the base station 1500 via an access module 1514 of the body 1512. The access module 1514 may be an access panel, which may open to allow a user to access or otherwise communicate with the electrical components of the base station 1500. For example, the access module 1514 may be opened to expose a port, whereby the user may connect an external electronic device (e.g., laptop, tablet, mobile phone, etc.) to an electrical system of the base station 1500 via a connector connected to the port to thereby establish a communication path between the electronic device and the electrical system.

Additionally, due to potentially heightened operating temperatures of such an electrical system, the body 1512 may also include venting 1516 to dissipate such heat and ensure that the electrical system of the base station 1500 does not overheat. Similarly, as discussed further below, the venting 1516 may provide a point of egress for drainage (e.g., water) that may enter the body 1512. The venting 1516 may be slits, cutouts, or other openings to promote air flow between the interior region of the body 1512 (e.g., the cavity storing the electronic components therein) and an external environment. In some configurations, the base 1502 may also include one or more heat sinks to further promote heat dissipation from the body 1512. In an example, the electronic components of the base station 1500 may include one or more printed circuit boards (PCBs), which may be coupled to one or more heat sinks located within the body 1512. The one or more heat sinks may be coupled to the body 1512 such that heat generated by the PCBs may be transferred through the one or more heat sinks to the body 1512, at which point the heat may be dissipated into the external environment.

As discussed above, the roof assembly 1504 may be movable coupled to the base 1502. As shown in FIG. 15, the roof assembly 1504 may include a cover 1518 and one or more ears, such a first ear 1520 coupled to the cover 1518 and movably coupled to the body 1512. For example, the first ear 1520 may be coupled to a first side 1522 (e.g., a first lateral side) of the cover 1518, such as within a groove 1524 defined by the cover 1518 and located on the first side 1522 of the cover 1518. The first ear 1520 may extend downward from the cover 1518 with respect to the elevational direction 1506 and coupled to the first side 1522 of the base 1502 (e.g., the first side 1522 of the body 1512) to establish a pivot therebetween.

The roof assembly 1504 may further include a second ear, which may be similar to the first ear 1520 described above, that is coupled to an opposing second side 1526 of the cover 1518. For example, the second ear may extend downward from the cover 1518 with respect to the elevational direction 1506 and may be coupled to the opposing second side 1526 of the base 1502 (e.g., the opposing second side 1526 of the body 1512) to establish a pivot therebetween. Thus, based on actuation by the drive system of the base station 1500, the first ear 1520 and the second ear may facilitate movement of the roof assembly 1504 in a direction of movement (M) between the closed position and the open position. That is, the roof assembly 1504 may be rotatable through an angular range of motion that is defined by the first ear 1520 and the second ear. It should also be noted that, in some configurations, the roof assembly 1504 may only include the first ear 1520 or the second ear.

Actuation of the roof assembly 1504 may be done manually and/or remotely. For manual operation, the base station 1500 may include a manual override state in which a user may manually articulate the roof assembly 1504 between the closed position and the open position. For example, the base station 1500 may enter the manual override state for maintenance or during a power outage. However, it is envisioned that the roof assembly 1504 may generally be actuated remotely. For example, when the UAV 10 initiates a takeoff sequence, the takeoff sequence may include communicating with the base station (e.g., via wireless or wired communication) so that the roof assembly 1504 may be actuated in the direction of movement (M) to the open position. Similarly, when the UAV 10 lands on the landing platform, the base station 1500 may detect the UAV 10 (or the UAV 10 may communicate with the base station 1500 that it has landed), at which point the roof assembly 1504 may be actuated in the direction of movement (M) to the closed position.

Moreover, a user may actuate the roof assembly 1504 based upon user input, such as via an external electronic device in communication with the base station 1500 and/or a user interface disposed on the base station 1500, such as the user interface 1528. For example, the user interface 1528 may be disposed along an exterior surface of the body 1512, such as along the first side 1522 and/or the opposing second side 1526 of the body 1512. The user may interact with the user interface 1528 (e.g., push, contact, slide, switch, etc.) to activate movement of the roof assembly 1504.

Similarly, in certain circumstances the user may wish to manually stop actuation of the roof assembly 1504. For example, the user may wish to initiate an emergency stop of the roof assembly 1504 midway through actuation of the roof assembly 1504 between the open position and the closed position. In such a case, the user may stop movement of the roof assembly 1504 between the closed position and the open position by interacting with the user interface 1528.

As discussed above, the base station 1500 may include one or more electrical components that are disposed within the cavity of the body 1512. The base station 1500 may include one or more electrical components, such as one or more sensors, along an exterior of the body 1512 and/or the cover 1518. For example, as shown in FIG. 15, the roof assembly 1504 may include a rain sensor 1530 (e.g., to detect rain or a severity thereof) and a wind sensor 1532 (e.g., to detect wind or a severity thereof) coupled to an exterior surface of the cover 1518, such as along a top exterior surface of the cover 1518 so that the rain sensor 1530 and the wind sensor 1532 are located above substantially all of the base station 1500 in the elevational direction 1506. As such, the rain sensor 1530 and the wind sensor 1532 may detect rain and wind, respectively, substantially unencumbered by the base station 1500. It should be noted that any type of sensor may be disposed along the exterior surface of the base station 1500. For example, the base station 1500 may include one or more contact sensors, one or more pressure sensors, one or more temperature sensors, other sensors, or a combination thereof disposed along the exterior surface of the base station 1500.

Turning back to FIG. 15, the first ear 1520 and the second ear may be coupled to the body 1512 such that the roof assembly 1504 is movable (e.g., in the direction of movement (M)) between the closed position, in which the cover 1518 is configured to enclose the landing platform and the UAV 10 supported thereon, and an open position, in which the cover is located at least partially below the landing platform (e.g., below the body 1512) with respect to the elevational direction 1506 such that the landing platform is unobstructed by the cover 1518 to facilitate takeoff and landing of the UAV 10. To facilitate such articulation of the roof assembly 1504, the base 1502 may be coupled to a stand 1534.

The stand 1534 may include one or more legs, such as the legs 1536, which may support the base 1502 and thus also support the roof assembly 1504. For example, a lower surface 1538 of the body 1512 may be supported along an upper surface 1540 of the legs 1536. The legs 1536 may substantially define a clearance height for articulation of the roof assembly 1504. That is, the legs 1536 may extend upward in the elevational direction 1506 such that the base 1502 is raised above the ground to thereby provide an area in which the roof assembly 1504 is free to articulate at least partially beneath the body 1512 (e.g., in the open position). The legs 1536 may also be coupled to one another and/or further structurally reinforced by a frame 1542. As shown in FIG. 15 the frame 1542 may extend between the legs 1536 to improve stability of the stand 1534.

To further improve operation of the base station 1500, the base station 1500 may include indicator lighting 1544 extending at least partially around a perimeter (e.g., a periphery) of the base 1502. The indicator lighting 1544 may remain unobstructed by the roof assembly 1504 when the roof assembly 1504 is in the open position and when the roof assembly 1504 is in the closed position. That is, the indicator lighting 1544 may remain unobstructed by the roof assembly 1504 before, during, and after actuation of the roof assembly 1504. As such, the indicator lighting 1544 may provide a visual indication of activity of the base station 1500. In an example, the indicator lighting 1544 may illuminate during opening and/or closing of the roof assembly 1504.

Similarly, the indicator lighting 1544 may illuminate when the UAV 10 is docked within the base station 1500, when the base station 1500 is receiving power from an external power source, when the base station 1500 is malfunctioning, or a combination thereof. Illumination herein by the indicator lighting 1544 may be considered any lighting provided by the indicator lighting 1544 in any color, pattern (e.g., rate of pulsing), intensity, or a combination thereof. The indicator lighting 1544 may also be any lighting component that may facilitate such illumination, such as, for example, an LED panel (e.g., a backlit and/or edge-lit LED panel), fluorescent lighting, LED strips, or a combination thereof. However, the indicator lighting 1544 is not limited to any particular lighting component.

As shown in FIG. 15, the base station 1500 may be configured to substantially prevent moisture and/or debris from entering the confines of the base 1502 when the roof assembly 1504 is in the closed position. For example, the roof assembly 1504 may be shaped such that water (e.g., rain) which lands on the cover 1518 may be directed away from the confines of the body 1512 to prevent the water from penetrating the base station 1500 and contacting one or more of the landing platform (including the UAV 10, which may be supported thereon), the electronics located within the base 1502, or the thermal management system located within the base 1502. In an example, a portion of the base 1502, such as the landing platform and/or indicator lighting 1544, may be at least partially nested within the roof assembly 1504 (e.g., within the cover 1518) so that the water may be directed over the surface of the cover 1518 and away from the base 1502. As such, the cover 1518 may dimensionally span a greater distance in the lateral direction 1508 and/or the longitudinal direction 1510 compared to the base 1502 to cover the base 1502 and protect the base 1502 from the water.

Figure 16:
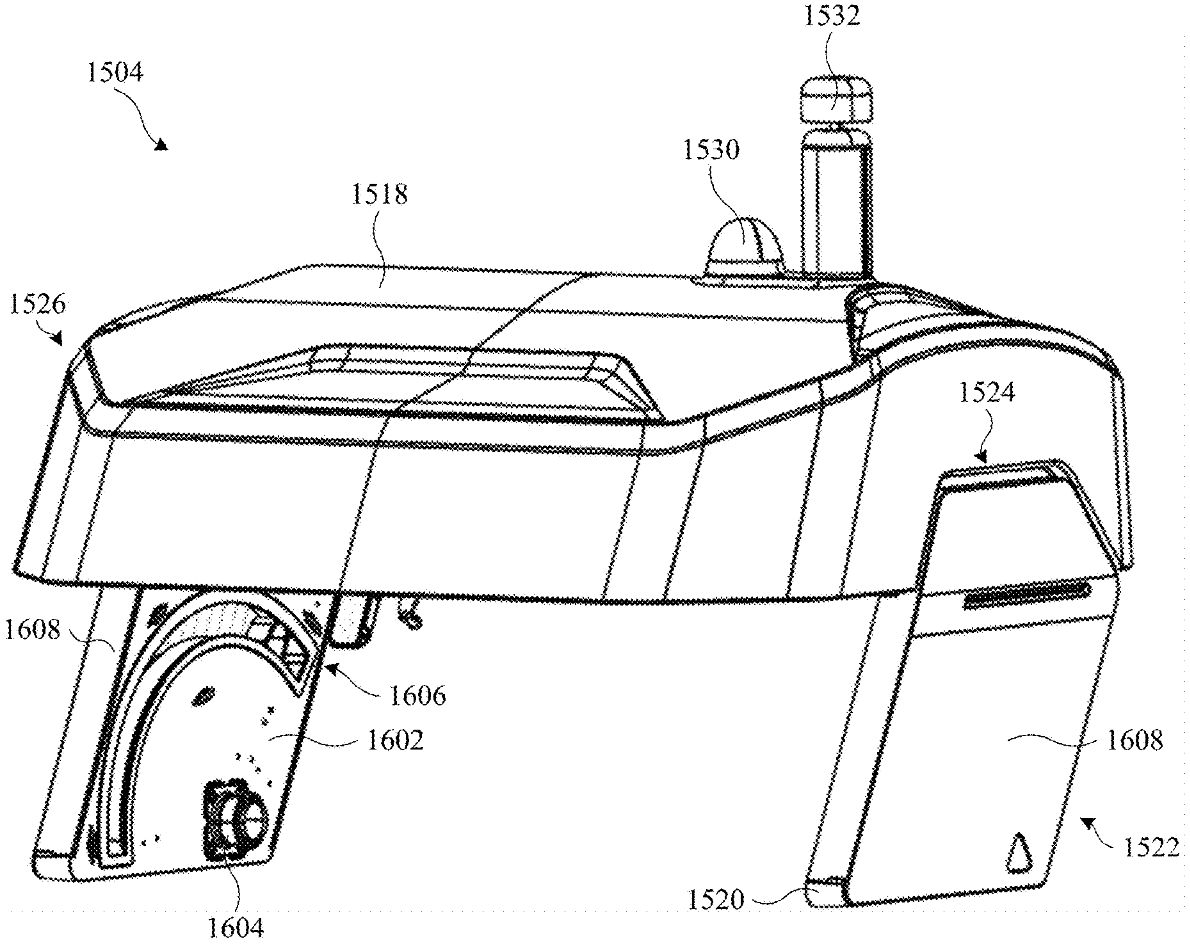
FIG. 16 is a perspective view of a roof assembly of the base station of FIG. 15.

FIG. 16 illustrates a perspective view of the roof assembly 1504 of the base station 1500. As discussed above, the roof assembly 1504 may include the cover 1518, which may include the rain sensor 1530 and the wind sensor 1532 disposed thereon. The roof assembly 1504 may also include one or more ears, such as the first ear 1520 and the second ear 1602, which may be coupled to the cover 1518 and movably coupled to the body 1512 of the base 1502 such that the roof assembly 1504 is movable between the open position and the closed position.

As shown in FIG. 16, the first ear 1520 may extend downward from the cover 1518 (e.g., downward from the groove 1524 of the cover 1518 located along the first side 1522 of the cover 1518) with respect to the elevational direction 1506 such that the first ear 1520 may be coupled to the first side 1522 of the base 1502 via a pivot shaft of the first ear 1520, which may be similar to the pivot shaft 1604 of the second ear 1602. Similarly, the second ear 1602 may extend downward from the cover 1518 (e.g., downward from the groove 1524 of the cover 1518 located along the second side 1526 of the cover 1518) with respect to the elevational direction 1506 such that the second ear 1602 may be coupled to the second side 1526 of the base 1502 (e.g., the second side 1526 of the body 1512) via the pivot shaft 1604 of the second ear 1602.

Based on the above, the roof assembly 1504, when actuated by the drive system of the base station 1500, may rotate the roof assembly 1504 between the open and closed position. Additionally, the first ear 1520 and the second ear 1602 may each include a track, such as the track 1606 of the second ear 1602 shown in FIG. 16. The track 1606 of the first ear 1520 may be complementary in shape to the track 1606 of the second ear 1602 such that the tracks may guide movement of the roof assembly 1504 between the open position and the closed position. For example, actuator assemblies of the drive system may be guided along a respective one of the tracks. Additionally, to protect such operation from external moisture and/or debris, the first ear 1520 and the second ear 1602 may each include a cover panel 1608. As such, the track 1606 and the pivot shaft 1604 of each of the ears may be at least partially contained and/or enclosed by the cover panel 1608.

Figure 17:
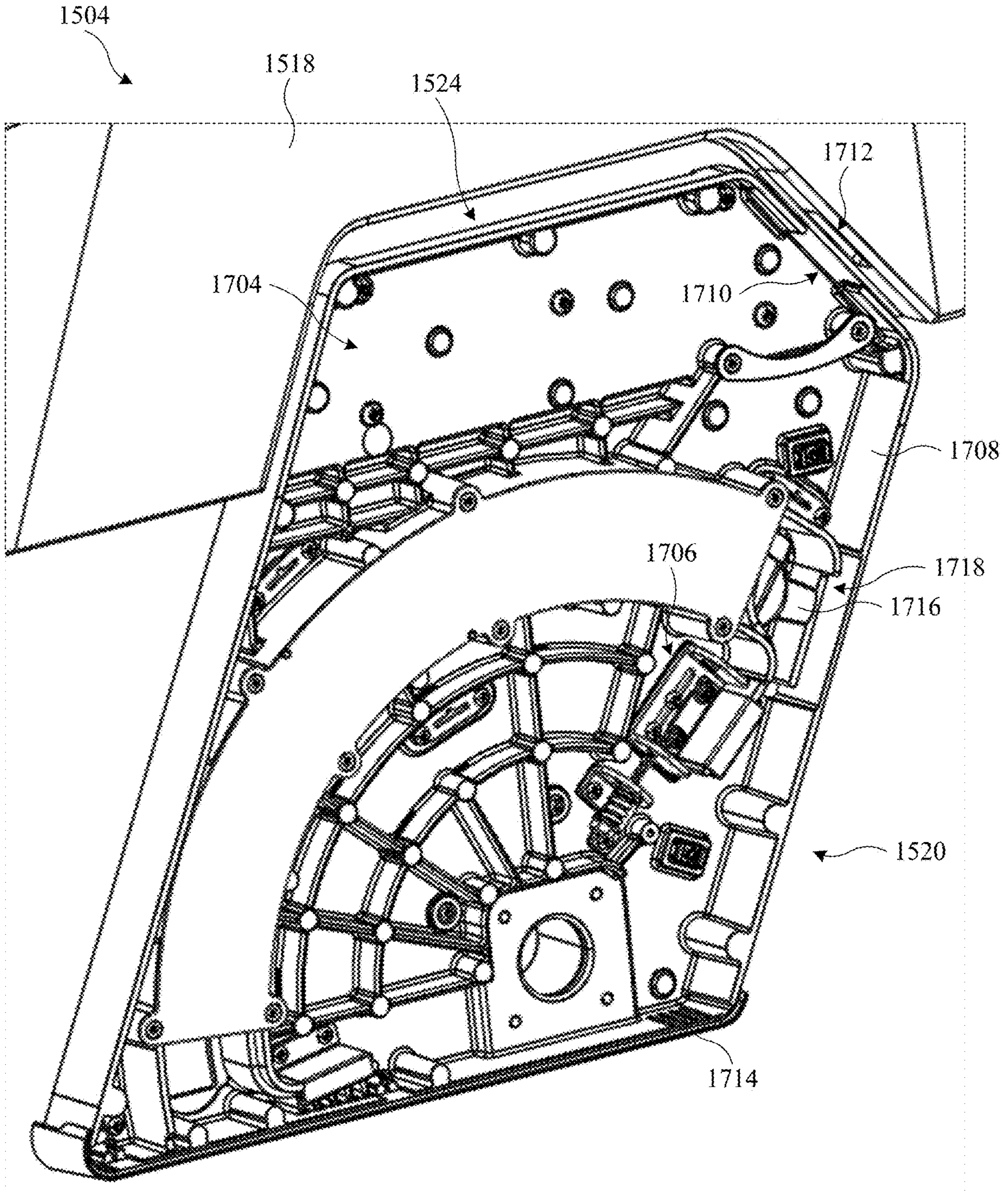
FIG. 17 is a partially exploded view of an ear of the roof assembly of FIG. 16.
Figure 18:
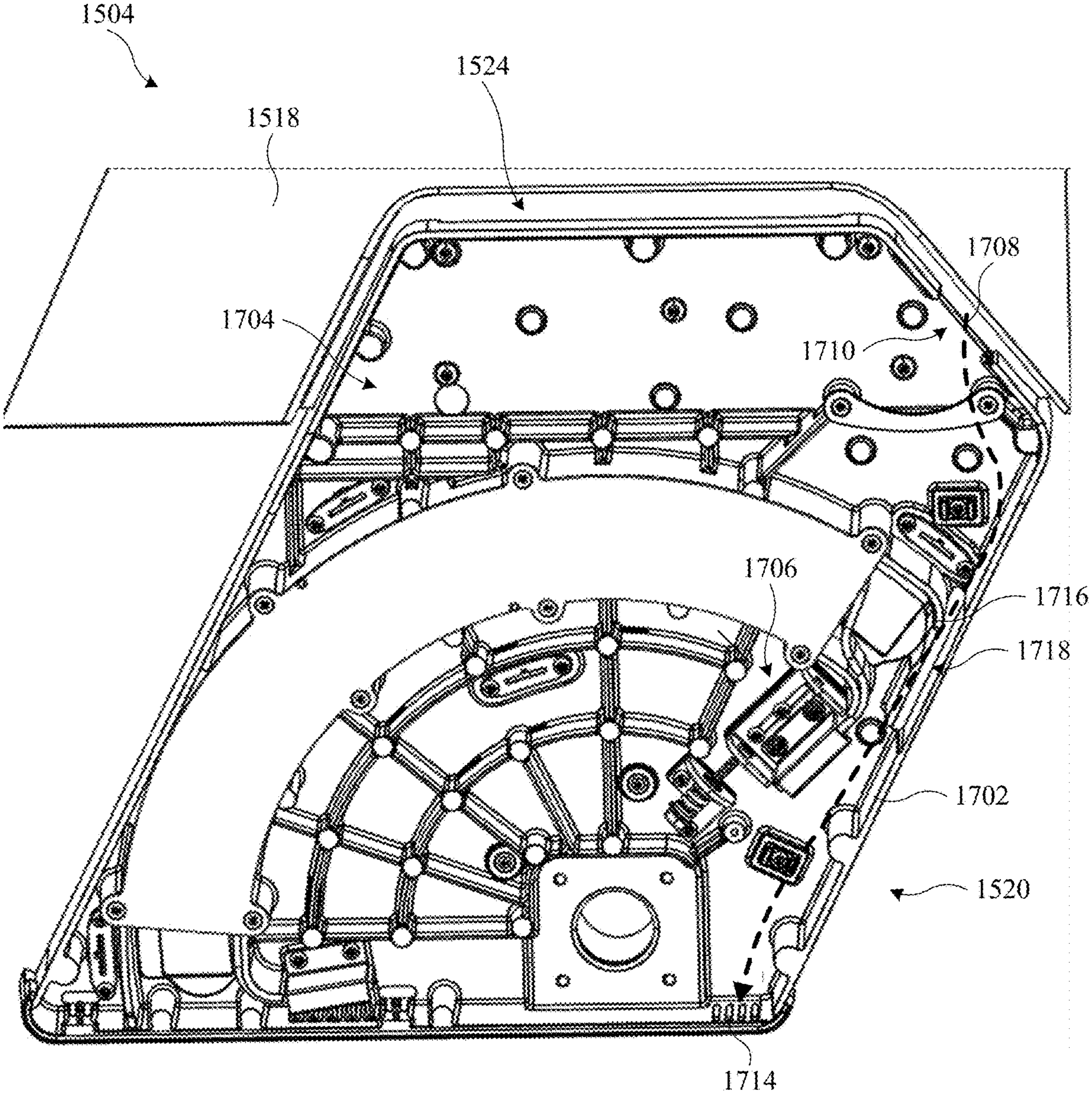
FIG. 18 is another partially exploded view of the ear of the roof assembly of FIG. 16.

FIG. 17 illustrates a perspective view of the first ear 1520 of the roof assembly 1504 shown in FIG. 16. FIG. 18 illustrates a front view of the first ear 1520 shown in FIG. 17. The cover panel 1608 of the first ear 1520 has been removed for simplicity and illustrative purposes. As discussed above, the first ear 1520 may be coupled to the cover 1518 and may be at least partially disposed in the groove 1524 (e.g., a first groove) defined by the cover 1518 along the first side 1522 of the cover 1518. The description herein of the first ear 1520 may also be equally applicable to the second ear 1602. That is, the first ear 1520 and the second ear 1602 may be similar unless otherwise stated. For example, similar to the first ear 1520, the second ear 1602 may also be coupled to the cover 1518 and may be at least partially disposed in the groove 1524 (e.g., a second groove) defined by the cover 1518 along the opposing second side 1526 of the cover 1518.

The first ear 1520 may include a peripheral wall 1702 that at least partially defines a cavity 1704 of the first ear 1520. The peripheral wall 1702 may form substantially all or an entirety of a periphery of the first ear 1520 such that the peripheral wall 1702 may establish a general size and/or shape of the first ear 1520. That is, the peripheral wall 1702 may form a perimeter of the cavity 1704 such that, when the cover panel 1608 is coupled to the first ear 1520, the cavity 1704 is substantially or entirely enclosed by the peripheral wall 1702 and/or the cover panel 1608. As such, one or more components of the first ear 1520, such as a drive system 1706—or a portion thereof—of the first ear 1520, may be enclosed within the cavity 1704.

To protect the drive system 1706 and/or other components located within the cavity 1704 of the first ear (e.g., electronics, wiring, etc.) from fluid, the first ear 1520 may establish a drainage path through the cavity 1704, such as the drainage path 1708 shown in FIG. 18. The drainage path 1708 may be established to route the fluid safely through the cavity 1704 without the water or other fluids contacting the drive system 1706 and/or other components located within the cavity 1704.

By way of example, the peripheral wall 1702 of the first ear 1520 may define an ear opening 1710 along an upper region of the peripheral wall 1702. The ear opening 1710 may align with a cover opening 1712 defined by the cover 1518 such that an interior region (e.g., a cavity) of the cover 1518 may be in fluid communication with the cavity 1704 of the first ear 1520. As illustrated in FIG. 18, fluid may enter the cavity 1704 of the first ear 1520 through the ear opening 1710 and the drainage path 1708 may follow the peripheral wall 1702 such that the fluid may be directed away from the drive system 1706.

The peripheral wall 1702 may further define one or more drainage slots, such as the drainage slots 1714, which may provide the fluid egress from the cavity 1704 of the first ear 1520 (i.e., first-ear drainage slots). The drainage slots 1714 may be any size and/or shape and may be located anywhere along the peripheral wall 1702, such as near a bottom of the peripheral wall 1702 with respect to the elevational direction 1506 of the base station 1500. For example, the peripheral wall 1702 of the first ear 1520 may be configured to direct the fluid (e.g., along the drainage path 1708) towards the drainage slots 1714 of the first ear 1520 between the peripheral wall 1702 and an interior wall 1716 positioned within the cavity 1704 of the first ear 1520. The interior wall 1716 may be located inboard of the peripheral wall 1702 with respect to an exterior of the first ear 1520 such that the interior wall 1716 and the peripheral wall 1702 define a drain channel 1718 therebetween. As such, the fluid may enter the cavity 1704 through the ear opening 1710, flow along the drainage path 1708 between the peripheral wall 1702 and the interior wall 1716 and through the drain channel 1718 to reach the drainage slots 1714, whereby the fluid may exit the first ear 1520 through the drainage slot 1714, thereby preventing the drive system 1706 from being negatively impacted by the fluid.

As discussed above, the second ear 1602 may have a drainage path through a cavity of the second ear 1602 that may be similar to the drainage path 1708 shown in FIG. 18. That is, the second ear 1602 may also include a peripheral wall that at least partially defines a cavity of the second ear 1602, in which the peripheral wall of the second ear 1602 may be similar to the peripheral wall 1702 of the first ear 1520. The peripheral wall of the second ear 1602 may further define one or more drainage slots (e.g., second-ear drainage slots that may be similar to the drainage slots 1714) to provide the fluid egress from the cavity of the second ear 1602. As such, the peripheral wall of the second ear 1602 may be configured to direct the fluid towards the drainage slots of the second ear 1602 between the peripheral wall of the second ear 1602 and an interior wall positioned within the cavity of the second ear 1602 (e.g., similar to the interior wall 1716).

FIG. 18 illustrates a perspective view of the roof assembly 1504. For illustrative purposes, the second ear 1602 has been removed from the groove 1524 located on the opposing second side 1526 of the cover 1518. As discussed above, the base station 1500 may include the roof assembly 1504, which may be movably coupled to the base 1502 and movable between a closed position, in which the roof assembly 1504 encloses the base 1502 (e.g., encloses the landing platform of the base 1502) and directs fluids away from the base 1502 (e.g., away from the landing platform), and an open position, in which the base 1502 (e.g., the landing platform) is unobstructed by the roof assembly 1504.

Figure 19:
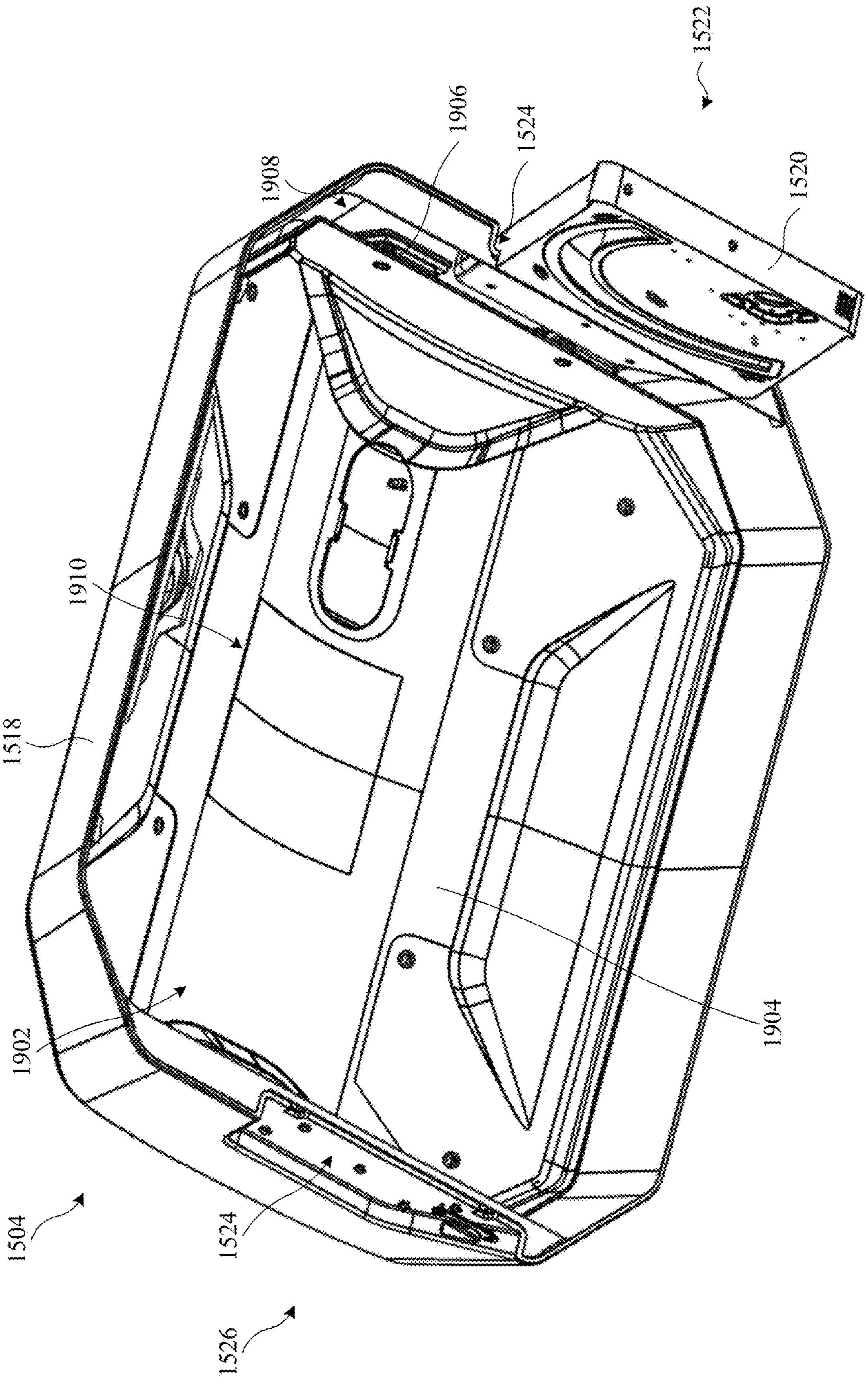
FIG. 19 is a perspective view of the roof assembly of FIG. 16 illustrating a cavity of a cover of the roof assembly.

As shown in FIG. 19, the roof assembly 1504 may define a cavity 1902 therein. The cavity 1902 may be configured to contain a portion of the base 1502, such as the landing platform of the base 1502, and/or a UAV, such as the UAV 10, supported by the base 1502. For example, when the roof assembly 1504 is in the closed position, the landing platform and/or the UAV 10 may be enclosed by the roof assembly 1504 and contained within the cavity 1902. As such, the roof assembly 1504 may direct fluids away from the landing platform and the UAV 10.

The roof assembly 1504 may further include a cover panel 1904 disposed within the cavity 1902, such as along an interior surface of the cover 1518 that at least partially defines an overall size and/or shape of the cavity 1902. The cover panel 1904 may be configured to cover the interior surface of the cover 1518 and/or one or more components coupled to the cover 1518. For example, one or more electrical components, such as antennas 1906, may be coupled to the interior surface of the cover 1518 and positioned within a gap 1908 between the cover panel 1904 and the cover 1518 (e.g., the interior surface of the cover 1518). That is, the antennas 1906 may be located within the cavity 1902 and covered by the cover panel 1904 to protect the antennas 1906 from moisture (e.g., water) and/or debris that may negatively impact operation of the antennas 1906. Other components (e.g., wiring, sensors, mechanical mechanisms, etc.) may also be disposed in the gap 1908 and covered by the cover panel 1904.

The cover panel 1904 may further define a cutout 1910 therein to facilitate wireless communication between the base 1502 (e.g., the landing platform) and an external computing device, such as a computer, tablet, or mobile phone. The cutout 1910 may also facilitate wireless communication between the UAV 10 and the external computing device. For example, the cutout 1910 may be positioned along the cover panel 1904 such that wireless signals transmitted between the UAV 10 and/or the base 1502 and the external computing device may be unobstructed by the cover panel 1904. Thus, wireless communication with the base 1502 and/or UAV 10 may be possible even when the roof assembly 1504 is in the closed position.

Figure 20:
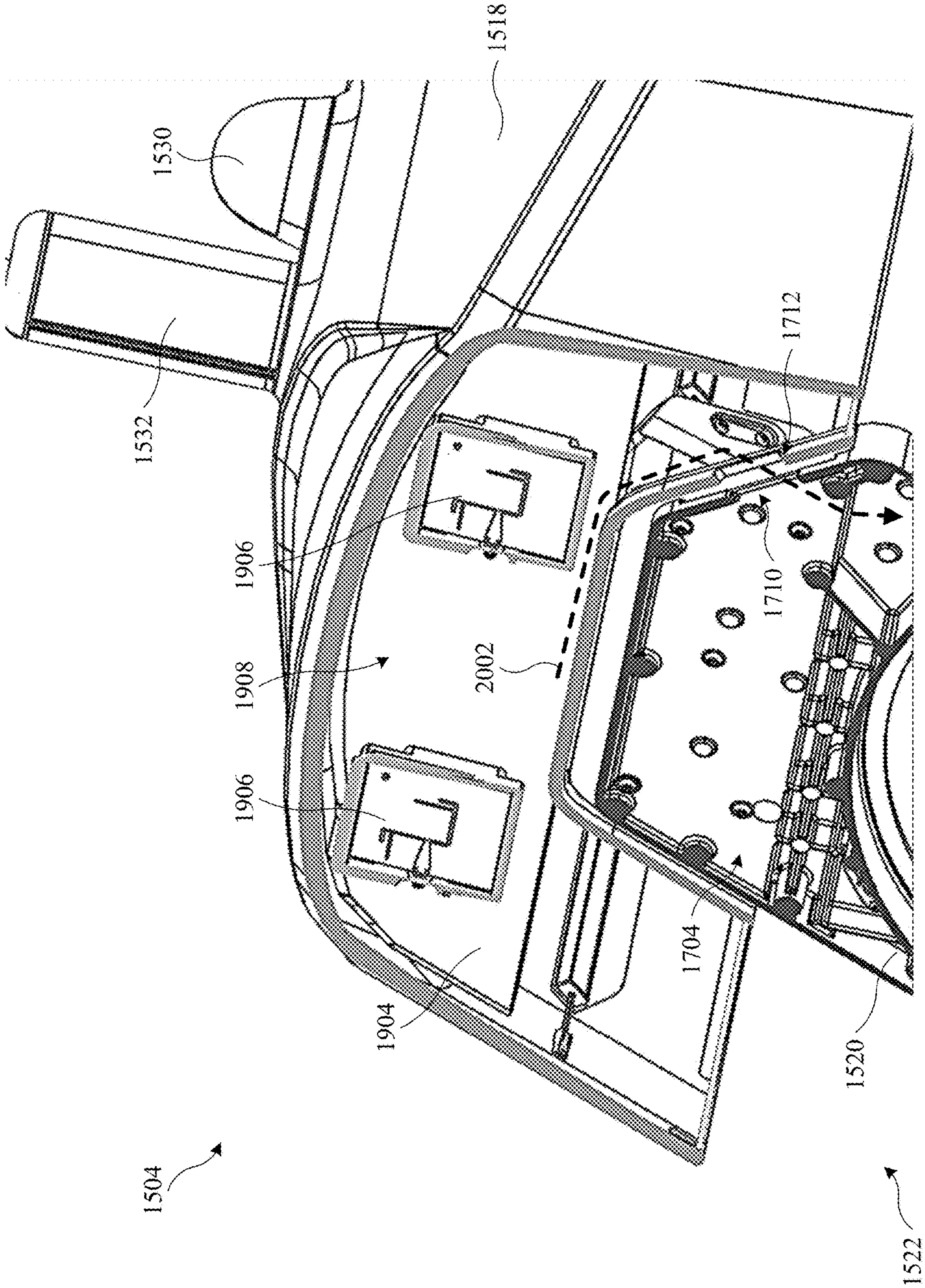
FIG. 20 is a cross-sectional view of the roof assembly of FIG. 16.

FIG. 20 illustrates a cross-sectional view of the roof assembly 1504 along the first side 1522 of the roof assembly 1504 to better illustrate drainage of fluid (e.g., water) through the roof assembly 1504 and the first ear 1520. As discussed above, the roof assembly 1504 may include the cover panel 1904 disposed in the cavity 1902 of the cover 1518, which may cover the antennas 1906 disposed in the gap 1908 between the interior surface of the cover 1518 and the cover panel 1904. In certain circumstances, such as when the roof assembly 1504 is in the open position (e.g., during takeoff and/or landing of the UAV 10), fluid may enter the gap 1908. To drain the fluid from the gap 1908, the cover 1518 and/or the cover panel 1904 may establish a drainage path, such as the drainage path 2002, through the gap 1908 and into the cover opening 1712, at which point the fluid may continue through the ear opening 1710.

Once the fluid enters the ear opening 1710, the fluid may continue along the drainage path 2002 within the cavity 1704 of the first ear 1520 until the fluid reaches the drainage slots 1714 located at the bottom (e.g., with respect to the elevational direction 1506) of the first ear 1520, whereby the fluid may then exit the cavity 1704 of the first ear 1520 and thus be drained from the roof assembly 1504. While a drainage path for the fluid may be established in any position of the roof assembly 1504, the drainage path 2002 shown in FIG. 20 may be facilitated by the roof assembly 1504 being located in the closed position to thereby divert the fluid away from the base 1502 and/or the UAV 10 supported by the base 1502 (e.g. supported by the landing platform).

Figure 21:
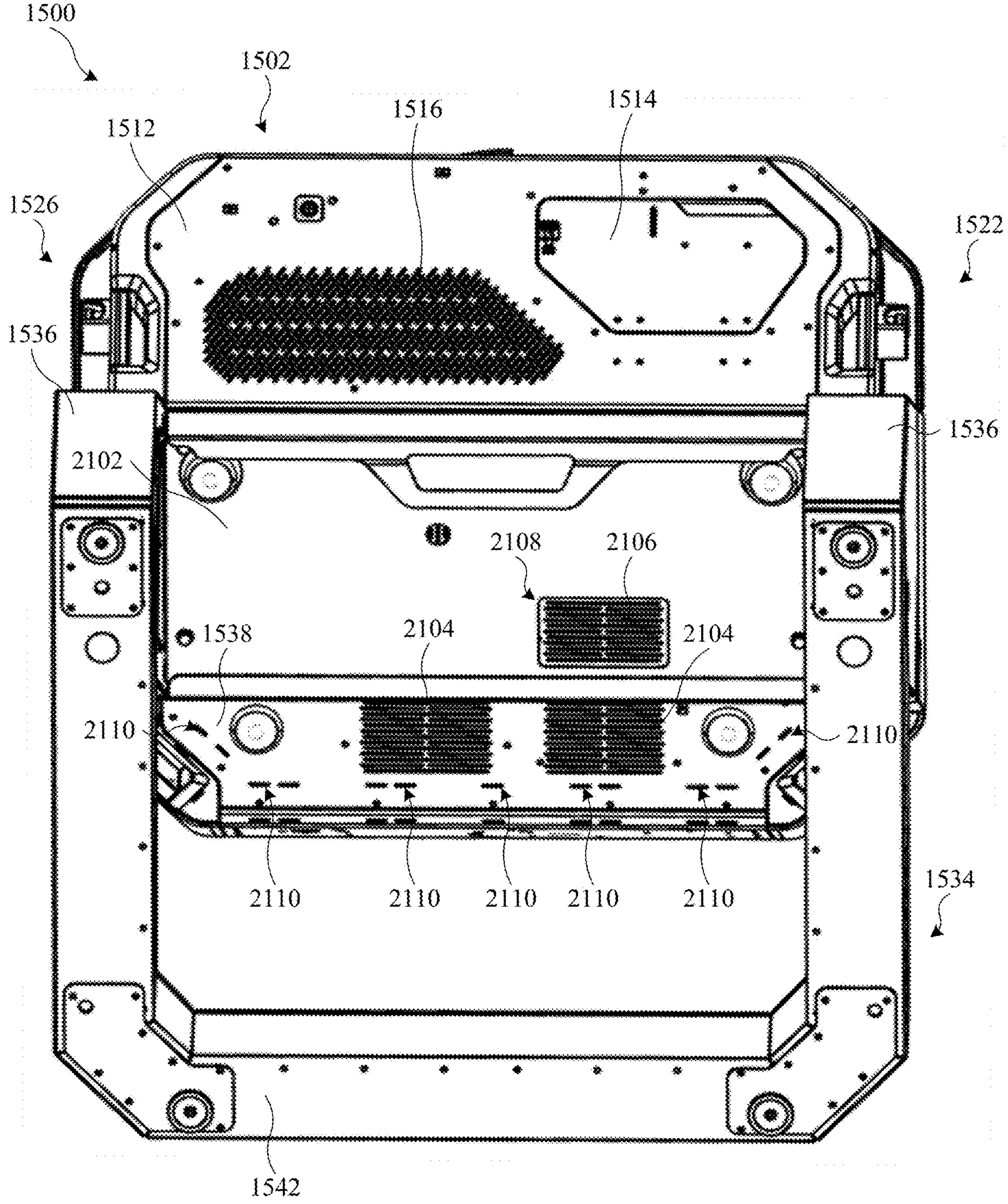
FIG. 21 is a bottom view of the base station of FIG. 15.

FIG. 21 illustrates a bottom view of the base station 1500. As discussed above, the base station 1500 may include the body 1512, which may be supported by the stand 1534 (e.g., the legs 1536 and the frame 1542 of the stand 1534). For example, the lower surface 1538 of the body 1512 may be supported by a support surface 2102 of the stand 1534. The support surface 2102 may extend between the legs 1536 and may be substantially planar to the lower surface 1538 of the body 1512 to thereby support the body 1512. For example, the support surface 2102 may be substantially parallel to the lower surface 1538 of the body 1512 such that, when the body 1512 is secured to the stand 1534, the lower surface 1538 of the body 1512 may be substantially flush with the support surface 2102.

The base 1502 may also include the venting 1516 along one or more surfaces of the body 1512, such as along a front panel of the body 1512 adjacent to the access module 1514. The base 1502 may further include the venting 1516 along the lower surface 1538 of the body 1512 to further promote air circulation within a cavity defined by the body 1512. For example, as shown in FIG. 21, the lower surface 1538 of the body 1512 may define the venting 2104 that is positioned adjacent to the support surface 2102 of the stand 1534. Similarly, the lower surface 1538 may define the venting 2106, which may be positioned within a cutout 2108 defined by the support surface 2102 such that the support surface 2102 does not obstruct the venting 2106. As such, the venting 1516 of the base 1502 may be located anywhere along the body 1512 to effectively thermally regulate the base station 1500.

Additionally, the lower surface 1538 may define drainage slots 2110 therein to provide drainage egress from the cavity of the body 1512. That is, fluids that may enter the cavity of the body 1512 may be directed towards one or more of the drainage slots 2110 to drain the fluid out of the body 1512. The drainage slots 2110 may be located anywhere along the lower surface 1538 or any other surfaces of the body 1512 to effectively drain fluids from the cavity of the body 1512. For example, the drainage slots 2110 may extend substantially around or adjacent to a peripheral edge of the lower surface 1538 such that the drainage slots 2110 are located outboard from one or more components (e.g., electrical components) contained with the cavity of the body 1512 and disposed substantially centrally within the cavity of the body 1512. As such, the fluid may be directed away from such components. The drainage slots 2110 may also be any size and/or shape.

Figure 22:
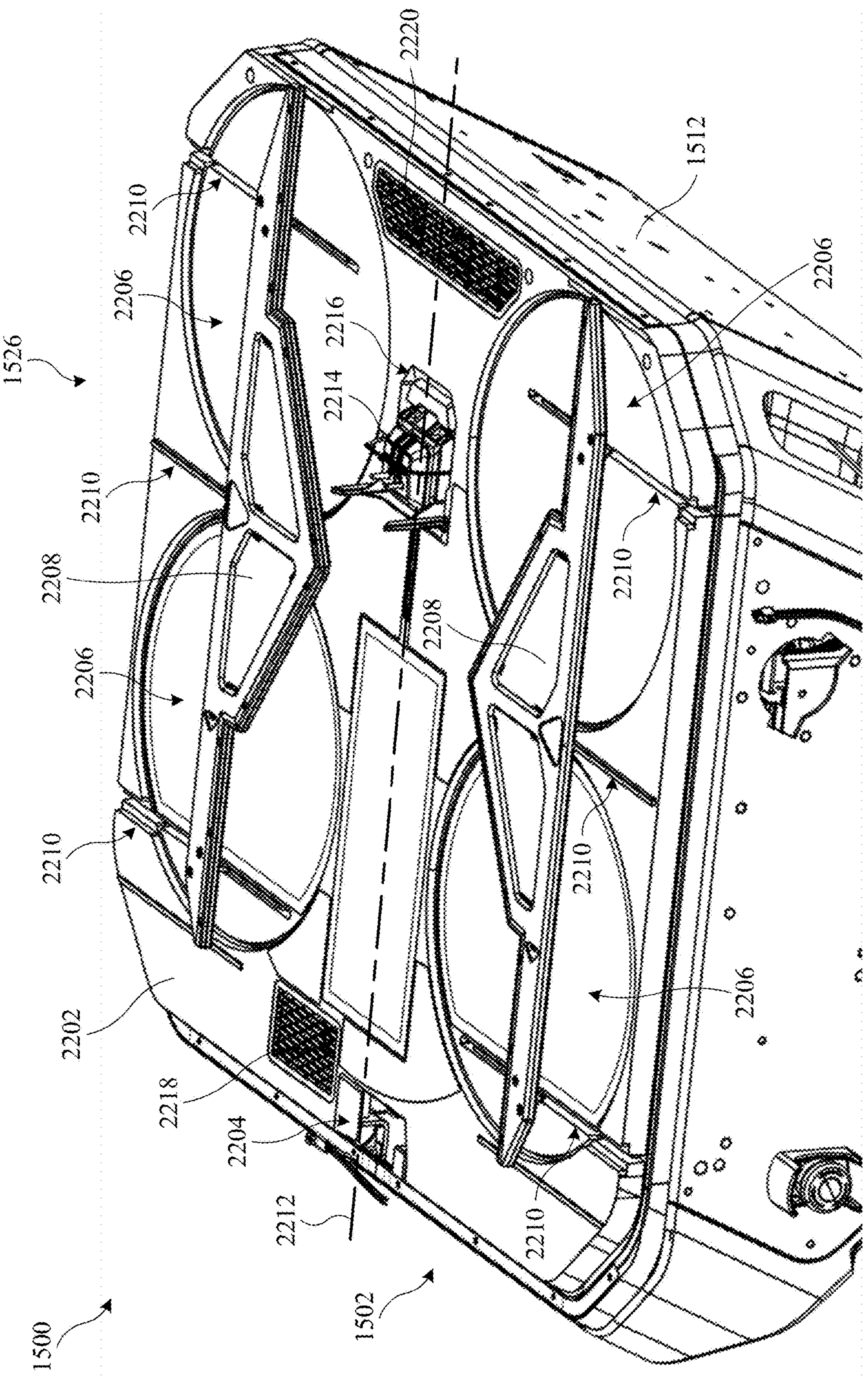
FIG. 22 is a perspective view of the base of the base station of FIG. 15 illustrating a landing platform.
Figure 23:
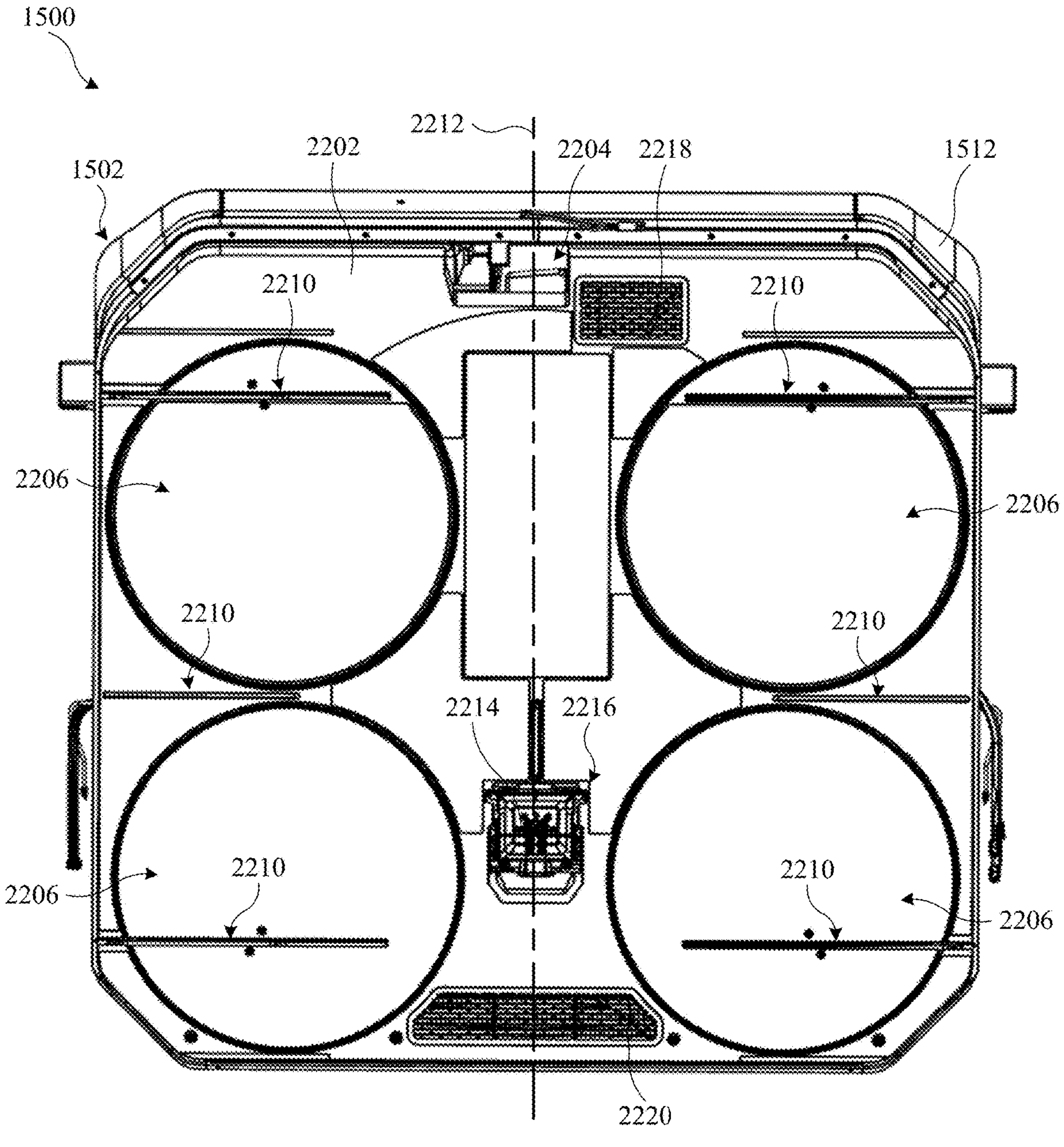
FIG. 23 is a top view of the landing platform of FIG. 22.

FIG. 22 illustrates a perspective view of the base 1502 of the base station 1500 to better illustrate a landing platform 2202 of the base 1502. FIG. 23 illustrates a top view of the landing platform 2202. As discussed above, the base 1502 may include the landing platform 2202, which may be supported by the body 1512 and configured to support the UAV 10. That is, the landing platform 2202 may support the UAV 10 during landing and/or takeoff and may further support the UAV 10 during times of inactivity.

By way of example, the base station 1500 may include the roof assembly 1504, which may be movably coupled to the base 1502 and movable between the closed position, in which the roof assembly 1504 is configured to enclose the landing platform 2202, and an open position, in which the roof assembly 1504 is located at least partially below the landing platform 2202 with respect to the elevational direction 1506 such that the landing platform 2202 is unobstructed by the roof assembly 1504 to facilitate takeoff and landing of the UAV 10. As such, when the UAV 10 is inactive, the roof assembly 1504 may be in the closed positioned and may contain the UAV 10, which may be supported by the landing platform 2202. For example, the roof assembly 1504 may include a latch that is received by a latch opening 2204 defined by the landing platform 2202 such that the roof assembly 1504 may be secured to the body 1512 to enclose the UAV 10 therein.

The landing platform 2202 may define one or more landing areas, such as the landing areas 2206. The landing areas 2206 may be configured to support the UAV 10. That is, the landing areas 2206 may define designated regions of the landing platform 2202 that directly contact and support the UAV 10 (e.g., legs or supports of the UAV 10). For example, during a landing sequence, the UAV 10 may land on the landing platform 2202 such that the UAV 10 contacts one or more of the landing areas 2206. Once the UAV 10 lands on the landing platform 2202, alignment members 2208 may move along alignment slots 2210 inwardly towards the UAV 10 and central region of the landing platform 2202 to move and/or secure the UAV 10 within the central region of the landing platform 2202. The alignment members 2208 are omitted from FIG. 23 for illustrative purposes.

Figure 32:
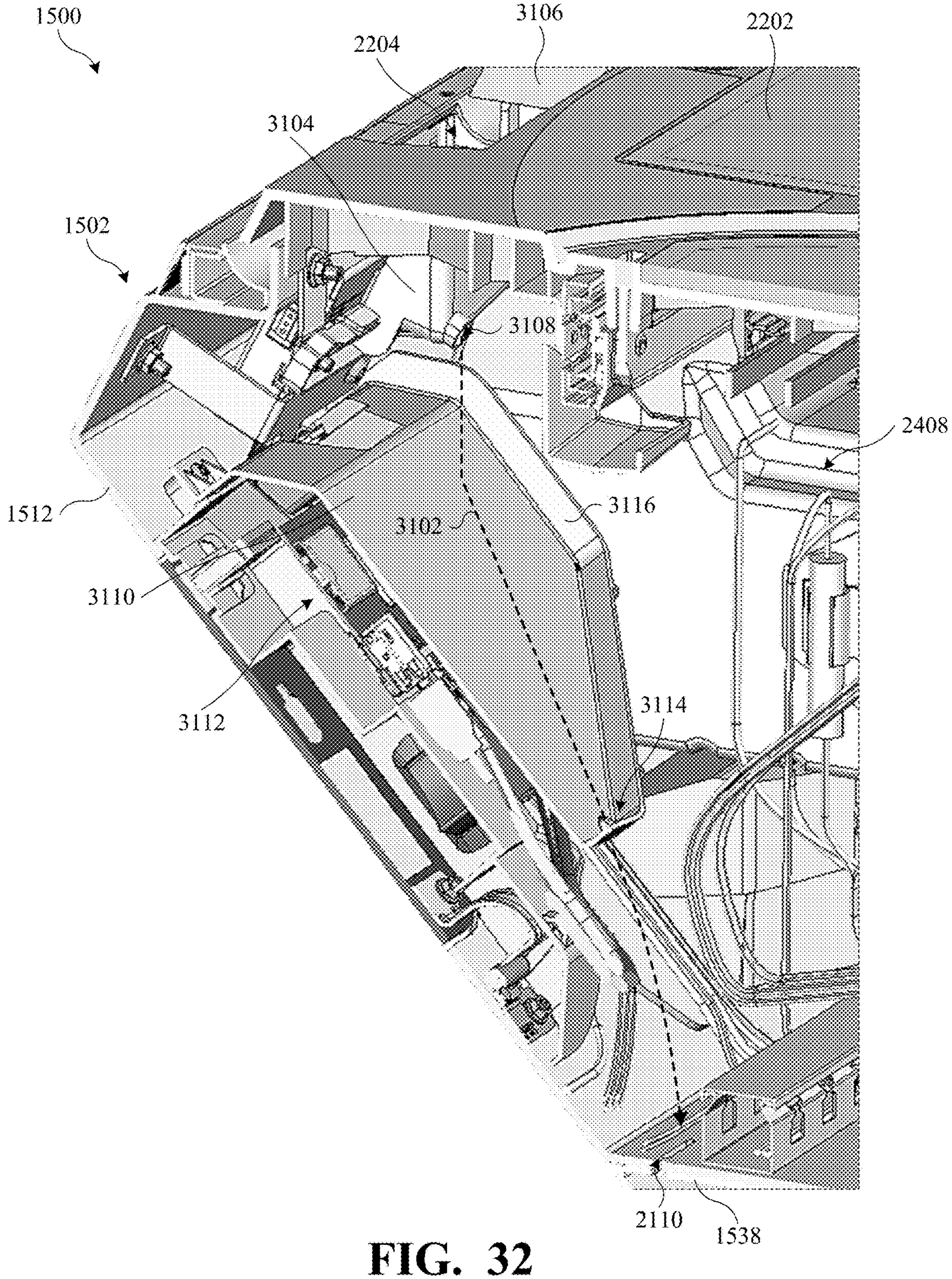
FIG. 32 is another cross-sectional view of the drainage path of FIG. 31.

For example, the UAV 10 may land such that supports or legs of the UAV 10 are positioned within the landing areas 2206. However, the UAV 10 may not land centrally, such as along a longitudinal axis 2212 of the landing platform 2202 that extends in the longitudinal direction 1510 (FIG. 15) of the base station 1500. As a result, the UAV 10 may be unable to properly engage a charging hub 2214 that extends through a hub opening 2216 defined by the landing platform 2202 and is configured to removably couple with the UAV 10 to charge a power supply (e.g., battery) of the UAV 10. As such, the alignment members 2208 may move inward in a direction that is transverse to the longitudinal axis 2212 away from the first side 1522 and the opposing second side 1526 of the body 1512 towards the central region of the landing platform 2202 to contact the UAV 10. As a result, the alignment members 2208 may move the UAV 10 to properly align the UAV 10 with the charging hub 2214 to facilitate charging of the UAV 10 (E.g., charging of the battery of the UAV 10) by the charging hub 2214. For example, as shown in FIGS. 22 and 32, the charging hub 2214 may be located at least partially within a cavity of the body 1512 and extend through the hub opening 2216 defined by the landing platform 2202 to removably couple with the UAV 10.

As discussed above, the roof assembly 1504 may enclose the landing platform 2202 and the UAV 10 to position the UAV 10 within the cavity 1902 of the cover 1518. The landing platform 2202 may define one or more openings therein that permit air flow to reach an area surrounding the landing platform 2202 (e.g., an area surrounding the landing platform 2202 and contained within the cavity 1902 when the roof assembly 1504 is in the closed position). For example, the landing platform 2202 may define one or more openings such as the latch opening 2204, the alignment slots 2210, and the hub opening 2216, which may permit air flow between a cavity of the body 1512 and the area surrounding the landing platform 2202 (e.g., an area external to the landing platform 2202 and external to the cavity of the body 1512).

Additionally, the landing platform may also define one or more openings to permit air flow that is thermally regulated by a thermal management system of the base station 1500 to reach the area surrounding the landing platform 2202. For example, the thermal management system of the base station 1500 may be in communication with the area surrounding the landing platform 2202 via a front thermal management duct and a rear thermal management duct. The landing platform may include a front grate 2218 that is in fluid communication with the thermal management system via the front thermal management duct and a rear grate 2220 that is in fluid communication with the thermal management system via the rear thermal management duct. As such, thermally regulated air may be directed to the area surrounding the landing platform 2202 collectively through the front grate 2218 and the rear grate 2220 and the UAV 10 to thereby maintain a temperature of the area. Moreover, as discussed further herein, fluid (e.g., water) that enters the cavity of the body 1512 through the one or more openings of the landing platform 2202 (e.g., the alignment slots 2210, the latch opening 2204, the hub opening 2216, the front duct opening through the front grate 2218, the rear duct opening through the rear grate 2220, etc.) may be directed towards the drainage slots 2110 of the body 1512 to prevent the fluid from contacting the thermal management system or other components within the cavity of the body 1512. As such, operation of the base station 1500 may remain intact.

Figure 24:
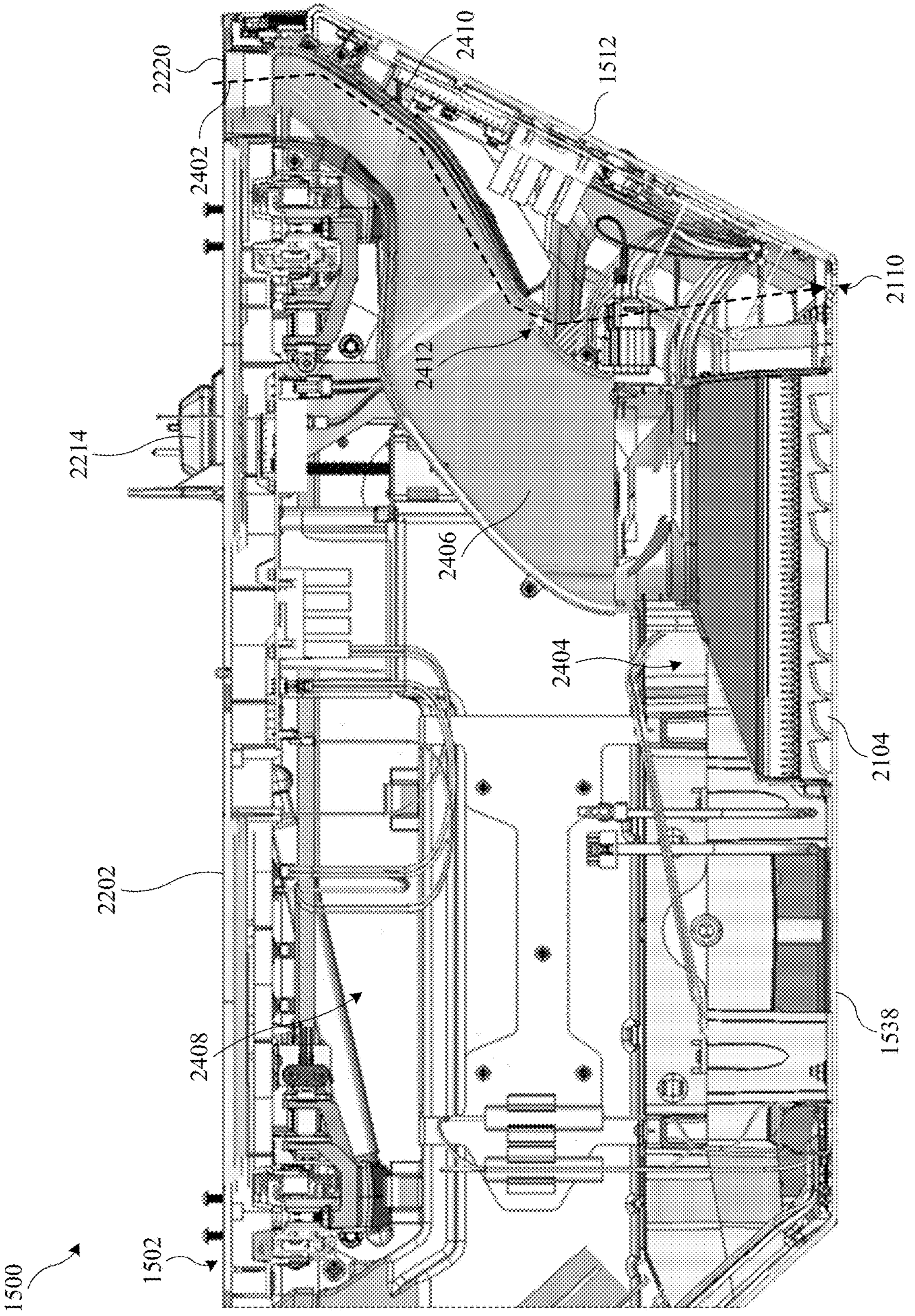
FIG. 24 is a cross-sectional view of the base of FIG. 22 illustrating a drainage path through a rear grate of the landing platform.
Figure 25:
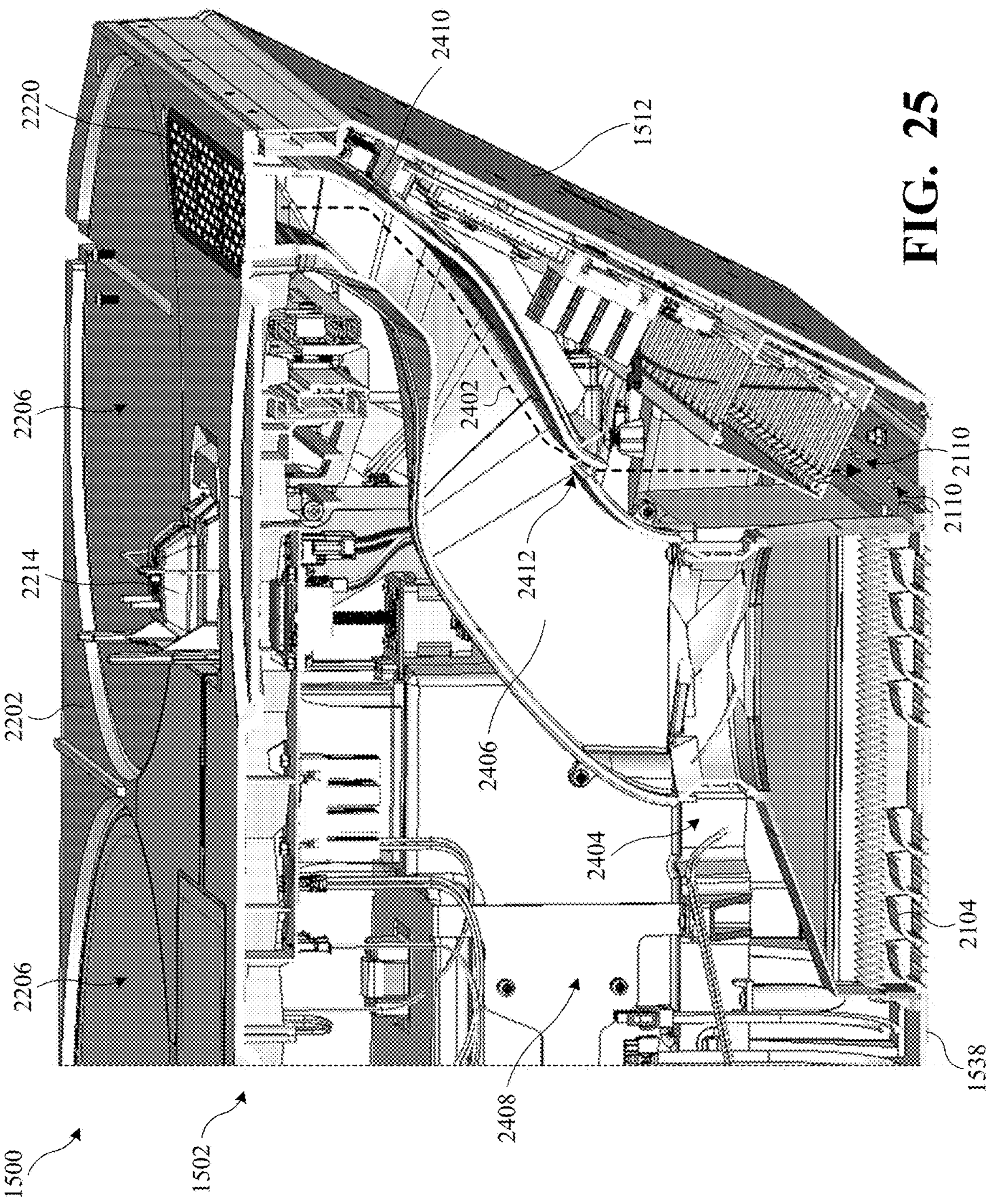
FIG. 25 is another cross-sectional view of the drainage path of FIG. 24.
Figure 26:
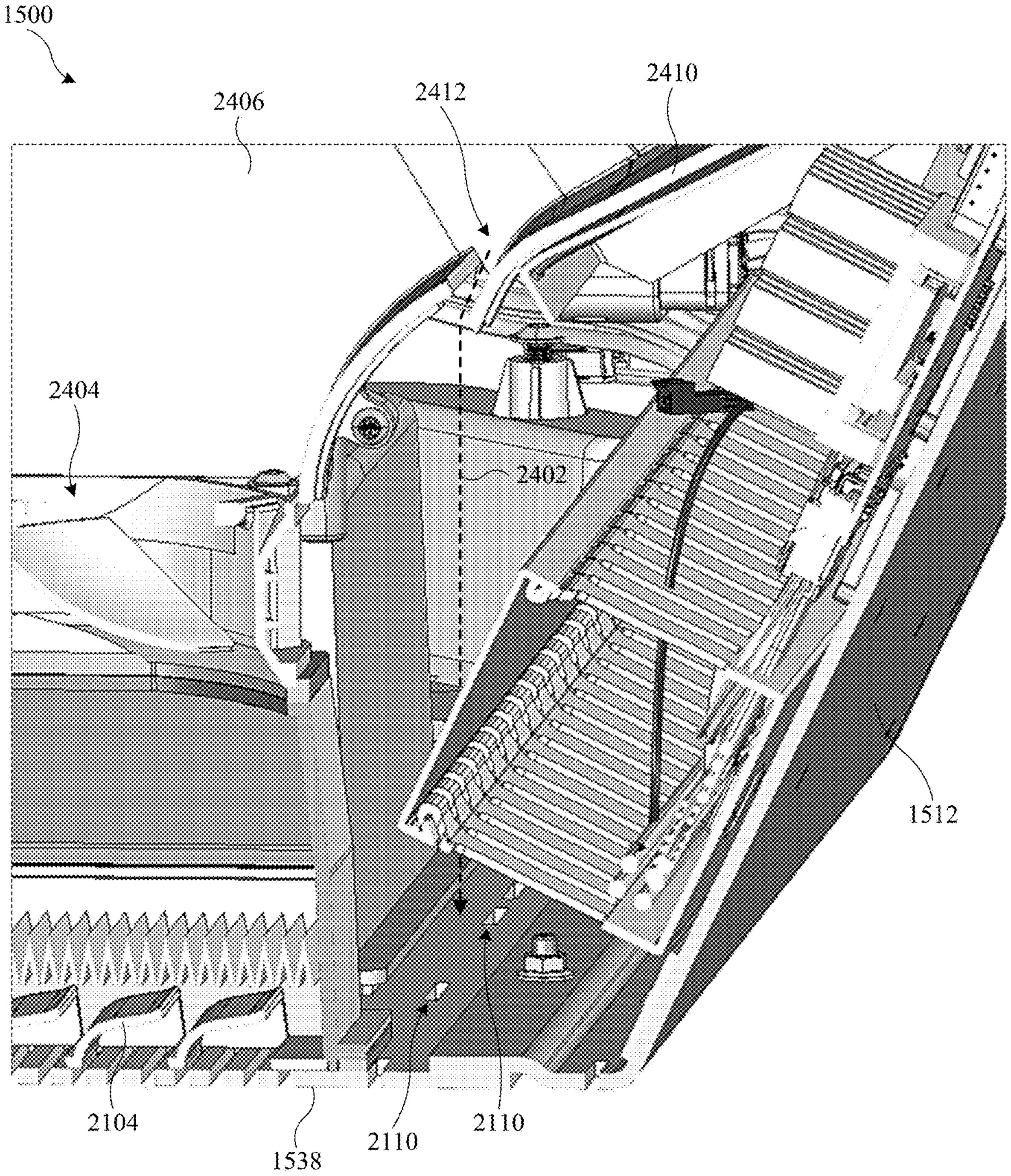
FIG. 26 is a close-up view of the drainage path of FIG. 24.

To better explain drainage of fluids (e.g., water) through the body 1512, FIGS. 24-26 will now be discussed in further detail. FIG. 24 illustrates a cross-sectional view of the base 1502 to illustrate a drainage path 2402 through the rear grate 2220 of the landing platform 2202. FIG. 25 illustrates another cross-sectional view of the drainage path 2402. FIG. 26 provides a close-up view of the drainage path 2402. As described above, the rear grate 2220 may be in fluid communication with a thermal management system of the base station 1500, such as the thermal management system 2404, to direct thermally regulate air from the thermal management system 2404 to the area surrounding the landing platform 2202.

In particular, the thermal management system 2404 may be in fluid communication with the area surrounding the landing platform 2202 via the rear thermal management duct 2406. That is, air may be directed from the thermal management system 2404 through the rear thermal management duct 2406 and out of the rear grate 2220. For example, the thermal management system 2404 may intake external air through the venting of the body 1512, such as the venting

2104 along the lower surface 1538 of the body 1512, condition the air (e.g., heat or cool), and blow the air through the rear thermal management duct 2406 to exit the rear grate 2220. The thermal management system 2404 may be any type of system which may regulate or otherwise control a temperature of the air therein. For example, as shown in FIG. 24, the thermal management system 2404 may be disposed within the cavity 2408 defined by the body 1512 and may include a blower (e.g., fan, impeller, etc.) that directs the air through the rear thermal management duct 2406. As such, the rear thermal management duct 2406 may direct air through the rear grate 2220 to regulate the temperature of the area surrounding the landing platform 2202, whereby the area surrounding the landing platform 2202 may be may contain the UAV 10 and be configured for enclosure by a movable roof assembly coupled to the base 1502 (e.g., the roof assembly 1504).

Due to the rear grate 2220 opening to the area surrounding the landing platform 2202, drainage (e.g., water) may enter the rear thermal management duct 2406 duct through the rear grate 2220. To prevent the water from reaching the thermal management system 2404 or other internal components of the base station 1500 contained within the cavity 2408 of the body 1512, the rear thermal management duct 2406 may direct the drainage (e.g., the water) that enters the rear thermal management duct 2406 through the rear grate 2220 towards one or more of the drainage slots 2110 of the body 1512 along the lower surface 1538 of the body 1512.

By way of example, the rear thermal management duct 2406 may include a duct wall 2410 that defines one or more drainage openings therein, such as the drainage opening 2412. The drainage (e.g., the water) may flow along the duct wall 2410 and through the one or more drainage openings (e.g., the drainage opening 2412) to reach the drainage slots 2110, as illustrated by the drainage path 2402 shown in FIGS. 24-26. For example, the duct wall 2410 may be a tapered or otherwise curved wall of the rear thermal management duct 2406 that may direct the drainage (e.g., the water) through the drainage opening 2412 such that the water is prevented from reaching the thermal management system 2404. Instead, the water may flow through the drainage opening 2412 and towards the drainage slots 2110, at which point the water may exit the cavity 2408 of the body 1512 through the lower surface 1538 of the body 1512 (e.g., through the drainage slots 2110). It should also be noted that while the drainage path 2402 is illustrated as flowing along the duct wall 2410, the drainage path 2402 in some configurations may also flow along or otherwise contact more than the duct wall 2410. For example, the drainage path 2402 may extend along a plurality of duct walls of the rear thermal management duct 2406 based upon curvature (e.g., bends) along the rear thermal management duct 2406.

Figure 27:
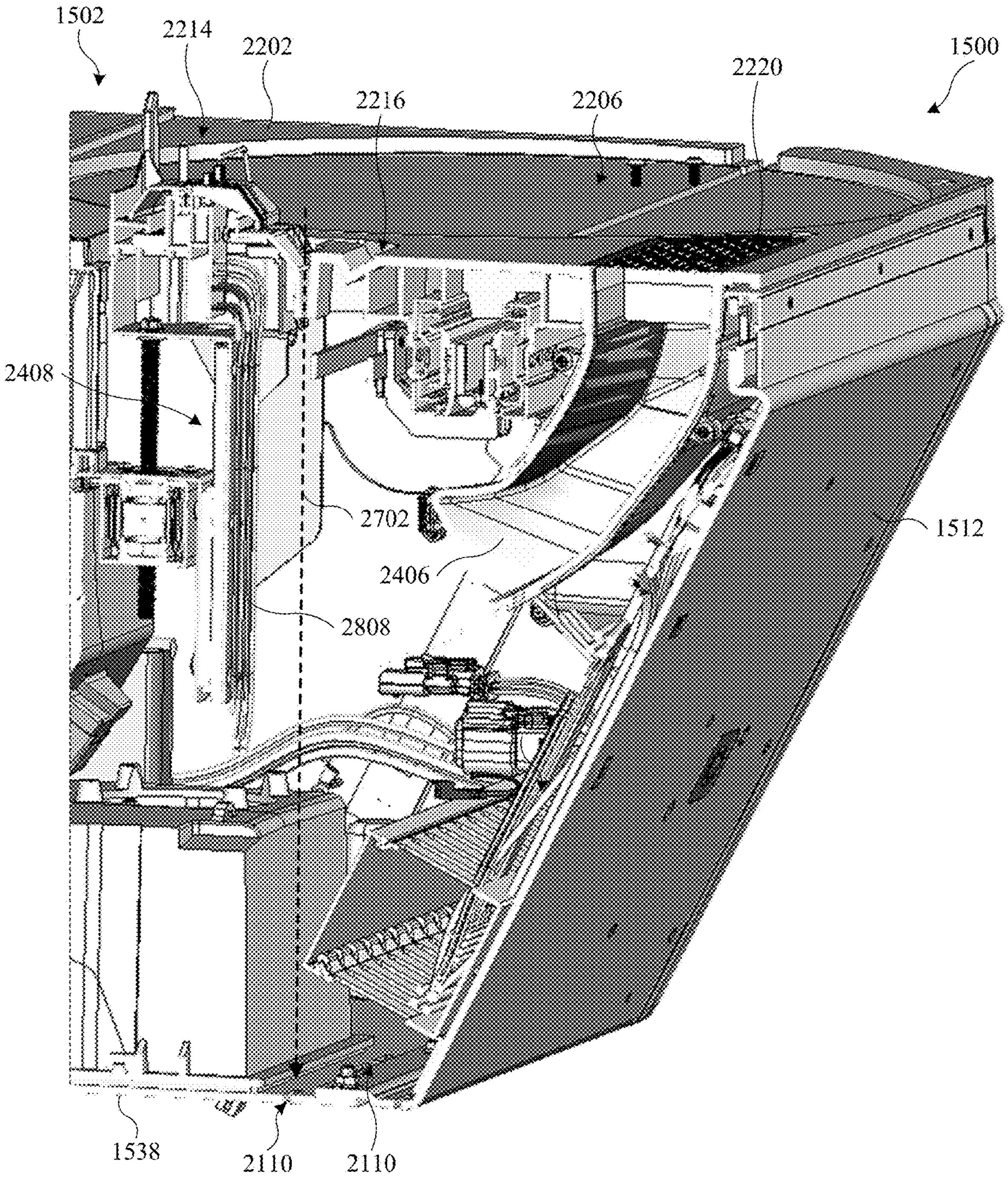
FIG. 27 is a cross-sectional view of the base of FIG. 22 illustrating a drainage path through a hub opening of the landing platform.
Figure 28:
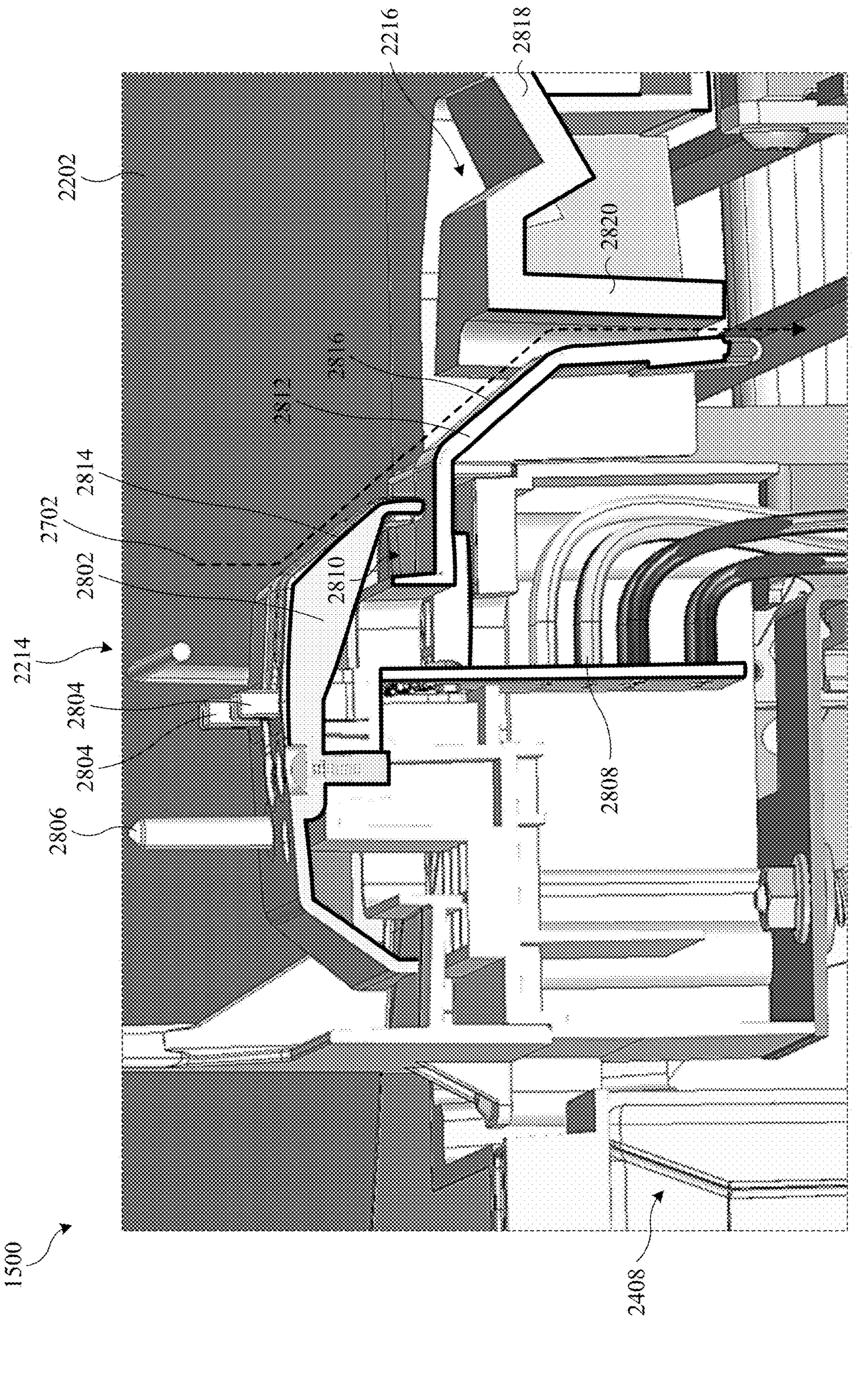
FIG. 28 is a close-up view of the drainage path of FIG. 27.

In addition to directing drainage through the rear thermal management duct 2406 towards one or more of the drainage slots 2110, the base station 1500 may also direct drainage through the hub opening 2216 towards one or more of the drainage slots 2110. FIG. 27 is another cross-sectional view of the base 1502 illustrating a drainage path 2702 through the hub opening 2216 of the landing platform 2202. FIG. 28 is a close-up view of the drainage path 2702 through the hub opening 2216, further illustrating drainage of water that enters the cavity 2408 of the base 1502 through the hub opening 2216. As shown, the charging hub 2214 may direct the drainage (e.g., the water) that enters the hub opening 2216 towards the one or more of the drainage slots 2110. The drainage path 2702 may direct the water towards the same drainage slots 2110 as the drainage path 2402 through the rear thermal management duct 2406 or the drainage path 2702 may direct the water towards different drainage slots 2110.

The charging hub 2214 may be configured to removably couple with the UAV 10 to charge a power source (e.g., a battery) of the UAV 10. To facilitate charging of the UAV 10, the charging hub 2214 may include an upper portion 2802 located above the landing platform 2202 with respect to the elevational direction 1506 that is configured to contact the UAV 10. The upper portion 2802 may project through the hub opening 2216 such that a portion of the upper portion 2802 may be located above the landing platform 2202 (e.g., above a landing surface of the landing platform 2202). Alternatively, the upper portion 2802 may be located entirely above the landing platform 2202 (e.g., above the landing surface of the landing platform 2202) to removably couple with the UAV 10. By way of example, the upper portion 2802 of the charging hub 2214 may include one or more alignment pins 2804 projected from the upper portion 2802, which may be received by, or otherwise contact, the UAV 10 to properly align the UAV 10 with one or more electrical contacts, such as the electrical contact 2806, projecting from the upper portion 2802. For example, the alignment pins 2804 may align a respective contact of the UAV 10 with the electrical contact 2806 of the charging hub 2214 such that electrical communication may be established between the electrical contact 2806 and the battery of the UAV 10 to facilitate charging of the battery of the UAV 10. The electrical contact 2806 may be connected to wiring 2808 of the charging hub 2214, which may be connected to a power source of the base station 1500 and/or an external power source (e.g., wall outlet or other external power source) to provide power to the UAV 10. It should be noted that the electrical contact 2806 may be any size and/or shape to effectively contact the UAV 10 and/or the battery of the UAV 10 for charging. For example, the electrical contact 2806 may be spring-loaded or fixed, may be a pin or other projection extending from or through the upper portion 2802 of the charging hub 2214, or may be a contact surface of the upper portion 2802, such as an upper surface of the upper portion 2802.

The wiring 2808 may be disposed within the cavity 2408 of the body 1512 and positioned adjacent to an air gap 2810 of the charging hub 2214. In particular, the charging hub 2214 may further include a lower portion 2812 that is located at least partially within the cavity 2408 of the body 1512 and may extend through the hub opening 2216. The lower portion 2812 may be spaced apart from the upper portion 2802 to define the air gap 2810 therebetween. As such, the air gap 2810 may promote air flow around the wiring 2808 and/or through the air gap 2810 to regulate a temperature of the wiring 2808 and thus regulate a temperature of the charging hub 2214.

As discussed above, drainage (e.g., water) may enter the cavity 2408 of the body 1512 through the hub opening 2216, which may negatively impact operation of the charging hub 2214 and/or other internal components of the base station 1500 located within the cavity 2408 of the body 1512 (e.g., the thermal management system 2404) if the drainage were to contact such components. To prevent the drainage from contacting such components, the upper portion 2802 of the charging hub 2214 may direct the drainage (e.g., the water) along the lower portion 2812 of the charging hub 2214 towards one or more of the drainage slots 2110. As such, the upper portion 2802 may direct the water along the lower portion 2812 towards the drainage slots 2110 to prevent the water from entering the air gap 2810 and reaching the wiring 2808 of the charging hub 2214, as illustrated by the drainage path 2702.

By way of example, the upper portion 2802 of the charging hub 2214 may include a tapered surface 2814 that directs the water along a tapered surface 2816 of the lower portion 2812 towards the drainage slots 2110. As the wiring is positioned adjacent to the air gap 2810 on opposing side of the air gap 2810 with respect to the tapered surface 2814 of the upper portion 2802 and the tapered surface 2816 of the lower portion 2812, the water may be directed away from the air gap 2810 to prevent the water from contacting the wiring 2808. That is, the upper portion 2802 and the lower portion 2812 may be positioned relative to one another in a nested manner such that the lower portion 2812 is at least partially nested within confines of the upper portion 2802 or is otherwise beneath the upper portion 2802 with respect to a lateral direction to ensure the drainage path 2702 is directed away from the air gap 2810.

To even further direct the water away from the air gap 2810, the charging hub 2214 may further include a deflector 2818. The deflector 2818 may be positioned at least partially within the hub opening 2216 and located adjacent to the lower portion 2812 (e.g., adjacent to the tapered surface 2816 of the lower portion 2812). As such, the charging hub 2214 may direct the water along the lower portion 2812 (e.g., along the tapered surface 2816 of the lower portion 2812) between the lower portion 2812 and a wall 2820 of the deflector 2818 to better define the drainage path 2702 and ensure that the water is directed towards the drainage slots 2110. A position of the wall 2820 of the deflector 2818 with respect to the lower portion 2812 is not particularly limited and may be adjusted and/or oriented in any desired manner to help define the drainage path 2702 of the water.

Figure 29:
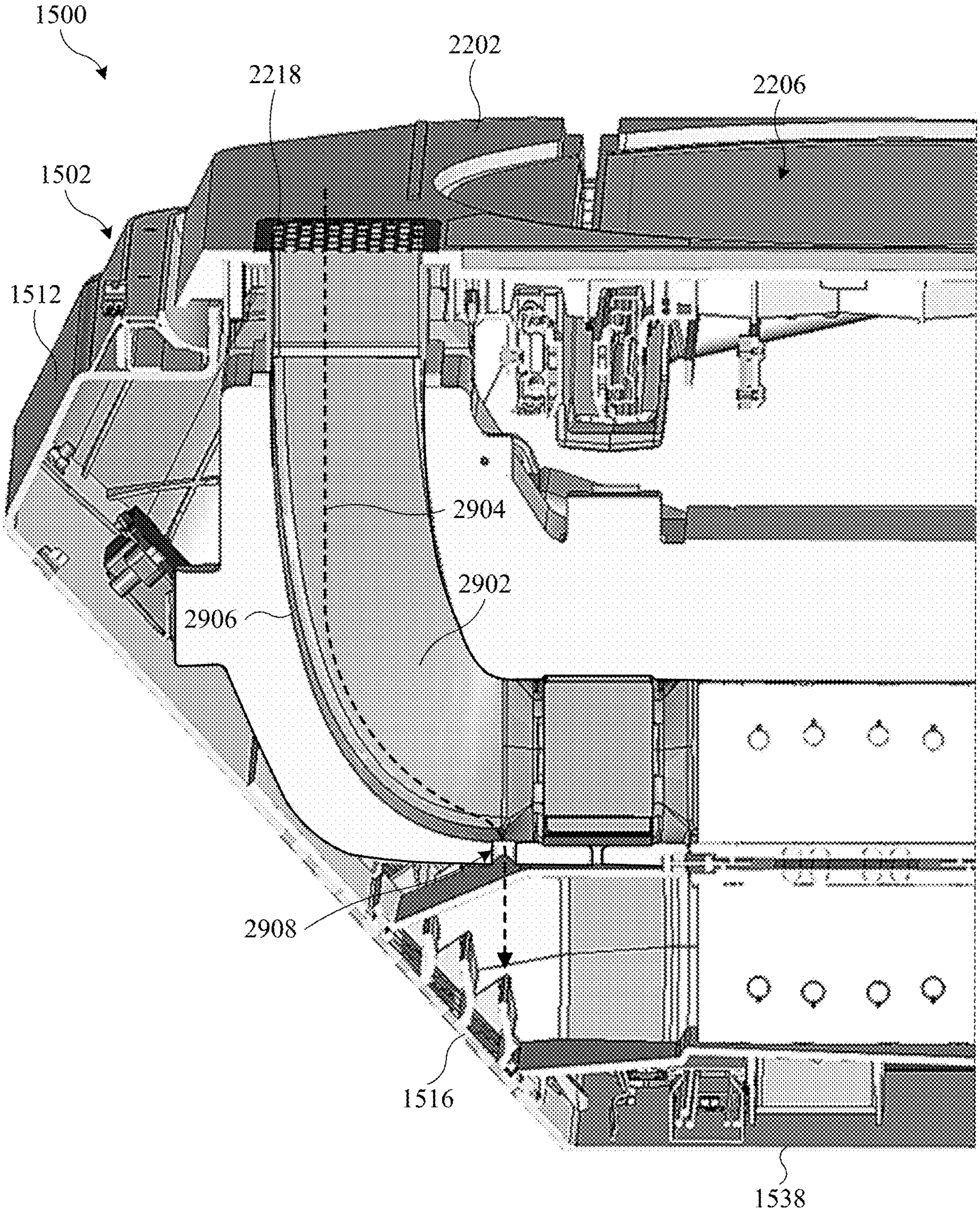
FIG. 29 is a cross-sectional view of the base of FIG. 22 illustrating a drainage path through a front grate of the landing platform.
Figure 30:
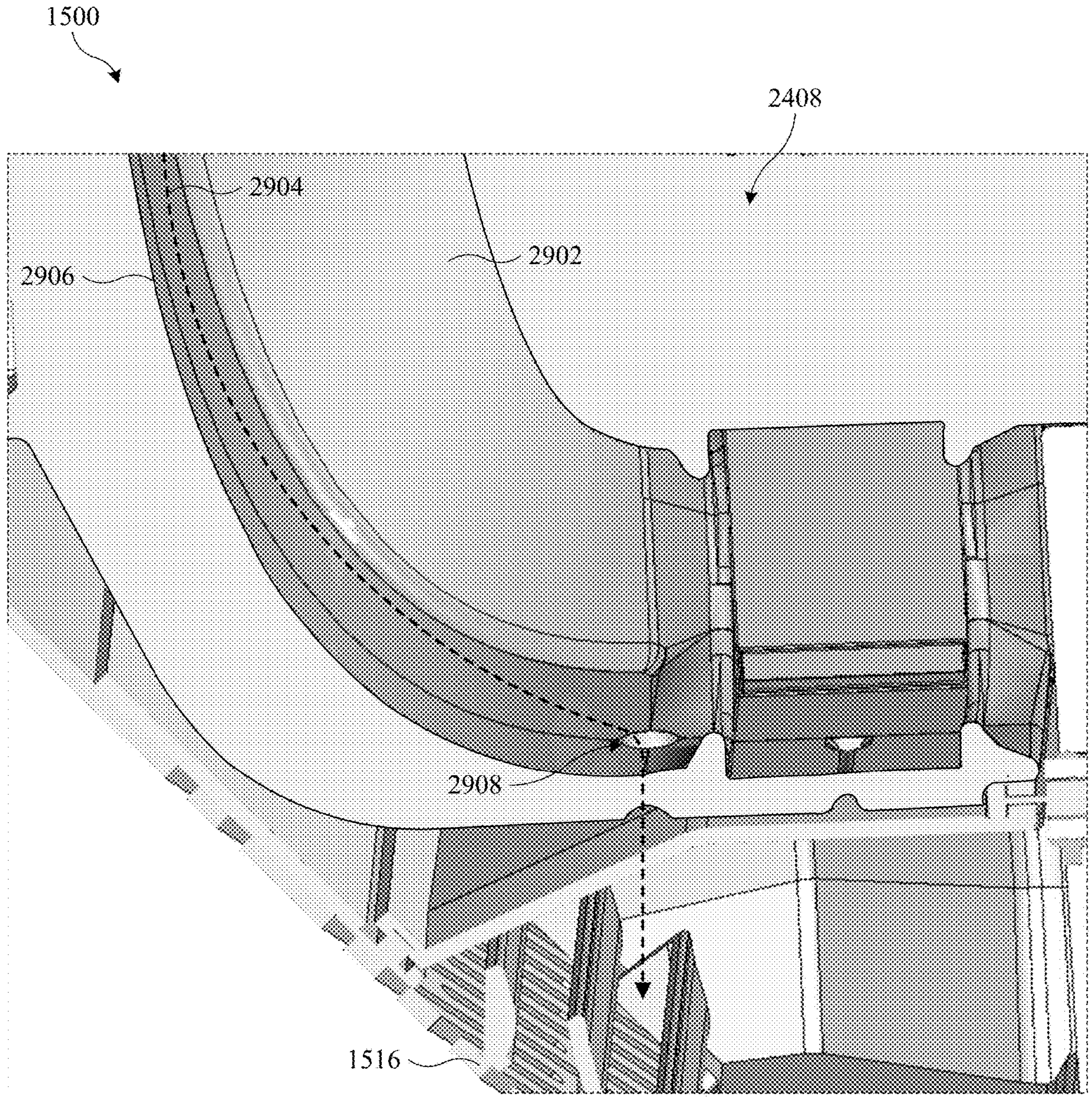
FIG. 30 is a close-up view of the drainage path of FIG. 29.

In addition to directing drainage through the rear thermal management duct 2406 and the hub opening 2216 towards one or more of the drainage slots 2110, the base station 1500 may also direct drainage through a front thermal management duct 2902 towards one or more of the drainage slots 2110 and/or the venting of the base 1502 (e.g., the venting 1516, the venting 2104, the venting 2106, or a combination thereof) to even further direct drainage (e.g., water) away from internal components of the base station 1500 located within the cavity 2408 of the base 1502. FIG. 29 is another cross-sectional view of the base 1502 illustrates a drainage path 2904 through the front grate 2218 of the landing platform 2202 and within the front thermal management duct 2902. FIG. 30 is a close-up view of the drainage path 2904 through the front thermal management duct 2902.

The front thermal management duct 2902 may direct the drainage (e.g., the water) that enters the front thermal management duct 2902 through the front grate 2218 towards one or more of the drainage slots 2110 of the body 1512. The thermal management system 2404 discussed above may be in fluid communication with the area surrounding the landing platform 2202 via the rear thermal management duct 2406 and the front thermal management duct 2902. That is, air may be directed from the thermal management system 2404 through the rear thermal management duct 2406 and out of the rear grate 2220. The air may be further directed from the thermal management system 2404 through the front thermal management duct 2902 and out of the front grate 2218. As such, the thermal management system 2404 may control a temperature of the air therein, which may regulate a temperature of the area surrounding the landing platform 2202 (and the UAV 10).

Due to the front grate 2218 opening to the area surrounding the landing platform 2202, drainage (e.g., water) may enter the front thermal management duct 2902 through the front grate 2218. To prevent the water from reaching the thermal management system 2404 or other internal components of the base station 1500 contained within the cavity 2408 of the body 1512, the front thermal management duct 2902 may direct the drainage (e.g., the water) that enters front thermal management duct 2902 through the front grate 2218 towards one or more of the drainage slots 2110 of the body 1512 along the lower surface 1538 of the body 1512 and/or towards venting (e.g., the venting 1516, the venting 2104, the venting 2106, or a combination thereof) of the body 1512.

By way of example, the front thermal management duct 2902 may include a duct wall 2906 that defines one or more drainage openings therein, such as the drainage opening 2908. The drainage (e.g., the water) may flow along the duct wall 2906 and through the one or more drainage openings (e.g., the drainage opening 2908) to reach the drainage slots 2110 and/or the venting, such as the venting 1516, as illustrated by the drainage path 2904 shown in FIGS. 29 and 30. For example, the duct wall 2906 may direct the drainage (e.g., the water) through the drainage opening 2908 such that the water is prevented from reaching the thermal management system 2404. Instead, the water may flow through the drainage opening 2908 and towards the venting 1516 and/or the drainage slots 2110, at which point the water may exit the cavity 2408 of the body 1512 through the lower surface 1538 of the body 1512. It should also be noted that while the drainage path 2904 is illustrated as flowing along the duct wall 2906, the drainage path 2904 in some configurations may also flow along or otherwise contact more than the duct wall 2906. For example, the drainage path 2904 may extend along a plurality of duct walls of the front thermal management duct 2902 based upon a curvature (e.g., bends) along the front thermal management duct 2902.

As discussed above, the landing platform 2202 may also define a latch opening 2204 therein, which may receive a latch of the roof assembly 1504 to secure the roof assembly 1504 to the base 1502 (e.g., to the body) when the roof assembly 1504 is in the closed position. Due to the latch opening 2204 being exposed to the area surrounding the landing platform 2202, drainage (e.g., water) may also enter the cavity 2408 of the body 1512 through the latch opening 2204. Similar to the front thermal management duct 2902, the rear thermal management duct 2406, and the hub opening 2216, water that enters the cavity 2408 through the latch opening 2204 may be directed towards one or more of the drainage slots 2110 of the body 1512.

Figure 31:
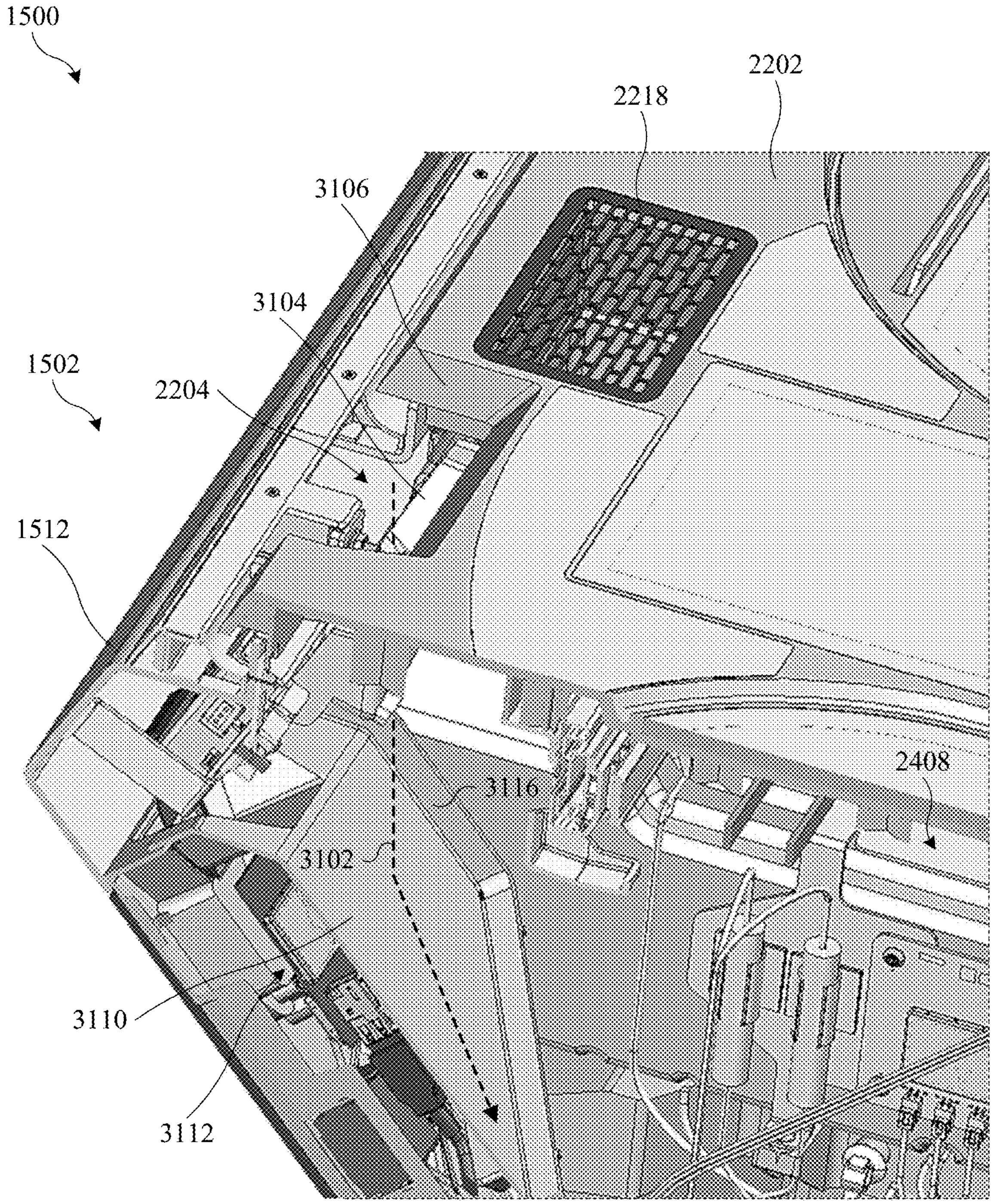
FIG. 31 is a cross-sectional view of the base of FIG. 22 illustrating a drainage path through a latch opening of the landing platform.
Figure 33:
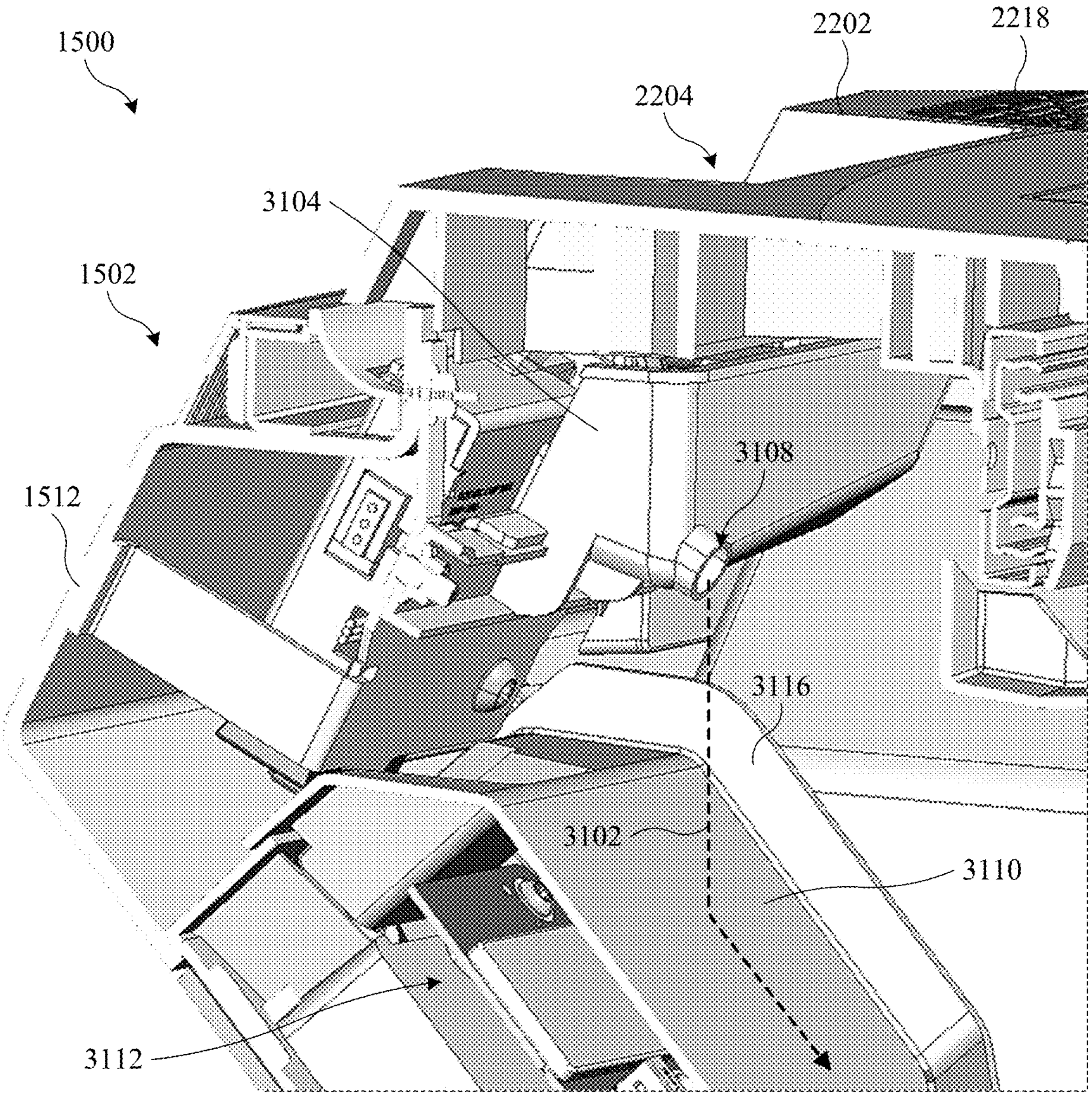
FIG. 33 is a close-up view of the drainage path of FIG. 31.

To further illustrate, FIG. 31 is another cross-sectional view of the base 1502 illustrating a drainage path 3102 through the latch opening 2204. FIGS. 32 and 33 are close-up views of the drainage path 3102 through the latch opening 2204, further illustrating drainage of water that enters the cavity 2408 of the base 1502 through the latch opening 2204. As shown, the latch opening 2204 may direct drainage (e.g., water) that enters the latch opening 2204 towards the drainage slots 2110. The drainage path 3102 may direct the water towards the same drainage slots 2110 as other drainage paths within the base 1502 (e.g., the drainage path 2402, the drainage path 2702, or the drainage path 2904) or the drainage path 3102 may direct the water towards different drainage slots 2110.

By way of example, the latch opening 2204 may be in fluid communication with a catch basin 3104 located within the cavity 2408 of the base 1502. That is, the latch opening

2204 may direct the drainage (e.g., the water) into the catch basin 3104. For example, the latch opening 2204 may be defined by a tapered surface 3106—or more than one tapered surface—of the landing platform 2202, whereby the tapered surface 3106 may direct the water into the catch basin 3104. The catch basin 3104 may define a basin opening 3108 near a bottom of the catch basin 3104 with respect to the elevational direction 1506 of the base station 1500 such that water that enters the catch basin 3104 may be direct through the basin opening 3108 and onto a shield 3110 that is located within the cavity 2408 of the body 1512. The shield 3110 may be adapted to protect (e.g., cover) electronics 3112 of the base station 1500 that are contained within the cavity 2408 of the body 1512. The electronics 3112 are not particularly limited to any type of device or component.

As illustrated by the drainage path 3102, once the water reaches the shield 3110, such as along the top surface of the shield 3110, the water may be directed along the shield 3110 to a shield opening 3114 defined by the shield 3110 and located near a bottom of the shield 3110 with respect to the elevational direction 1506 of the base station 1500. The shield 3110 may also include a flange 3116 projecting from the shield 3110 (e.g., projection from the top surface of the shield 3110) such that water directed (e.g., flowing) along the shield 3110 may be directed towards the shield opening 3114 and contained along the shield 3110. Once the water reaches the shield opening 3114, the water may be further directed towards one or more of the drainage slots 2110 of the body 1512 located along the lower surface 1538 of the body 1512 such that the water may exit the cavity 2408 of the body 1512 without contacting the electronics 3112 therein.

As discussed above, the landing platform 2202 may also define the alignment slots 2210 therein, which may guide a respective one of the alignment members 2208 to engage the UAV 10 and thereby align the UAV 10 with respect to the landing platform 2202 and the charging hub 2214. Due to the alignment slots 2210 being exposed to the area surrounding the landing platform 2202, drainage (e.g., water) may also enter the cavity 2408 of the body 1512 through the latch opening 2204. Similar to the front thermal management duct 2902, the rear thermal management duct 2406, the hub opening 2216, and the latch opening 2204, water that enters the cavity 2408 through the alignment slots 2210 may be directed towards one or more of the drainage slots 2110 of the body 1512.

Figure 34:
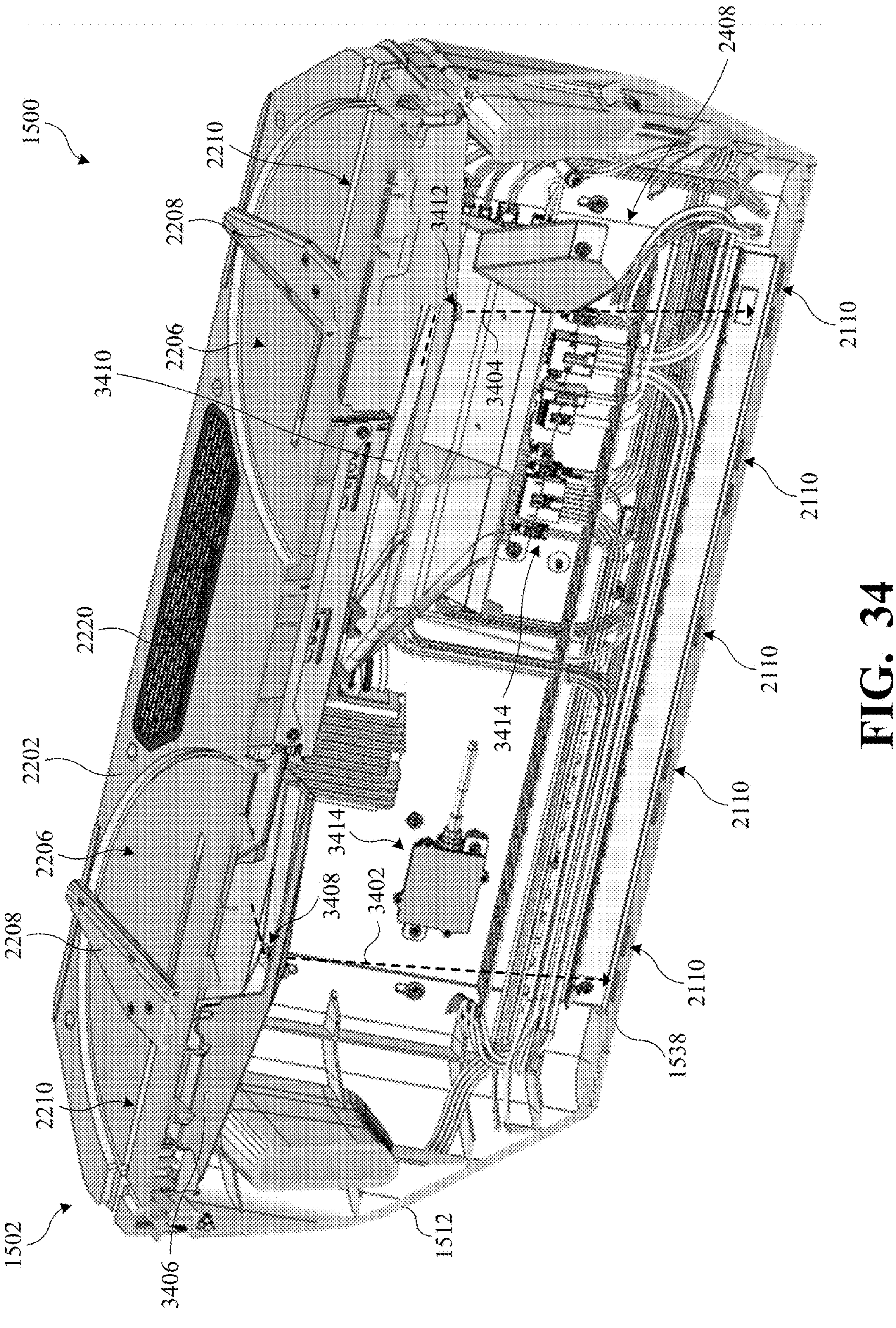
FIG. 34 is a cross-sectional view of the base of FIG. 22 illustrating a drainage path through alignment slots of the landing platform

To further illustrate, FIG. 34 is another cross-sectional view of the base 1502 illustrating a first drainage path 3402 and a second drainage path 3404 through the alignment slots 2210. As shown, the first drainage path 3402 may direct water that enters a first one of the alignment slots 2210 towards one or more of the drainage slots 2110 while the second drainage path 3404 may direct water that enters a second one of the alignment slots 2210 toward one or more of the drainage slots 2110.

By way of example, the first one of the alignment slots 2210 may be in fluid communication with a first catch basin 3406 such that drainage (e.g., water) that enters the first one of the alignments slots 2210 may be directed into the first catch basin 3406. The first catch basin 3406 may define a first basin opening 3408 therein (e.g., near a bottom of the first catch basin 3406 with respect to the elevational direction 1506 of the base station 1500). As such, water that enters the first catch basin 3406 may be directed through the first basin opening 3408 and towards the drainage slots 2110, at which point the water may exit the cavity 2408 of the body 1512, as illustrated by the first drainage path 3402.

Similarly, the second one of the alignment slots 2210 may be in fluid communication with a second catch basin 3410 such that drainage (e.g., water) that enters the second one of the alignments slots 2210 may be directed into the second catch basin 3410. The second catch basin 3410 may define a second basin opening 3412 therein (e.g., near a bottom of the second catch basin 3410 with respect to the elevational direction 1506 of the base station 1500). As such, water that enters the second catch basin 3410 may be directed through the second basin opening 3412 and towards the drainage slots 2110, at which point the water may exit the cavity 2408 of the body 1512, as illustrated by the second drainage path 3404. Thus, water entering the alignment slots 2210 may be directed away from internal component of the base station 1500 located within the cavity 2408, such as electronics 3414 therein.

Persons skilled in the art will understand that the various embodiments of the disclosure described herein and shown in the accompanying figures constitute non-limiting examples, and that additional components and features may be added to any of the embodiments discussed herein above without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of broader terms such as "comprises," "includes," and "having" should be understood to provide support for narrower terms such as "consisting of," "consisting essentially of," and "comprised substantially of." Accordingly, the scope of protection is not limited by the description set out above, but is defined by the claims that follow, and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated and encompass variations on the order of 25% (e.g., to allow for manufacturing tolerances and/or deviations in design). For example, the term "generally parallel" should be understood as referring to configurations in with the pertinent components are oriented so as to define an angle therebetween that is equal to 180°±25% (i.e., an angle that lies within the range of (approximately) 135° to (approximately) 225°) and the term "generally orthogonal" should be understood as referring to configurations in with the pertinent components are oriented so as to define an angle therebetween that is equal to 90°±25% (i.e., an angle that lies within the range of (approximately) 67.5° to (approximately) 112.5°). The term "generally parallel" should thus be understood as referring to encompass configurations in which the pertinent components are arranged in parallel relation, and the term "generally orthogonal" should thus be understood as referring to encompass configurations in which the pertinent components are arranged in orthogonal relation.

Although terms such as "first," "second," "third," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A base station for an unmanned aerial vehicle (UAV), comprising:
- a base that includes:
  - a body defining a cavity therein, wherein the body includes a lower surface that defines one or more drainage slots to provide drainage egress from the cavity of the body; and
  - a landing platform supported by the body and configured to support the UAV, wherein the landing platform includes:
    - a front grate in fluid communication with a thermal management system of the base station via a front thermal management duct that is configured to direct the drainage that enters the front thermal management duct through the front grate towards the one or more drainage slots; and
    - a rear grate in fluid communication with the thermal management system of the base station via a rear thermal management duct that is configured to direct the drainage that enters the rear thermal management duct through the rear grate towards the one or more drainage slots; and
    - a charging hub configured to removably couple with the UAV, wherein the charging hub is located at least partially within the cavity of the body and extends through a hub opening defined by the landing platform, and wherein the charging hub is configured to direct the drainage that enters the hub opening towards the one or more drainage slots.

2. The base station of claim 1, further comprising a roof assembly movably coupled to the base and movable between a closed position, in which the roof assembly is configured to enclose the landing platform, and an open position, in which the roof assembly is located at least partially below the landing platform with respect to an elevational direction such that the landing platform is unobstructed by the roof assembly to facilitate takeoff and landing of the UAV.

3. The base station of claim 2, wherein the landing platform further defines a latch opening configured to receive a latch of the roof assembly, and wherein the latch opening is configured to direct the drainage that enters the latch opening towards the one or more drainage slots.

4. The base station of claim 3, wherein the latch opening is in fluid communication with a catch basin located within the cavity of the base, and wherein the latch opening is configured to direct the drainage into the catch basin.

5. The base station of claim 1, wherein the front thermal management duct is configured to direct air through the front grate to regulate a temperature of an area surrounding the landing platform.

6. The base station of claim 5, wherein the rear thermal management duct is configured to direct air through the rear grate to regulate the temperature of the area surrounding the landing platform.

7. The base station of claim 6, wherein the area surrounding the landing platform is configured to contain the UAV, and wherein the area surrounding the landing platform is configured for enclosure by a movable roof assembly coupled to the base.

8. The base station of claim 1, wherein the front thermal management duct includes a duct wall that defines one or more drainage openings therein, and wherein the drainage is configured to flow along the duct wall and through the one or more drainage openings to reach the one or more drainage slots.

9. The base station of claim 1, wherein the rear thermal management duct includes a duct wall that defines one or more drainage openings therein, and wherein the drainage is configured to flow along the duct wall and through the one or more drainage openings to reach the one or more drainage slots.

10. The base station of claim 1, wherein the landing platform further includes one or more alignment members configured to align the UAV with the charging hub, and wherein the one or more alignment members are movable along one or more alignment slots defined by the landing platform.

11. The base station of claim 10, wherein the one or more alignment slots are configured to direct the drainage that enters the one or more alignment slots towards the one or more drainage slots.

12. The base station of claim 1, wherein the charging hub includes:
- an upper portion located above the landing platform with respect to an elevational direction and configured to contact the UAV; and
- a lower portion located at least partially within the cavity of the body and extending through the hub opening,
- wherein the lower portion is spaced apart from the upper portion to define an air gap, and
- wherein the upper portion is configured to direct the drainage along the lower portion towards the one or more drainage slots to prevent the drainage from entering the air gap.

13. The base station of claim 12, wherein the upper portion includes a tapered surface configured to direct the drainage along a tapered surface of the lower portion towards the one or more drainage slots.

14. The base station of claim 12, wherein the charging hub further includes wiring disposed within the cavity of the body and positioned adjacent to the air gap, and wherein the charging hub is configured to direct the drainage towards the one or more drainage slots to prevent the drainage from contacting the wiring.

15. The base station of claim 12, wherein the upper portion and the lower portion are positioned relative to one another in a nested manner such that the lower portion is at least partially nested within confines of the upper portion.

16. The base station of claim 12 wherein the charging hub further includes a deflector positioned at least partially within the hub opening, and wherein the charging hub is configured to direct the drainage along the lower portion between the lower portion and a wall of the deflector.

17. The base station of claim 2, wherein the front grate and the rear grate collectively define one or more openings that permit air flow thermally regulated by the thermal management system to reach an area surrounding the landing platform, wherein drainage entering the cavity through the one or more openings is directed towards the one or more drainage slots to prevent the drainage from contacting the thermal management system, and wherein the roof assembly, in the closed position, is configured to direct drainage away from the landing platform.

18. The base station of claim 1, further comprising a roof assembly movably coupled to the base and movable between a closed position, in which the roof assembly encloses the landing platform and directs water away from the landing platform, and an open position, in which the landing platform is unobstructed by the roof assembly, wherein the roof assembly includes:

a cover defining a cavity therein and further defining a first groove and a second groove along an exterior of the cover;

a first ear coupled to the cover and at least partially disposed in the first groove; and a second ear coupled to the cover and at least partially disposed in the second groove, wherein the first ear and the second ear are movably coupled to the body.

19. The base station of claim 18, wherein:

the first ear includes a peripheral wall that at least partially defines a cavity of the first ear and further defines one or more first-ear drainage slots to provide drainage egress from the cavity of the first ear; and the second ear includes a peripheral wall that at least partially defines a cavity of the second ear and further defines one or more second-ear drainage slots to provide drainage egress from the cavity of the second ear.

20. The base station of claim 19, wherein:

the peripheral wall of the first ear is configured to direct the drainage towards the one or more first-ear drainage slots between the peripheral wall of the first ear and an interior wall positioned within the cavity of the first ear; and the peripheral wall of the second ear is configured to direct the drainage towards the one or more second-ear drainage slots between the peripheral wall of the second ear and an interior wall positioned within the cavity of the second ear.

* * * * *